(12) United States Patent
Kawamura et al.

(10) Patent No.: US 7,683,520 B2
(45) Date of Patent: Mar. 23, 2010

(54) ELECTRIC MOTOR AND ROTATING DEVICE THAT CHANGES RELATIVE PHASE OF ROTORS

(75) Inventors: Tamotsu Kawamura, Shioya-gun (JP); Hirofumi Atarashi, Shioya-gun (JP); Masaaki Kaizuka, Utsunomiya (JP); Shoei Abe, Kawachi-gun (JP); Kazuyuki Iwata, Utsunomiya (JP); Masato Fujioka, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 11/713,718

(22) Filed: Mar. 5, 2007

(65) Prior Publication Data

US 2007/0205683 A1 Sep. 6, 2007

(30) Foreign Application Priority Data

| Mar. 6, 2006 | (JP) | ............................. 2006-060066 |
| Mar. 6, 2006 | (JP) | ............................. 2006-060069 |
| Mar. 20, 2006 | (JP) | ............................. 2006-076457 |

(51) Int. Cl.
*H02K 1/22* (2006.01)

(52) U.S. Cl. .................... 310/266; 310/114; 310/261

(58) Field of Classification Search ................. 310/266, 310/112, 114, 261, 268, 190, 191, 209
See application file for complete search history.

(56) References Cited

U.S. PATENT DOCUMENTS

| 6,049,152 | A | * | 4/2000 | Nakano ...................... 310/114 |
| 6,304,017 | B1 | * | 10/2001 | Leupold ...................... 310/115 |
| 6,639,337 | B1 | * | 10/2003 | Nakano ...................... 310/113 |
| 6,700,242 | B2 | * | 3/2004 | Kawamura ................ 310/68 R |
| 6,710,492 | B2 | * | 3/2004 | Minagawa .................. 310/113 |
| 6,930,423 | B2 | * | 8/2005 | Kitazawa .................... 310/168 |
| 6,992,419 | B2 | * | 1/2006 | Kim et al. ................... 310/266 |
| 6,998,757 | B2 | * | 2/2006 | Seguchi et al. ............. 310/266 |

FOREIGN PATENT DOCUMENTS

| JP | 2002-204541 A | 7/2002 |
| JP | 2004-72978 | 3/2004 |
| WO | WO 03/085238 A1 | 10/2003 |

* cited by examiner

*Primary Examiner*—Michael C Zarroli
(74) *Attorney, Agent, or Firm*—Arent Fox LLP

(57) ABSTRACT

This electric motor is provided with an inner periphery side rotor, an outer periphery side rotor, and a rotating device that can change a relative phase between these rotors by rotating at least one of them about a rotational axis thereof. The rotating device is provided with a first member integrally and rotatably provided to the outer periphery side rotor, and a second member integrally fixed on an inside of the inner periphery side rotor which together with the first member defines a pressure chamber on the inside of the inner periphery side rotor. The rotating device changes a relative phase between the inner periphery side rotor and the outer periphery side rotor by supplying a hydraulic fluid to the pressure chamber. The rotating device is further provided with a linking passage that leaks the hydraulic fluid supplied to the pressure chamber to an outside of the pressure chamber.

10 Claims, 29 Drawing Sheets

ELECTRIC MOTOR AND ROTATING DEVICE THAT CHANGES RELATIVE PHASE OF ROTORS

Priority is claimed on Japanese Patent Application No. 2006-076457, filed Mar. 20, 2006, Japanese Patent Application No. 2006-060066, filed Mar. 6, 2006, and Japanese Patent Application No. 2006-060069, filed Mar. 6, 2006, the contents of which are incorporated herein by reference.

BACKGROUND OF THE INVENTION

1. Field of the Invention

The present invention relates to an electric motor.

2. Description of the Related Art

Conventional electric motors, which are provided with a first rotor and a second rotor in a concentrically circular arrangement around a rotational axis of the electric motor and which control the phase difference, that is, the relative positions in the circumferential direction of the first rotor and the second rotor in response to the rotational speed of the electric motor, or in response to the speed of rotating magnetic field generated in the stator, are well known (for instance, refer to Japanese Unexamined Patent Application, First Publication No. 2002-204541).

For instance, to control the phase difference of the first rotor and the second rotor in response to the rotational speed of the electric motor, the relative positions in the circumferential direction of the first rotor and the second rotor are changed in this electric motor through members that displace along the radial direction under the action of centrifugal force. For example, to control the phase difference of the first and the second rotors in response to the speed of the rotating magnetic field generated in the stator, a control current is passed through the stator coil with the rotational speed maintained by the inertia of each rotor, and the speed of the rotating magnetic field is changed so as to change the relative positions in the circumferential direction of the first and second rotors.

Incidentally, in the electric motor according to an example of the prior art mentioned above, during the control of the phase difference of the first and second rotors in response to the rotational speed of the electric motor, for example, the problem that arises is that the phase difference of the first and second rotors can be controlled only in the state when centrifugal force corresponding to the rotational speed acts, that is, only in the operating state of the electric motor, and the phase difference cannot be controlled at the correct timing in the stopped state of the electric motor in electric motors. Also, another problem is that when this electric motor is provided in a vehicle as the drive source and when this electric motor is susceptible to external vibrations, it is difficult to control the phase difference of the first and second rotors correctly by the action of centrifugal force only. Furthermore, in this case, since the phase difference is controlled regardless of the fluctuation in the power supply voltage of the power source for the motor, there is a possibility of an abnormality to occur, such as inversion of the magnitude relationship between power supply voltage and back electromotive force of the electric motor.

Also, for instance, when controlling the phase difference between the first and second rotors in response to the speed of rotating magnetic field that occurs in the stator, another problem arises that the speed of the rotating magnetic field is changed, and thus the control process of the electric motor becomes complex.

The present invention was made in view of above circumstances and has an object of providing an electric motor which can extend an operable revolution speed range and a torque range by employing an induced voltage constant which can be easily and appropriately changed while inhibiting a complexity of the electric motor, and which thereby enables increasing operating efficiency and extending an operable range at high efficiency.

SUMMARY OF THE INVENTION

The present invention employed the followings in order to achieve the above-mentioned object.

(1) An electric motor including: an inner periphery side rotor provided with inner peripheral permanent magnets disposed along a circumferential direction thereof; an outer periphery side rotor provided with outer peripheral permanent magnets disposed along a circumferential direction thereof such that a rotational axis thereof is coaxial with a rotational axis of the inner periphery side rotor; and a rotating device that can change a relative phase between the inner periphery side rotor and the outer periphery side rotor by rotating at least the inner periphery side rotor or the outer periphery side rotor about the rotational axis. The rotating device: is provided with a first member integrally and rotatably provided to the outer periphery side rotor, and a second member integrally fixed on an inside of the inner periphery side rotor which together with the first member defines a pressure chamber on the inside of the inner periphery side rotor; changes the relative phase between the inner periphery side rotor and the outer periphery side rotor by supplying a hydraulic fluid to the pressure chamber; and is further provided with a linking passage that leaks the hydraulic fluid supplied to the pressure chamber to an outside of the pressure chamber.

(2) It may be arranged such that: the linking passage is a through hole from the pressure chamber provided in the second member to an outer periphery; and a flow passage that links the through hole is formed between the inner periphery side rotor and the second member.

(3) It may be arranged such that: the first member is a vane rotor which is installed integrally with the outer periphery side rotor, is disposed on the inside of the inner periphery side rotor, and has multiple blades; the second member is a housing with multiple grooves, which together with the blades defines the pressure chamber and is integrally installed on the inside of the inner periphery side rotor while rotatably housing the blades of the vane rotor; and the through holes linking the flow passage are formed in each of the multiple pressure chambers.

(4) It may be arranged such that: the flow passage is formed in a spiral shape extending along the circumferential direction, and links to the through holes formed in each of the multiple pressure chambers; and an end of the flow passage opens to an end face of the inner periphery side rotor.

(5) It may be arranged such that: the first member is a vane rotor which is disposed on the inside of the inner periphery side rotor, and is integrally installed with the outer periphery side rotor; the second member is a housing with multiple grooves, which together with the vane rotor defines the pressure chamber and is integrally installed on the inside of the inner periphery side rotor while rotatably housing the blades of the vane rotor; the inner periphery side rotor is rotatably disposed in the circumferential direction in a space between the surrounding outer periphery side rotor, the vane rotor and two end plates, by fixing the end plates that transmit the drive force of the outer periphery side rotor to an output shaft on the sides of the two ends in the axial direction of the outer periphery side rotor and the vane rotor; and through holes are formed laterally in a gap between the outer periphery side rotor and the inner periphery side rotor in the end plates.

(6) The linking passage may be a fluid passage that links the pressure chamber, and a gap between the inner periphery side rotor and the outer periphery side rotor.

(7) Notches may be formed in the wall of the pressure chamber that enable the fluid passage to remain always open to the pressure chamber regardless of the relative position of the vane rotor.

(8) The fluid passage may be formed in the end plate.

(9) A second fluid passage may be formed in the end plate extending from the gap to the outer periphery side rotor.

(10) It may be arranged such that: the second fluid passage is formed in both end plates of the pair of end plates, and a phase in the circumferential direction of the second fluid passage installed in one of the end plates differ from a phase in the circumferential direction of the second fluid passage installed in the another end plate.

BRIEF DESCRIPTION OF THE DRAWINGS

FIG. 15A shows a partially enlarged cross-sectional view before assembly of the electric motor, while FIG. 15B shows a partially enlarged cross-sectional view after assembly of the electric motor.

DETAILED DESCRIPTION OF THE INVENTION

First Embodiment

An electric motor according to a first embodiment of the present invention is described below with reference to the drawings.

Figure 1:
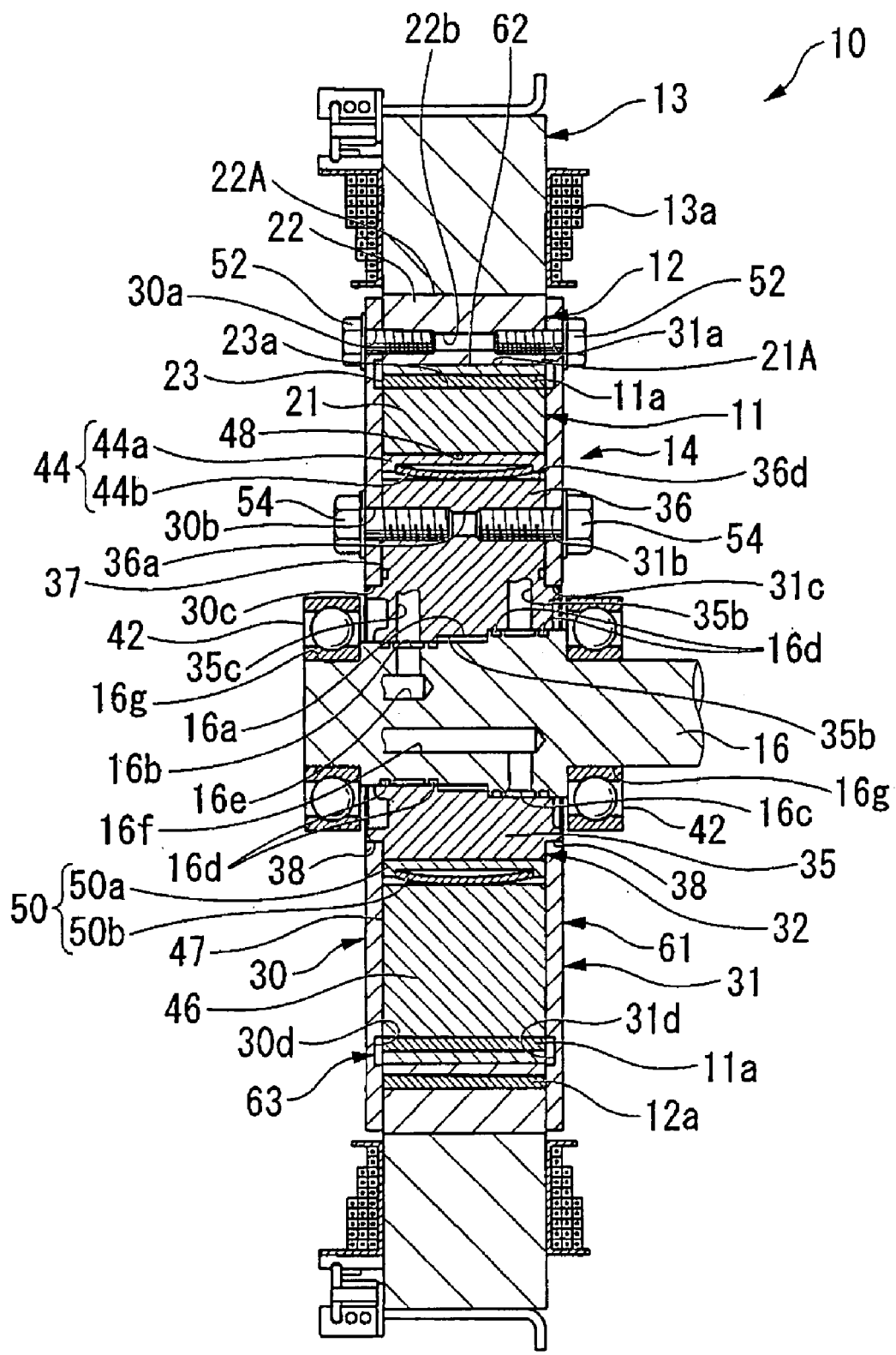
FIG. 1 is a cross-sectional view of an essential portion of an electric motor according to a first embodiment of the present invention.
Figure 2:
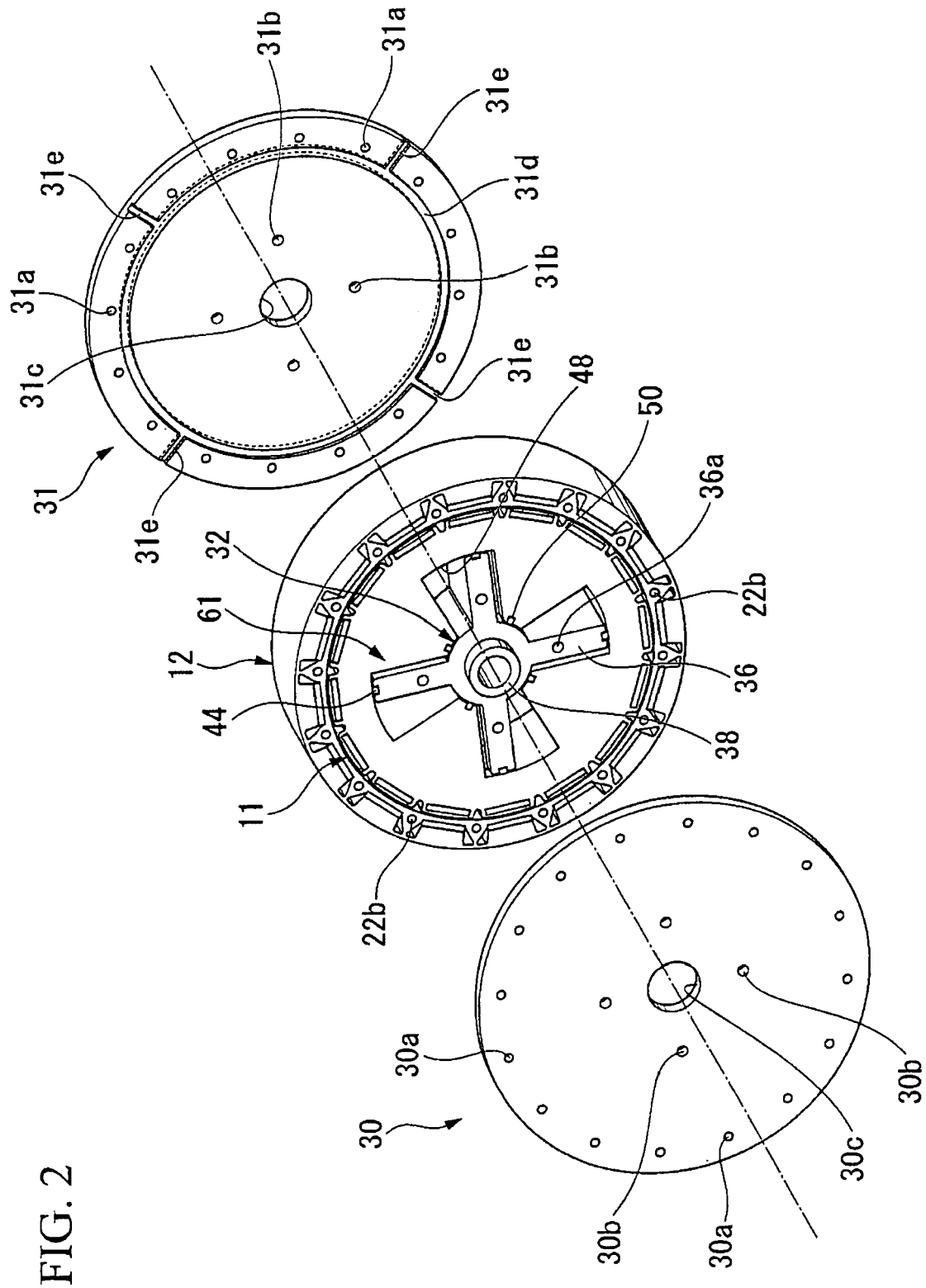
FIG. 2 is an exploded perspective view showing an inner periphery side rotor, an outer periphery side rotor, and a rotating mechanism of the electric motor.
Figure 3:
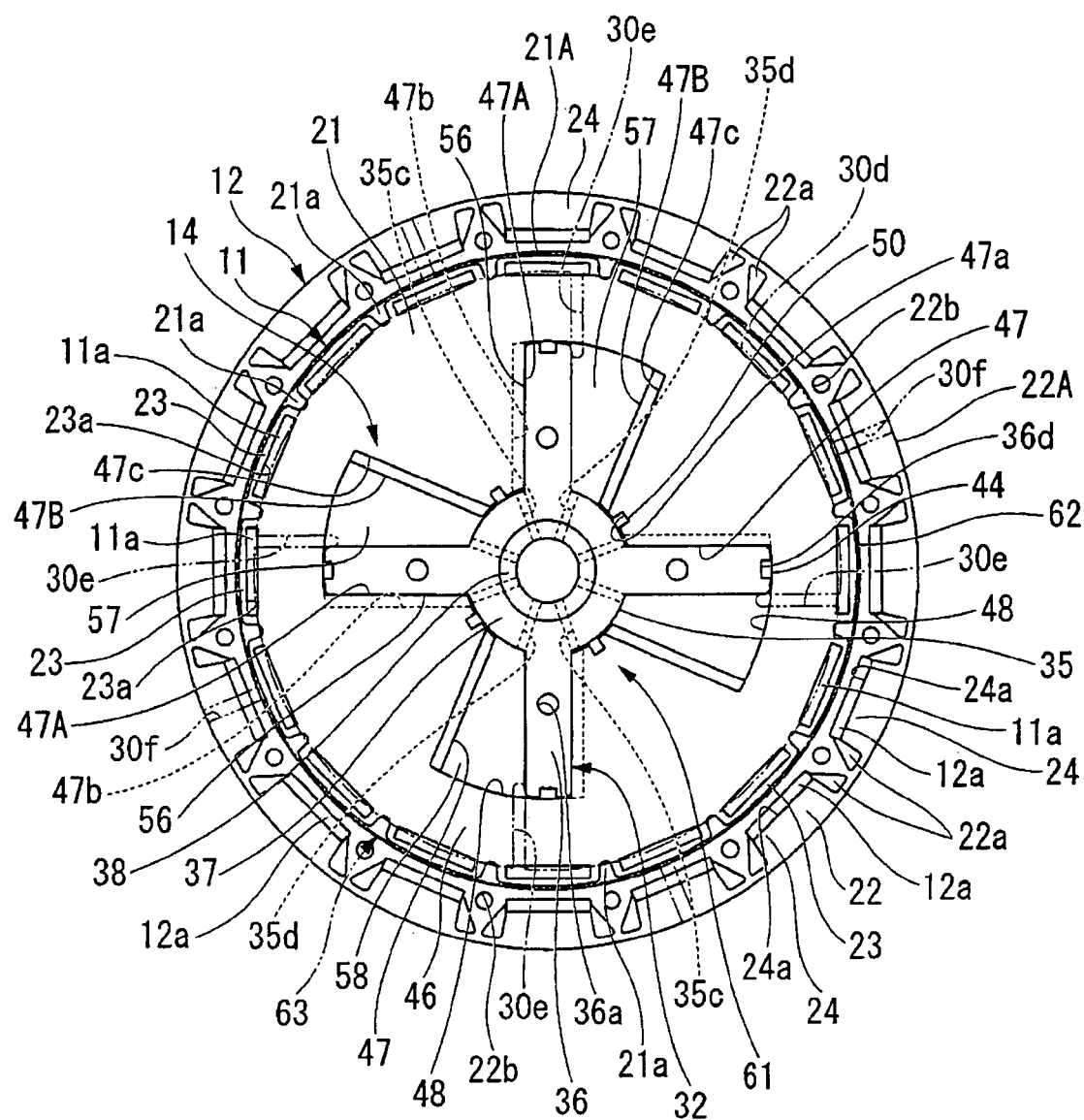
FIG. 3 is an elevation view showing the inner periphery side rotor, the outer periphery side rotor, without a drive plate in front, indicating a strong magnetic field state of the rotating mechanism of the electric motor. This figure shows a passage groove of the drive plate in front by two-dotted lines.

As shown in FIG. 1 to FIG. 3, an electric motor 10 according to the present embodiment is a brushless DC motor provided with an inner periphery side rotor 11 in substantially circular shape rotatably installed to rotate with its center on the rotational axis of the electric motor 10, an outer periphery side rotor 12 in substantially circular shape rotatably installed to rotate with its center coaxial with the rotational axis with the inner periphery side rotor 11 and installed radially outward with respect to the inner periphery side rotor 11 aligned in the direction of the rotational axis, a stator 13 with stator coil 13a shown in FIG. 1 with multiple phases that generates a rotating magnetic field and rotates the inner periphery side rotor 11 and outer periphery side rotor 12, a rotating mechanism (rotating device) 14 connected to the inner periphery side rotor 11 and outer periphery side rotor 12 that changes the relative phase between the inner periphery side rotor 11 and outer periphery side rotor 12 by the hydraulic pressure (fluid pressure) of the hydraulic oil (hydraulic fluid), which is a non-compressible fluid, and a hydraulic control device (not shown in the figures) that controls the hydraulic pressure to the rotating mechanism 14. The electric motor 10 may be installed as the drive source in a vehicle such as a hybrid vehicle or an electric vehicle. In this case, its output shaft (rotating shaft) 16 is connected to the input shaft of the transmission unit (not shown in the figures), so that the drive force of the electric motor 10 is transmitted to the drive wheels (not shown in the figures) of the vehicle through the transmission unit.

When the drive force is transmitted to the electric motor 10 from the side of the drive wheel during deceleration of the vehicle, the electric motor 10 works as a generator. That is, it generates regenerative braking force, and recovers the kinetic energy of the body as electric energy (regenerated energy). Moreover, in case of a hybrid vehicle, for instance, the rotational axis of the electric motor 10 is connected to the crankshaft of an internal combustion engine (not shown in the figures), and even when the output of the internal combustion engine is transmitted to the electric motor 10, the electric motor 10 works as a generator and generates electric energy.

The inner periphery side rotor 11 is disposed such that its rotational axis is coaxial with the rotational axis of the electric motor 10. As shown in FIG. 3, it has an inner peripheral rotor core 21 in substantially circular shape. The inner peripheral rotor core 21 is provided with multiple inner peripheral magnet mounting attachments 23, . . . , 23, at the inner periphery at the pitch desired in the circumferential direction on the outer periphery. Also, on the outer peripheral surface 21A of the inner peripheral rotor core 21, grooves 21a extending parallel to the rotational axis are formed with a concave shape in the radial direction at all intermediate positions of the adjacent inner peripheral magnet mounting attachments 23, 23, in the circumferential direction. The inner peripheral rotor core 21 is formed by a process such as sintering.

The inner peripheral magnet mounting attachments 23, . . . 23, are provided with magnet attachment holes 23a passing through the inner peripheral rotor core 21 and parallel to the rotational axis. The magnet attachment hole 23a is formed with a cross section of substantially rectangular shape for the direction parallel to the rotational axis, and is perpendicular to the radial line joining the central position in the circumferential direction and the rotational axis. Permanent magnet 11a of substantially plate form extending parallel to the rotational axis is provided in each of the magnet attachment holes 23a, . . . 23a.

Permanent magnets 11a mounted in each of the magnet attachment holes 23a, . . . 23a, are all similarly magnetized in the thickness direction (that is in the radial direction of rotors 11, 12). In all the inner peripheral magnet mounting attachments 23, . . . 23, the inner peripheral magnet mounting attachments 23, . . . 23, adjacent to each other in the circumferential direction are set such that the magnetization directions of permanent magnet 11a mounted in one of the holes and the permanent magnet 11a mounted in the other hole are mutually different. That is, the inner peripheral magnet mounting attachment 23 with the permanent magnet 11a having the N pole in the outer periphery is set adjacent to the inner peripheral magnet mounting attachment 23 with the permanent magnet 11a having the S pole in the outer periphery in the circumferential direction through the groove 21a.

In this way, the multiple permanent magnets 11a, . . . , 11a are disposed in the circumferential direction and provided in the inner periphery side rotor 11.

The outer periphery side rotor 12 is also disposed such that its rotational axis is coaxial with the rotational axis of the electric motor 10, and has an outer peripheral rotor core 22 in substantially circular shape. The outer peripheral rotor core 22 is provided with outer peripheral magnet mounting attachments 24, . . . , 24, of the same number as the inner peripheral magnet mounting attachments 23, . . . 23 mentioned above at the pitch desired in the circumferential direction on the inner periphery. Also, on the side of the outer peripheral surface 22A of the outer peripheral rotor core 22, a pair of flux barrier-formed holes 22a, 22a adjacent to each other are formed in the circumferential direction extending parallel to and through the rotational axis at all intermediate positions of the adjacent outer peripheral magnet mounting attachments 24, 24, in the circumferential direction. Furthermore, screw hole 22b is formed along the axial direction at each intermediate position of each pair of flux barrier-formed holes 22a, 22a of the outer peripheral rotor core 22, that is, at each intermediate position of adjacent outer peripheral magnet mounting attachments 24, . . . 24. The outer peripheral rotor core 22 is also formed by a process such as sintering.

The outer peripheral magnet mounting attachments 24, . . . , 24, are each provided with magnet attachment hole 24a that passes through the attachment parallel to the rotational axis. The magnet attachment hole 24a is formed with a cross section of substantially rectangular shape for the direction parallel to the rotational axis, and is perpendicular to the radial line joining the central position in the circumferential direction and the rotational axis. Permanent magnet 12a of substantially plate form extending parallel to the rotational axis is provided in each of the magnet attachment holes 24a, . . . 24a.

Permanent magnets 12a mounted in each of the magnet attachment holes 24a, . . . 24a, are all similarly magnetized in the thickness direction (that is in the radial direction of rotors 12, 12). In all the outer peripheral magnet mounting attachments 24, . . . 24, the outer peripheral magnet mounting attachments 24, . . . 24, adjacent to each other in the circumferential direction are set such that the magnetization directions of the permanent magnet 12a mounted in one of the holes and the permanent magnet 11a mounted in the other hole, are mutually different. That is, the outer peripheral magnet mounting attachment 24 mounted with the permanent magnet 12a having its N pole in the outer periphery is set in the circumferential direction adjacent to the outer peripheral magnet mounting attachment 24 mounted with the permanent magnet 12a having the S pole in the outer periphery through the pair of flux barrier-formed holes 22a, 22a and the screw hole 22b.

In this way, multiple permanent magnets 12a, . . . , 12a are disposed in the circumferential direction and provided in the outer periphery side rotor 12 also.

Thus, the inner peripheral magnet mounting attachments 23, . . . , 23 of the inner periphery side rotor 11, and the outer peripheral magnet mounting attachments 24, . . . , 24 of the outer periphery side rotor 12 are disposed such that they face each other in the radial direction of each of the rotors 11, 12. When positioned to face each other in this way, the phase of the direction of rotation of all the permanent magnets 11a matches that of any of the corresponding permanent magnets 12a with a one-to-one correspondence.

Figure 4:
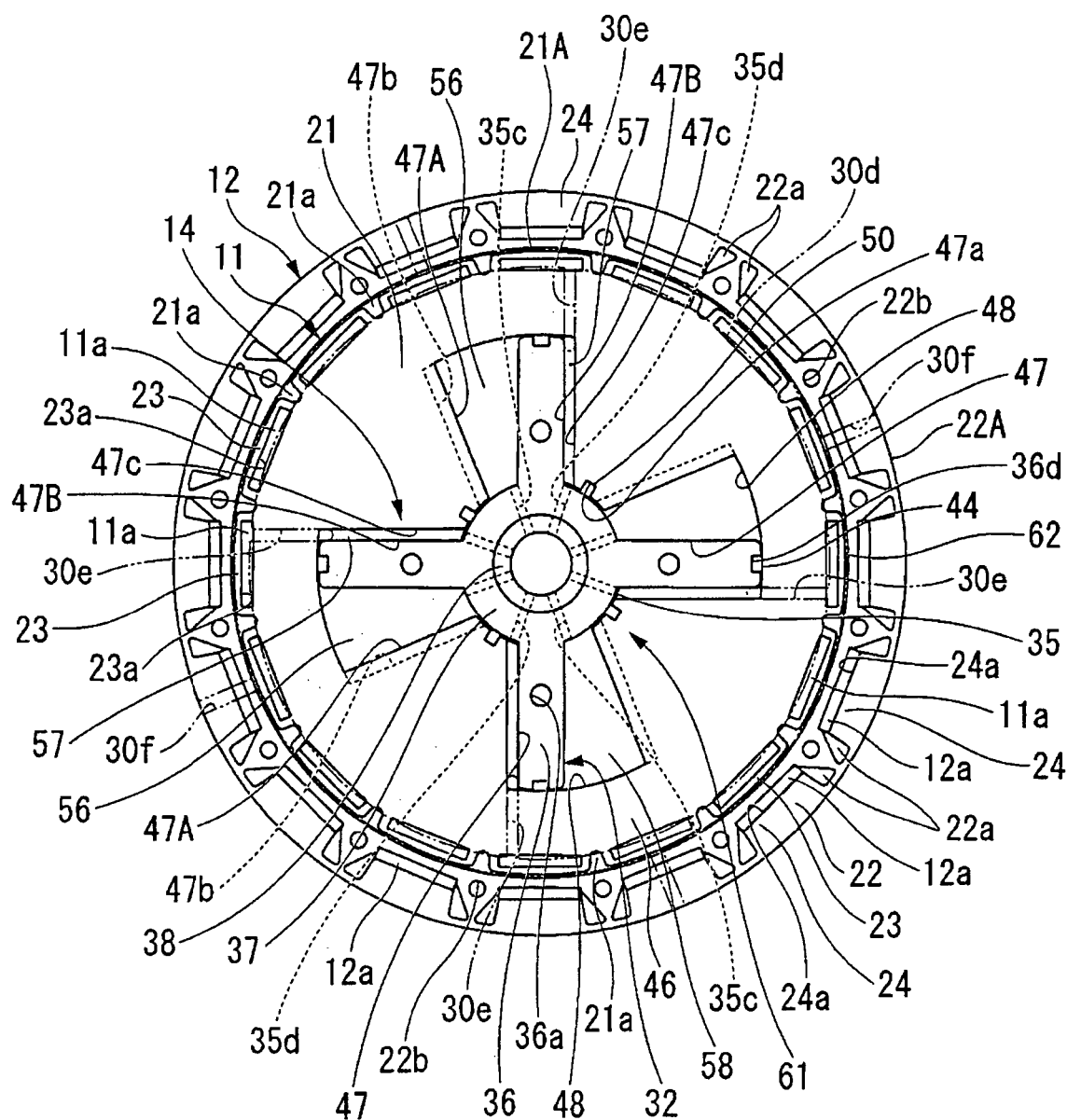
FIG. 4 is an elevation view showing the inner periphery side rotor, the outer periphery side rotor, without the drive plate in front showing a weak magnetic field state of the rotating mechanism of the electric motor. This figure shows the passage groove of the drive plate in front by two-dotted lines.

Thus, depending on the relative position around the rotational axis of the inner periphery side rotor 11 and the outer periphery side rotor 12, the state of the electric motor 10 in all the permanent magnets 11a, . . . , 11a of the inner periphery side rotor 11 and in all the permanent magnets 12a, . . . , 12a of the outer periphery side rotor 12, can be changed from the strong magnetic field state shown in FIG. 3 wherein the flux field is the strongest and the unlike magnetic poles of the permanent magnet 11a and the permanent magnet 12a substantially face each other (that is, the poles of the permanent magnet 11a and the permanent magnet 12a are disposed in an unlike-pole facing arrangement) and can be set to an appropriate state extending to the weak magnetic field state shown in FIG. 4 wherein the flux field is the weakest and the like magnetic poles of the permanent magnet 11a and the permanent magnet 12a face each other (that is, the poles of the permanent magnet 11a and the poles of the permanent magnet 12a are disposed in a like-pole facing arrangement).

Here, the stator 13 shown in FIG. 1 is formed in substantially circular shape and is disposed to face the outer periphery side rotor 12 at the circumference. For instance, it may be fixed to the housing (not shown in the figures) of the transmission unit of a vehicle.

Next, the rotating mechanism 14 that changes the relative phase of the inner periphery side rotor 11 and the outer periphery side rotor 12 mentioned above, is described.

As shown in FIG. 1 and FIG. 2, the rotating mechanism 14 of the present embodiment is provided with drive plates (end plates) 30, 31 of circular shape fixed so as to cover the space within the outer periphery side rotor 12 on both sides of the axis of the outer periphery side rotor 12, a vane rotor 32 held between these drive plates 30, 31 and installed to integrate internally with the outer periphery side rotor 12, and a part of the inner periphery of the inner periphery side rotor 11. The vane rotor 32 may be formed by a process such as sintering.

Multiple through bolt insertion holes 30a, . . . 30a (same number as the screw holes 22b) along the axial direction are formed on the outer peripheral part of each of the drive plates 30 at equidistant spacing on the same circumference. Multiple through bolt insertion holes 30b, . . . , 30b along the axial direction and more inward of these bolt insertion holes 30a, . . . , 30a are formed at equidistant spacing on the same circumference. Moreover, a through mating hole 30c is formed along the axial direction at the center of the drive plate 30 and more inward of the bolt insertion holes 30b, . . . , 30b.

Similarly, in drive plates 31 also, multiple through bolt insertion holes 31a, . . . 31a (same number as the screw holes 22b) along the axial direction are formed on the outer peripheral part of each of the drive plates 31 at equidistant spacing on the same circumference. Multiple through bolt insertion holes 31b, . . . , 31b along the axial direction and more inward of these bolt insertion holes 31a, . . . , 31a are formed at equidistant spacing on the same circumference. Moreover, a through mating hole 31c is formed along the axial direction at the center of the drive plate 31 and more inward of the bolt insertion holes 31b, . . . , 31b.

As shown in FIG. 1, a passage groove 30d is formed of circular shape concentric to the drive plate 30 inside of the bolt insertion hole on the outer periphery on the surface on one side of one of the drive plates 30 in the axial direction. Also, as shown in FIG. 3, multiple passage grooves 30e, . . . , 30e extend from equidistant positions in the circumferential direction of the passage groove 30d toward the central axis through equal lengths.

These passage grooves 30e, . . . , 30e, are parallel to the radial lines of the quadrisection passing through each bolt insertion hole 30b, . . . , 30b and the center of the drive plate 30 shown in FIG. 2, and are also offset by a specific amount on the same side in the circumferential direction. Also, multiple passage grooves 30f, . . . 30f (second fluid passage) are formed at equidistant positions in the circumferential direction of the passage groove 30d as shown in FIG. 3, on the surface on one side of the drive plate 30 in the axial direction, and each of these passages pass through the outer peripheral surface radially outward in radial form in the radial direction. The phases of the passage grooves 30e, . . . , 30e and the passage grooves 30f, . . . , 30f differ in the circumferential direction.

Figure 5:
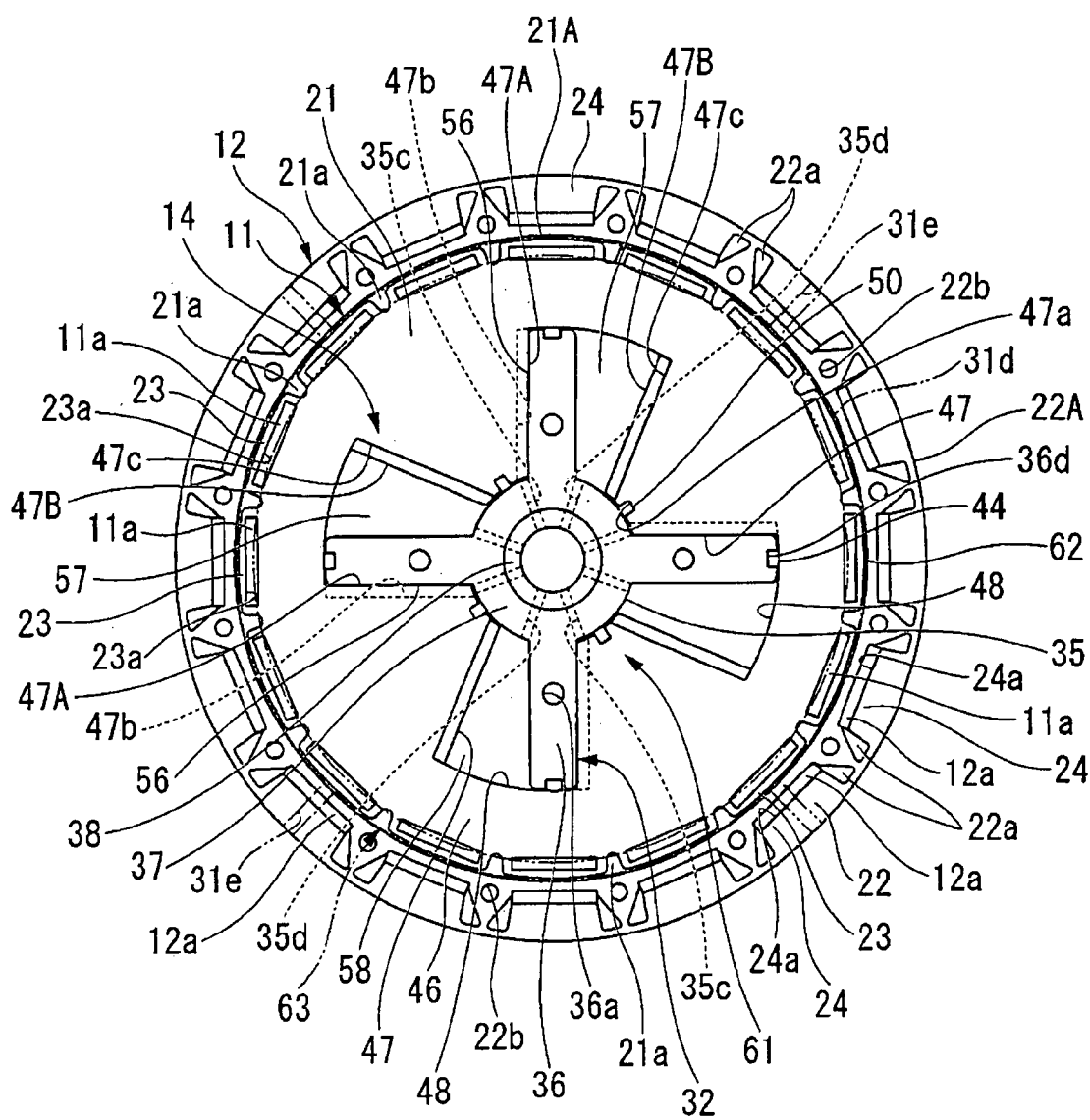
FIG. 5 is an elevation view showing the inner periphery side rotor, the outer periphery side rotor, without the drive plate in front showing the strong magnetic field state of the rotating mechanism of the electric motor. This figure shows the passage groove of the drive plate at the back by two-dotted lines.

As shown in FIG. 1, a passage groove 31d is formed of circular shape having the same diameter as the passage groove 30d, concentric to the drive plate 31 inside of the bolt insertion holes 31a, . . . , 31a on the outer peripheral side on the surface on one side of the other drive plate 31 in the axial direction. Also, as shown in FIG. 5, multiple passage grooves 31e, . . . , 31e (second fluid passage) extend from equidistant positions in the circumferential direction of the passage groove 31d and each pass through in radial form radially outward up to the outer peripheral surface.

The vane rotor 32 is provided with a circular shaped boss 35, and multiple (same number as the number of bolt insertion holes 30b, 31b mentioned above) blades 36, . . . 36, extending radially outward from equidistant positions in the circumferential direction on the outer peripheral surface of the boss 35.

The boss 35 is a stepless boss with a sandwiched base section 37 of the same length in the axial direction as the blades 36, . . . , 36 in the outer periphery, and a pair of mating parts 38 of circular shape protruding in the axial direction on both sides from the inner periphery of the sandwiched base section 37. Connecting spline 35b is formed, as shown in FIG. 1, at the center in the axial direction on the inner diameter side of boss 35. On both sides in the axial direction, passage holes 35c, . . . , 35c are formed passing through the inner periphery at the position of each blade 36, . . . , 36, as shown in FIG. 3, to the same one side in the direction of rotation of the base end of the nearest blade 36, and passage holes 35d, . . . , 35d are formed passing through the inner periphery at the position of each blade 36, . . . , 36 to the same opposite side in the direction of rotation of the base end of the nearest blade 36. As shown in FIG. 1, the positions in the axial direction of the holes vary.

Output shaft 16 is fitted on the inner diameter side of this vane rotor 32, and transmits the drive force of the outer periphery side rotor 12. The output shaft 16 is provided with a connecting spline 16a joined to the connecting spline 35b of the boss 35, a linking groove 16b in annular shape linking all the passage holes 35c of the boss 35 in the joined condition with the connecting spline 16a, linking groove 16c in annular shape linking all the passage holes 35d in the same condition, and sealing grooves 16d, . . . , 16d, formed at both outside positions of these linking grooves 16b and 16c. Sealing rings (not shown in the figures) are provided in each of these sealing grooves 16d, . . . , 16d to seal clearances with the vane rotor 32. Also, passage hole 16e to supply/drain hydraulic oil for the linking groove 16b and passage hole 16f to supply/drain hydraulic oil for the linking groove 16c, are provided in the output shaft 16 so as to pass through its interior. Bearing mating parts 16g for mating with a pair of bearings 42, 42 retained in the housing of the transmission unit of a vehicle, for instance, are each formed in the part of this output shaft 16 that protrudes more outward along the axial direction from both sides than the drive plates 30, 31.

The blades 36, . . . , 36 are in substantially plate form. As shown in FIG. 3, through screw holes 36a are formed in the axial direction at intermediate positions in these blades. Also, a concave-shaped seal retaining groove 36d is formed on the outer peripheral surface of each blade 36, . . . , 36, throughout the length of the blade in the axial direction from the outer peripheral surface toward the center. A spring seal 44 for sealing the clearance with the inner periphery side rotor 11 is disposed in each of these seal retaining parts 36d, . . . , 36d. Each of these spring seals 44, . . . , 44 is provided with a seal 44a in sliding contact with the inner periphery side rotor 11 installed on the outside, as shown in FIG. 1, and a spring 44b that presses the seal 44a installed on the inside against the inner periphery side rotor 11 radially outward in the radial direction.

Figure 6:
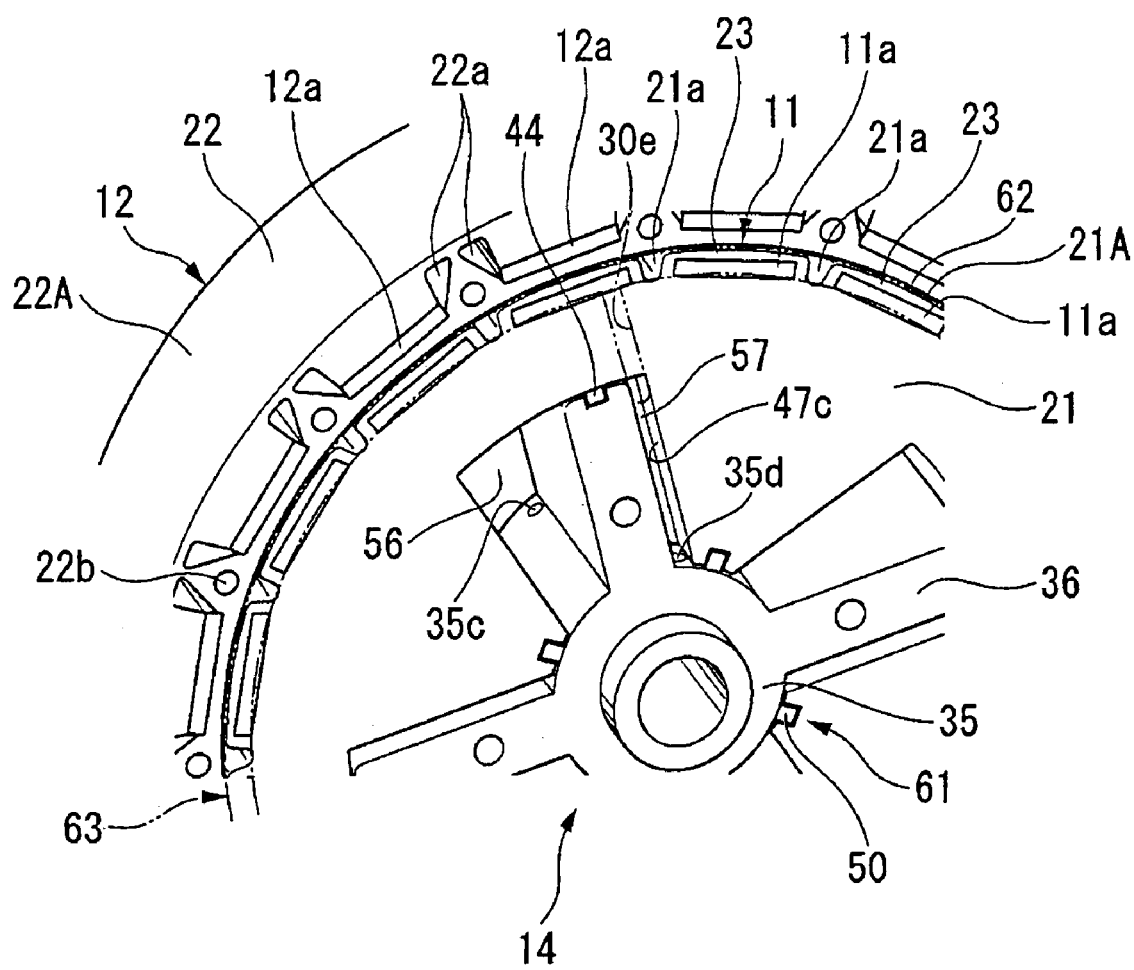
FIG. 6 is a part perspective view that shows the inner periphery side rotor without the drive plate in front showing the weak magnetic field state of a vane rotor of the electric motor. This figure shows the passage groove of the drive plate in front by two-dotted lines.

As shown in FIG. 3, the inner peripheral rotor core 21 of the inner periphery side rotor 11 is provided with a ring shaped base section 46 having the permanent magnets 11a, . . . , 11a, mentioned above, and protruding sections 47, . . . , 47 with the same number as the number of blades 36, which protrude radially inward from equidistant positions in the circumferential direction from the inner peripheral surface of this base section 46. Each protruding section 47, . . . , 47, forms a substantial isosceles triangle that converges when viewed in the axial direction. Grooves 48 are formed in which blades 36 of the above-mentioned vane rotor 32 can be disposed in each space of the adjacent protruding sections 47, 47, in the circumferential direction in all the protruding sections 47, . . . 47. The concave shaped seal retaining groove 47a directed toward the outside diameter side, is formed on the inside end face of each of the protruding sections 47, . . . , 47 and extend throughout the length in the axial direction. Spring seals 50 are disposed in these seal retaining parts 47a, . . . , 47a for sealing the clearances in the outer peripheral surface of the boss 35 of the vane rotor 32. Each spring seal 50, . . . , 50, is provided with a seal 50a in sliding contact with the boss 35 of the vane rotor 32 installed on the inner periphery, as shown in FIG. 1, and is also provided with a seal spring 50b on the outside diameter side that presses the seal 50a against the vane rotor 32. Also, as shown in FIG. 3, notch 47b is formed in the wall 47A on the same side in the direction of rotation of the inner periphery side rotor 11 of each protruding section 47, . . . , 47, with each notch extending along the radial direction at the edge of the same one side in the axial direction of the inner periphery side rotor 11. Also, notch 47c, as shown in FIG. 6, is formed in the wall 47B on the opposite side in the direction of rotation of each protruding section 47, . . . , 47, with each notch extending along the radial direction at the edge of the side opposite to the side mentioned above, in the axial direction of the inner periphery side rotor 11.

Referring to FIG. 1 for the explanations when assembling the above-mentioned parts, for example, bolts 52 may be inserted in each of the bolt insertion holes 30a, . . . , 30a of one of the drive plates 30 with the outer periphery side rotor 12 fitted to one of the drive plates 30, and the passage groove 30d, passage grooves 30e, . . . 30e and the passage grooves 30f, . . . , 30f facing each other. Each of the bolts 52, . . . , 52 is screwed in to the screw hole 22b in the outer periphery side rotor 12. Also, with the vane rotor 32 and the drive plate 30 in the assembled condition after mating one of the mating parts 38 in the mating hole 30c, bolts 54 are inserted in each of the bolt insertion holes 30b, . . . , 30b of this drive plate 30. Each bolt 54, . . . 54, is screwed in the screw hole 36a of the boss 54 in blade 36 of the vane rotor 32. In this condition, although all the passage grooves 30e, . . . , 30e of the drive plate 30 correspond to the blades 36, . . . , 36 of the vane rotor 32, as shown in FIG. 3, they are also adjacent in the circumferential direction of the front end on the same side. Subsequently, with spring seals 44 fitted to each of the blades 36, . . . 36 of the vane rotor 32, each of the blades 36, . . . , 36 is inserted in its corresponding groove 48 with a one-to-one correspondence. The inner periphery side rotor 11 is inserted with the spring seals 50, ..., 50 in the fitted condition.

The other drive plate 31 is aligned on the opposite side by engaging the other mating part 38 of the vane rotor 32 with the mating hole 31c after bringing the passage groove 31d and passage grooves 31e, ..., 31e opposite the inner periphery side rotor 11 and the outer periphery side rotor 12. Bolts 52 are inserted in each of these bolt insertion holes 31a, ..., 31a of this drive plate 31, and each of these bolts 52, ..., 52 is screwed in the screw hole 22b of the outer periphery side rotor 12. Also, bolts 54 are inserted in each of the bolt insertion holes 31b, ..., 31b of the drive plate 31, and each of the bolts 54, ..., 54 is screwed in the screw hole 36a of the blade 36 of the vane rotor 32.

At this stage, the passage grooves 30f, ..., 30f of the drive plate 30 and the passage grooves 31e, ..., 31e of the drive plate 31 have phases in the circumferential direction that are different, as shown in FIG. 3 and in FIG. 5. Moreover, the passage grooves 30f, ..., 30f and the passage grooves 31e, ..., 31e both pass through the position of the permanent magnet 12a of the outer periphery side rotor 12.

Furthermore, the passage grooves 30d, ..., 30d and the passage grooves 31d, ..., 31d of circular shape, both pass through the position of the permanent magnets 11a, ..., 11a of the inner periphery side rotor 11 and the grooves 21a, ..., 21a, and the passage grooves 30e, ..., 30e, extend up to the groove 48 of the inner periphery side rotor 11. Here, the number of bolts 54, ..., 54 securing the blades 36, ..., 36 to the drive plates 30,31 is less than the number of bolts 52, ..., 52 securing the drive plate 30, 31 to the outer periphery side rotor 12, and the size of the bolts used is also larger.

Subsequently, the output shaft 16 is engaged with the inside of the vane rotor 32 by joining the connecting spline 16a and the connecting spline 35b. The result is that the output shaft 16 is secured and integrated with the vane rotor 32. Naturally, the assembly procedure described above is only an example; different procedures may be used to perform the same assembly.

According to the procedure described above, the inner periphery side rotor 11 is installed in the space 58 between the drive plates 30, 31, shown in FIG. 3, on the inside of the outer periphery side rotor 12 and on the outside of the vane rotor 32. Moreover, the blades 36 of the vane rotor 32 are disposed one each in the grooves 48, ..., 48 of the inner periphery side rotor 11. The output shaft 16 connected by spline to the vane rotor 32 can be rotatably integrated with the outer periphery side rotor 12, the drive plates 30, 31, and the vane rotor 32. More specifically, it is fixed as an integral part.

Here, when the permanent magnets 12a, ..., 12a of the outer periphery side rotor 12 and the permanent magnets 11a, ..., 11a of the inner periphery side rotor 11 have unlike poles facing each other to generate a strong magnetic field state, as shown in FIG. 3 and FIG. 5, all the vane wheels 36, ... 36, are in contact with the adjacent protruding sections 47 on the same one side in the direction of rotation in the corresponding grooves 48. A first pressure chamber 56 is formed between the protruding sections 47 in contact, and a second pressure chamber 57 is formed wider than the first pressure chamber 56 between the adjacent protruding sections 47 on the same opposite side in the direction of rotation (that is, the first pressure chambers 56, ..., 56 and the second pressure chambers 57, ..., 57 are formed by the vane wheels 36, ..., 36 housed in the grooves 48, ..., 48 and the grooves 48, ..., 48). The result is that the first pressure chambers 56, ..., 56, and the second pressure chambers 57, ..., 57 are defined on the inside of the inner periphery side rotor 11. Each of the passage holes 35c, ..., 35c of the vane rotor 32 in each of the first pressure chambers 56, ..., 56 is installed so as to open with a one-to-one correspondence, while each of the passage holes 35d, ..., 35d of the vane rotor 32 in each of the second pressure chambers 57, ..., 57 is installed so as to open with a one-to-one correspondence. At this stage, the inner periphery side rotor 11 rotates to the maximum limit on the side of the passage holes 35c, ..., 35c of the vane rotor 32, but because of the existence of notches 47b, ..., 47b, the passage holes 35c, ..., 35c are not closed by the inner periphery side rotor 11. The result is that the passage holes 35c, ..., 35c always open out to the first pressure chambers 56, ..., 56.

Conversely, when the permanent magnets 12a, ..., 12a of the outer periphery side rotor 12 and the permanent magnets 11a, ..., 11a of the inner periphery side rotor 11 have like poles facing each other to generate a weak magnetic field state, as shown in FIG. 4, all the vane wheels 36, ... 36, are in contact with the adjacent protruding sections 47 on the opposite side mentioned above same as in the direction of rotation in the corresponding grooves 48. The result is that the second pressure chamber 57 is reduced in size, and the first pressure chamber 56 between the adjacent protruding sections 47 on the same one side mentioned above in the respective directions of rotation become wider. At this stage, the inner periphery side rotor 11 rotates to the maximum limit on the side of the passage holes 35d, ..., 35d of the vane rotor 32, but as shown in FIG. 6, because of the existence of notches 47c, ..., 47c, the passage holes 35d, ..., 35d are not closed by the inner periphery side rotor 11. Moreover, the passage grooves 30e, ..., 30e of the drive plate 30 are not closed by the inner periphery side rotor 11. The result is that the passage holes 35d, ..., 35d and the passage grooves 30e, ..., 30e always open out to the second pressure chambers 57, ..., 57. That is, the notches 47c, ..., 47c always enable the passage grooves 30e, ..., 30e to open out to the second pressure chambers 57, ..., 57.

The positions of strong magnetic field as indicated in FIG. 3 and FIG. 5, as a result of the unlike poles of the permanent magnets 12a, ..., 12a and permanent magnets 11a, ..., 11a of the outer periphery side rotor 12 and the inner periphery side rotor 11 facing and attracting each other, are set to their home positions when the first pressure chambers 56, ..., 56 and the second pressure chambers 57, ..., 57 do not receive substantial hydraulic pressure. The first pressure chambers 56, ..., 56, and the second pressure chambers 57, ..., 57 are filled with hydraulic oil even in the state when they do not receive hydraulic pressure. From this state of the home positions, hydraulic oil is supplied to the first pressure chambers 56, ..., 56 (that is, hydraulic pressure is supplied to the first pressure chambers 56, ..., 56) through the passage holes 35c, ..., 35c that always remain open because of the notches 47b, ..., 47b. Simultaneously, hydraulic oil is drained from the second pressure chambers 57, ..., 57 through the passage holes 35d, ..., 35d. The result is that the outer periphery side rotor 12 and the inner periphery side rotor 11 rotate relatively opposing the magnetic force, and the weak magnetic field state shown in FIG. 4 occurs. Conversely, if hydraulic oil is supplied to each of the second pressure chambers 57, ..., 57, through the passage holes 35d, ..., 35d that open out always because of the notches 47c, ..., 47c, and simultaneously if hydraulic oil is drained from each of the first pressure chambers 56, ..., 56, through the passage holes 35c, ..., 35c, the outer periphery side rotor 12 and the inner periphery side rotor 11 return to their home positions and a strong magnetic field state occurs. However, at this stage, the permanent magnets 12a, ..., 12a, of the outer periphery side rotor 12 and the permanent magnets 11a, . . . , 11a of the inner periphery side rotor 11 are attracted to each other by the magnetic force. Thus, the pressure of hydraulic oil supplied to each of the second pressure chambers 57, . . . , 57, is lower than the pressure required for changing the phase in the strong magnetic field state; sometimes, no hydraulic pressure need be supplied, and mere supply/drainage of hydraulic oil is adequate. Here, the actuator unit 61 that rotates after receiving the pressure of hydraulic oil supplied externally, is provided with the vane rotor 32, the first pressure chambers 56, . . . , 56, and the second pressure chambers 57, . . . , 57 mentioned above. The first pressure chambers 56, . . . , 56, and the second pressure chambers 57, . . . , 57 of the actuator unit 61 may be provided in either the inner periphery side rotor 11 or the outer periphery side rotor 12, with the vane rotor 32 provided in the other from the inner periphery side rotor 11 and the outer periphery side rotor 12.

Since the hydraulic oil here is non-compressible, even if there is a change in phase at the ends of the two limits of the strong magnetic field state and weak magnetic field state as mentioned above, or even at the intermediate position between the ends of the two limits, if the hydraulic control device (not shown in the figures), for instance, stops the supply/drainage of hydraulic oil for all the first pressure chambers 56, . . . , 56, and the second pressure chambers 57, . . . , 57, by shutting off the switching valves (not shown in the figures), the outer periphery side rotor 12 and the inner periphery side rotor 11 at that stage, maintain the phase relationship and the change in phase at any arbitrary magnetic field state can be stopped.

In any of the positions from the strong magnetic field state to the weak magnetic field state mentioned above, the passage grooves 30e, . . . , 30e formed in one of the drive plates 30 are linked to the second pressure chambers 57, . . . , 57. Therefore, the hydraulic oil flows from the passage grooves 30e, . . . , 30e to the passage groove 30d because of the centrifugal force. A part of the hydraulic oil moves appropriately in the circumferential direction in the passage groove 30d, and is discharged outside from the linking grooves 30f, . . . , 30f. Also, a part of the hydraulic oil in the passage groove 30d flows to the passage groove 31d formed in the other drive plate 31 through the grooves 21a, . . . , 21a of the inner periphery side rotor 11 and the gap 62 between the inner periphery side rotor 11 and the outer periphery side rotor 12, moves appropriately in the circumferential direction within the passage groove 31d, and is discharged from the linking grooves 31e, . . . , 31e. That is, the passage grooves 30e, . . . , 30e, the passage groove 30d, the passage grooves 30f, . . . , 30d, the grooves 21a, . . . , 21a, the passage groove 31d and the linking grooves 31e, . . . , 31e form the fluid passage 63 that links the actuator unit 61 and the gap 62 between the inner periphery side rotor 11 and the outer periphery side rotor 12. This fluid passage 63 extends from the gap 62 to the end face of the outer periphery side rotor 12 in the passage grooves 30f, . . . , 30f and the passage grooves 31e, . . . , 30e. The phase in the circumferential direction of the passage grooves 30f, . . . , 30f that form a part of the fluid passage 63 and are installed in one of the drive plates 30, is made to differ from the phase in the circumferential direction of the passage grooves 31e, . . . , 31e that form a part of the fluid passage 63 and are installed in the other drive plate 31.

In view of the above, the vane rotor 32 mentioned above, is integrally fixed and integrally rotatable with respect to the outer periphery side rotor 12, and is disposed on the inside of the inner periphery side rotor 11. Moreover, the vane rotor 32 is integrally fixed to the outer periphery side rotor 12 through the drive plates 30, 31 fixed to the outer periphery side rotor 12 so as to cover the two end faces in the axial direction of the outer periphery side rotor 12 and the inner periphery side rotor 11, and is also integrally installed with respect to the output shaft 16 that outputs the drive force of the outer periphery side rotor 12. Also, the groove 48 of the inner periphery side rotor 11, together with the vane rotor 32, defines the first pressure chamber 56 and the second pressure chamber 57. Furthermore, by controlling the supply/discharge of hydraulic oil, that is, by controlling the supply of hydraulic pressure to the first pressure chamber 56 and the second pressure chamber 57, the relative phase of the vane rotor 32 is changed with respect to the inner periphery side rotor 11, and as a result, the relative phase between the inner periphery side rotor 11 and the outer periphery side rotor 12 is changed. Here, the relative phase between the inner periphery side rotor 11 and the outer periphery side rotor 12 can be changed to the advance angle side or the lag angle side at least only for an electrical angle of 180°. The state of the electric motor 10 can be set to an appropriate state between the weak magnetic field state that occurs when the like magnetic poles of the permanent magnet 11a of the inner periphery side rotor 11 and the permanent magnet 12a of the outer periphery side rotor 12 are disposed to face each other, and the strong magnetic field state that occurs when the unlike poles of the permanent magnet 11a of the inner periphery side rotor 11 and the permanent magnet 12a of the outer periphery side rotor 12 are disposed to face each other.

Also, by fixing the drive plates 30, 31 that transmit the drive force of the outer periphery side rotor 12 to the output shaft 16 to the two end faces of the outer periphery side rotor 12 and the vane rotor 32 respectively in the axial direction, the inner periphery side rotor 11 is disposed so as to be rotatable in the circumferential direction in the space 58, shown in FIG. 3, between the outer periphery side rotor 12, the vane rotor 32 and the two drive plates 30, 31. The inner periphery side rotor 11 is installed in the floating condition and is made free to rotate in the space 58 only by the spring seals 44, . . . , 44 and the spring seals 50, . . . , 50 (that is, not fixed to the drive plates 30, 31 and the output shaft 16).

Figure 7A:
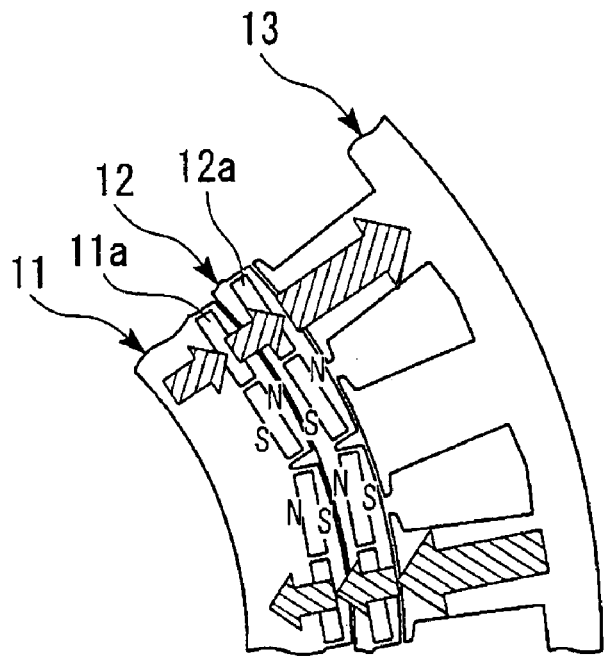
FIG. 7A schematically shows the strong magnetic field state of permanent magnets of the inner periphery side rotor and permanent magnets of the outer periphery side rotor disposed in an unlike-pole facing arrangement.
Figure 7B:
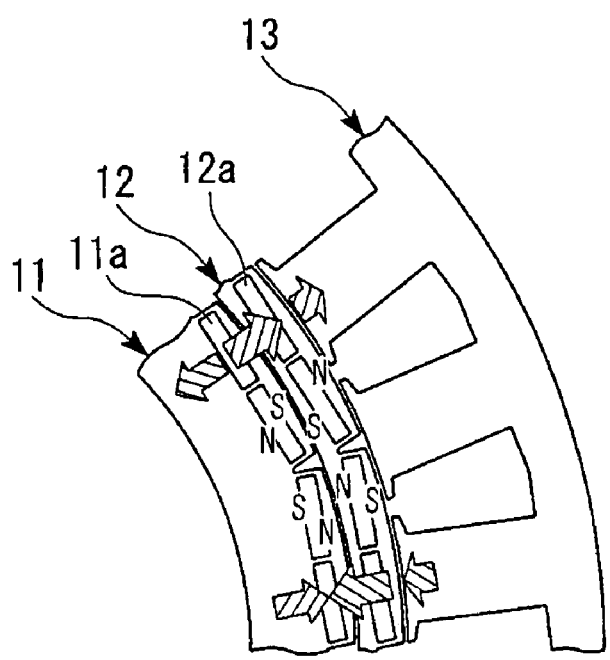
FIG. 7B schematically shows the weak magnetic field state of the poles of the permanent magnets of the inner periphery side rotor and the permanent magnets of the outer periphery side rotor disposed in a like-pole facing arrangement.
Figure 8:
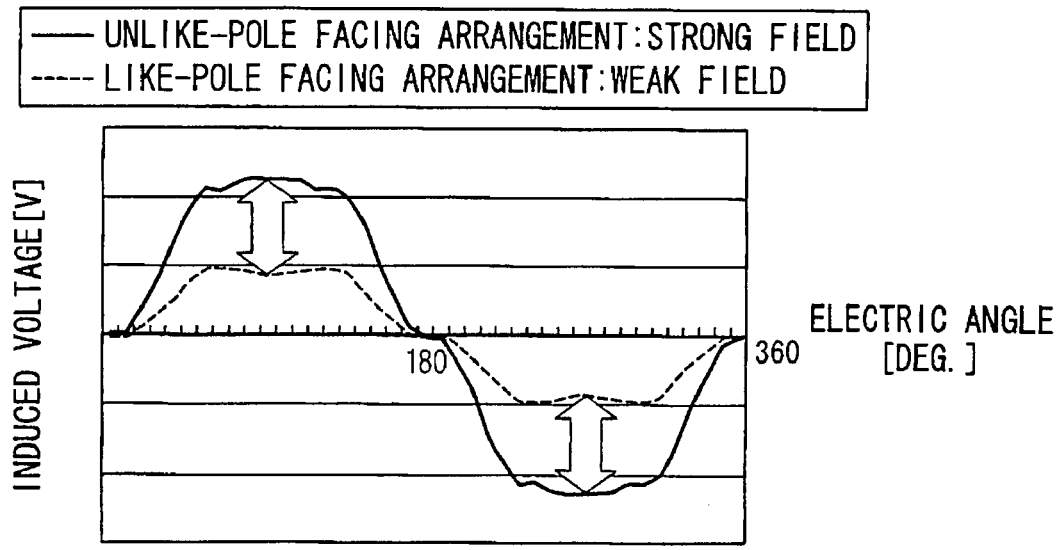
FIG. 8 is a graph showing the induced voltage in the strong magnetic field state and the weak magnetic field state shown in FIG. 7.

For instance, as shown in FIG. 7A, in the strong magnetic field state that occurs when the permanent magnet 11a of the inner periphery side rotor 11 and the permanent magnet 12a of the outer periphery side rotor 12 are disposed in an unlike-pole facing arrangement, and for instance, as shown in FIG. 7B, in the weak magnetic field state that occurs when the permanent magnet 11a of the inner periphery side rotor 11 and the permanent magnet 12a of the outer periphery side rotor 12 are disposed in a like-pole facing arrangement, the induced voltage constant Ke can be changed by changing the state of the electric motor 10 to a state between the strong magnetic field state and the weak magnetic field state by changing the magnitude of the induced voltage, for example, as shown in FIG. 8.

This induced voltage constant Ke, is the ratio of revolution speeds of the induced voltage induced in the ends of the stator coil 13a by the rotation of each of the rotors 11, 12, for instance. Moreover, it can be expressed by the product of number of pairs of poles p, the outside diameter of the motor R, the motor lamination thickness L, the flux density B and the number of turns T, as follows: $Ke = 8 \times p \times R \times L \times B \times T \times \pi$. By changing the state of the electric motor 10 to a state between the strong magnetic field state and the weak magnetic field state, the magnitude of the magnetic flux density B of the magnetic flux due to the permanent magnets 11a of the inner periphery side rotor 11 and the permanent magnets 12a of the outer periphery side rotor 12 changes, and thus the induced voltage constant Ke changes.

Figure 9A:
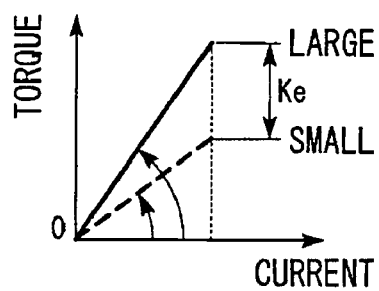
FIG. 9A is a graph showing a relationship between the electric current and torque of the electric motor that vary in response to the induced voltage constant Ke.

For example, as shown in FIG. 9A, the torque of the electric motor 10 is proportional to the product of the induced voltage constant Ke and the current that passes through the stator coil 13a (torque∝(Ke×current)).

Figure 9B:
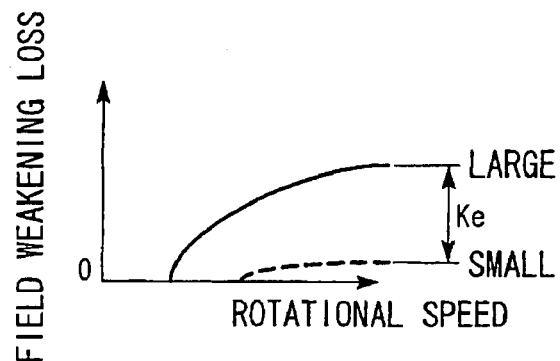
FIG. 9B is a graph showing the relationship between the revolution speed and the field weakening loss of the electric motor that vary in response to the induced voltage constant Ke.

Also, for example, as shown in FIG. 9B, since the field weakening loss of the electric motor 10 is proportional to the product of the induced voltage constant Ke and the revolution speed, (field weakening loss∝(Ke×revolution speed)), the allowable revolution speed of the electric motor 10 is inversely proportional to the product of the induced voltage constant Ke and the revolution speed (allowable revolution speed∝(1/(Ke×revolution speed))).

Figure 10:
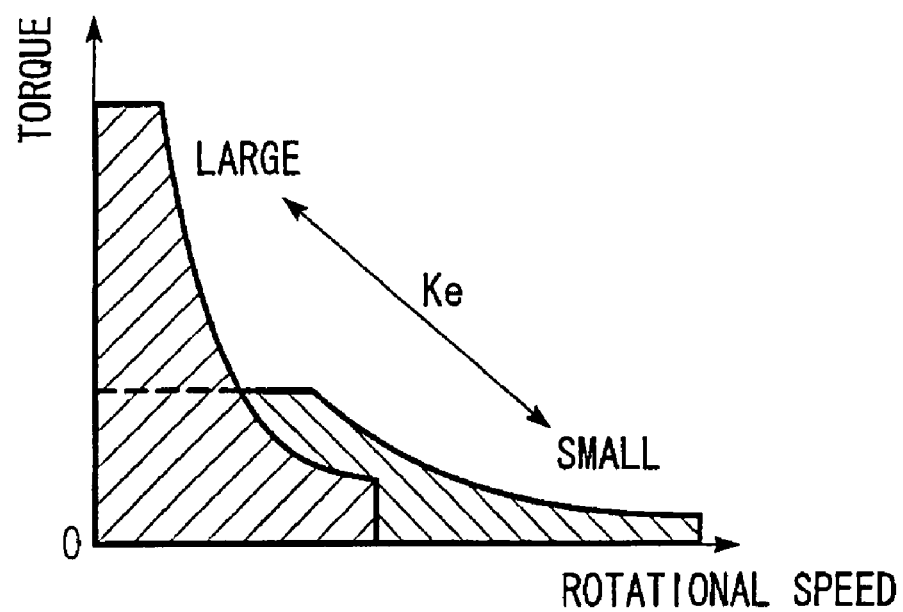
FIG. 10 shows the operable region for revolution speed and torque of the electric motor that varies in response to the induced voltage constant.

That is, for example, as shown in FIG. 10, in the electric motor 10 with a relatively large induced voltage constant Ke, although the operable revolution speed decreases relatively, a relatively large torque can be output. On the other hand, in the electric motor 10 with relatively small induced voltage constant Ke, although the torque that can be output is relatively small, the motor can be operated at a relatively high revolution speed, and the operable range for torque and revolution speed varies in response to the induced voltage constant Ke.

Figure 11A:
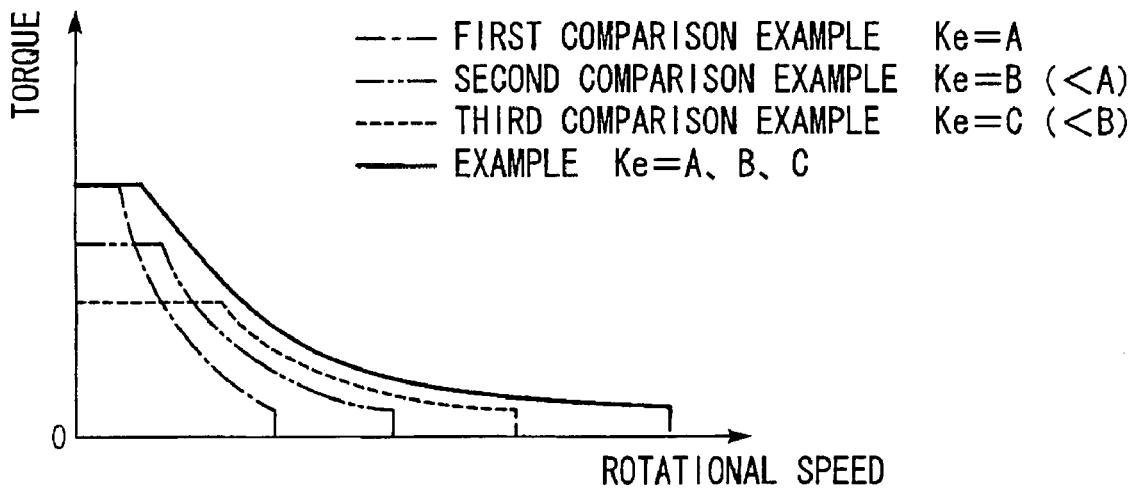
FIG. 11A is a graph showing the relationship between the electric current and the revolution speed of the electric motor that vary in response to the induced voltage constant Ke.

For this reason, as shown in the embodiment of FIG. 11A, for example, by setting the induced voltage constant Ke to vary with a decreasing trend (for instance, sequentially change from A, B(<A), (C<B) and so on) with the increase in the revolution speed of the electric motor 10, the operable range for torque and revolution speed expands compared to the case when the induced voltage constant Ke is not varied (for instance, in the first to third comparative examples).

Figure 11B:
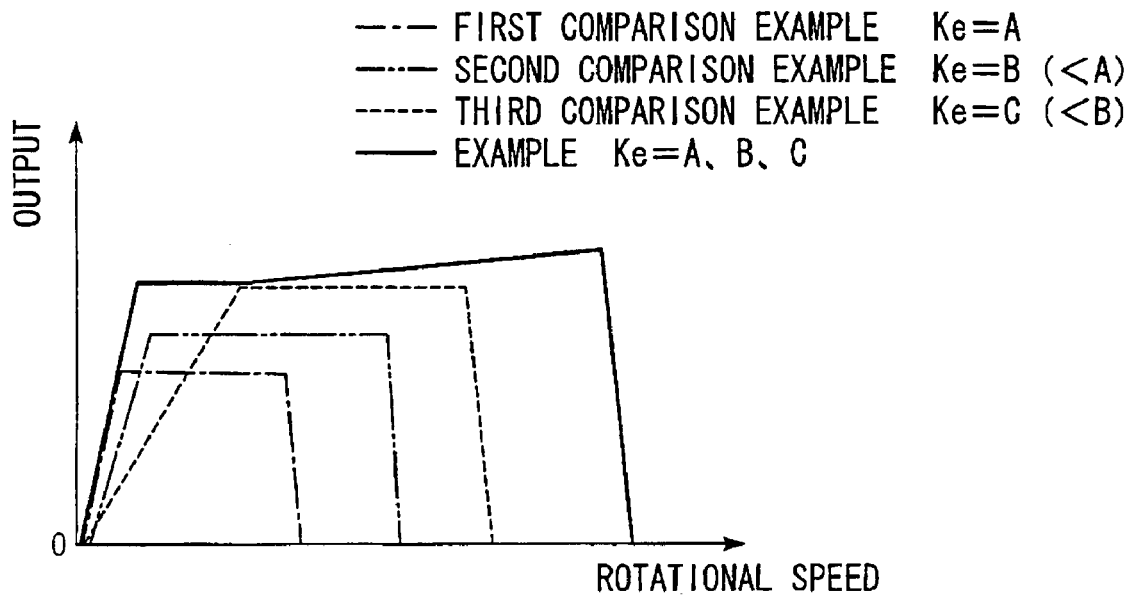
FIG. 11B is a graph showing the relationship between the revolution speed and the output of the electric motor that vary in response to the induced voltage constant Ke.

Also, the output of the electric motor 10 is proportional to the value obtained by subtracting the field weakening loss and other losses from the product of the induced voltage constant Ke, the current passing through the stator coil 13a, and the revolution speed (output∝(Ke×current×revolution speed–field weakening loss–other losses)). That is, for example, as shown in FIG. 11B, in the electric motor 10 with a relatively large induced voltage constant Ke, although the operable revolution speed decreases relatively, the output in a relative low revolution speed range increases. On the other hand, in the electric motor 10 with relatively small induced voltage constant Ke, although the output in a relatively low revolution speed range decreases, if the motor can be operated at a relatively high revolution speed, then the output at relatively high revolution speed increases, and the operable range for output and revolution speed varies in response to the induced voltage constant Ke. For this reason, by setting the induced voltage constant Ke to vary with a decreasing trend (for instance, sequentially change from A, B(<A), (C<B) and so on) with the increase in the revolution speed of the electric motor 10, the operable range for output and revolution speed expands compared to the case when the induced voltage constant Ke is not varied (for instance, in the first to third comparative examples).

Also, the efficiency of the electric motor 10 is proportional to the value obtained by subtracting the copper loss, the field weakening loss and other losses from the input power corresponding to the stator coil 13a, divided by the input power (efficiency∝((input power–copper loss–field weakening loss–other losses)/input power)).

For this reason, by selecting a relative large induced voltage constant Ke in the range from relatively small revolution speeds to intermediate revolution speeds, the electric current required for output of desired torque decreases, and thus copper loss decreases.

Also, by selecting a relative small induced voltage constant Ke in the range from intermediate revolution speeds to relatively high revolution speeds, the field weakening current decreases, and thus the field weakening loss decreases.

Figure 12A:
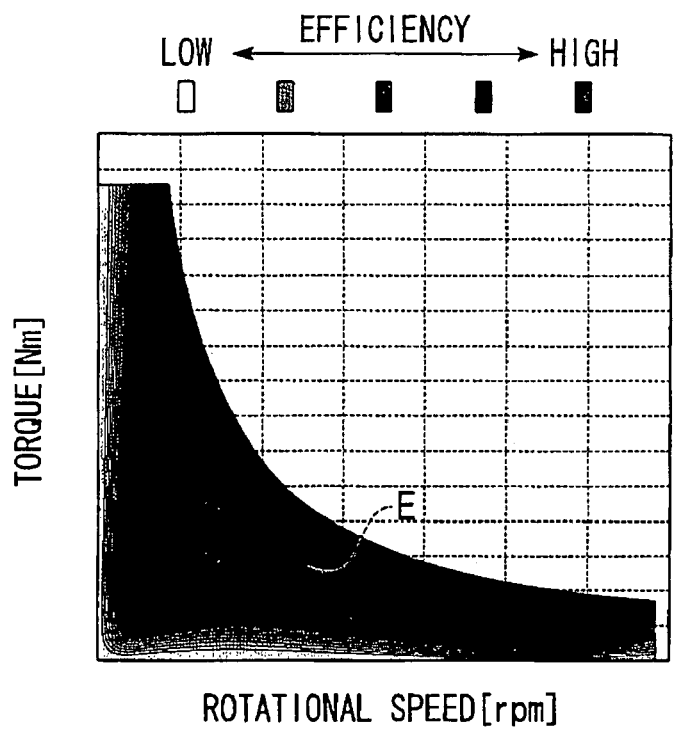
FIG. 12A shows the distribution of operable regions and efficiency for the revolution speed and the torque of the electric motor that vary in response to the induced voltage constant Ke in one example.
Figure 12B:
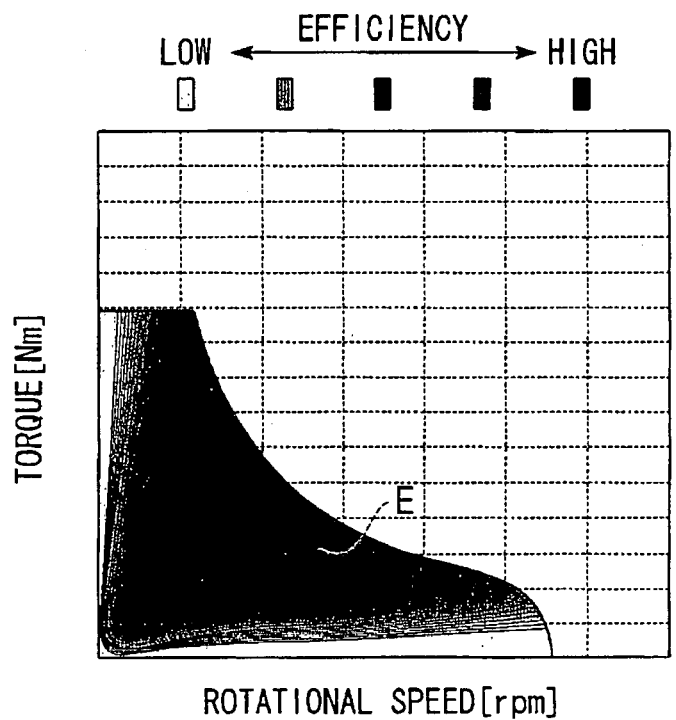
FIG. 12B shows the distribution of operable regions and efficiency for the revolution speed and the torque of the electric motor that vary in response to the induced voltage constant Ke in the second comparative example.

As a result, as shown in the embodiment of FIG. 12A, for example, by setting the induced voltage constant Ke to vary with a decreasing trend with the increase in the revolution speed of the electric motor 10, the revolution speed and the operable range for revolution speed expand compared to the case when the induced voltage constant Ke is not varied (for instance, in the second comparative example shown in FIG. 12B), and at the same time, the high efficiency range E in which the efficiency of the electric motor 10 increases above a specific efficiency expands; moreover, the value of maximum efficiency that can be achieved, also increases.

As mentioned above, according to the first embodiment, firstly, if permanent magnets 11a and permanent magnets 12a are disposed in the circumferential direction in the inner periphery side rotor 11 and in the outer periphery side rotor 12, for example, the magnetic flux due to the permanent magnets of the outer periphery side rotor 12 can increase or decrease with good efficiency the flux linkage amount linking the stator coil 13a by the magnetic flux due to the permanent magnets 11a of the inner periphery side rotor 11. In the strong magnetic field state, the torque constant (that is, torque/phase current) of the electric motor 10 can be set at a relatively high value. The maximum torque value output by the electric motor 10 can be increased without reducing the current loss during electric motor operation, or without changing the maximum value of the output current of the inverter controlling the current to the stator coil 13a.

Moreover, the rotating mechanism 14 is provided with a vane actuator that supplies/drains hydraulic oil for the first pressure chambers 56, . . . ., 56 and the second pressure chambers 57, . . . 57 defined on the inside of the inner periphery side rotor 11 by the vane rotor 32 and the inner periphery side rotor 11 installed integrally and rotatably with respect to the outer periphery side rotor 12, and thereby changes the relative phase between the inner periphery side rotor 11 and the outer periphery side rotor 12. Thus, the induced voltage constant can be varied easily and accurately at the desired timing while inhibiting any complexity of the electric motor 10. The result is that the range of operable revolution speed and the torque range can be expanded, the operating efficiency enhanced, and the operable range of high efficiency can be expanded.

Moreover, by controlling the quantity of hydraulic oil supplied to the first pressure chambers 56, . . . , 56, and the second pressure chambers 57, . . . , 57, the relative phase between the inner periphery side rotor 11 and the outer periphery side rotor 12 can be changed steplessly within the range of electrical angles of 180° between the strong magnetic field state and the weak magnetic field state.

Also, since the first pressure chambers 56, . . . , 56, and the second pressure chambers 57, . . . , 57 are defined on the inside of the inner periphery side rotor 11, the increase in thickness especially in the axial direction of the electric motor 10 can be inhibited so as to make the electric motor more compact.

Furthermore, since hydraulic oil is supplied to the first pressure chambers 56, . . . , 56, and the second pressure chambers 57, . . . , 57 through the passage holes 35c, . . . , 35c and the passage holes 35d, . . . , 35d formed in the vane rotor 32, compactness and low costs can be achieved compared to the case when separate piping systems are installed.

More specifically, if hydraulic oil is discharged from the second pressure chambers 57, . . . , 57 while hydraulic oil is supplied to the first pressure chambers 56, . . . , 56, which are defined by the blades 36, . . . , 36 of the vane rotor 32 and the grooves 48, . . . , 48 of the inner periphery side rotor 11, the relative phase between the inner periphery side rotor 11 and the vane rotor 32 can be changed in the direction of expansion of the first pressure chambers 56, . . . , 56. As a result, the relative phase between the inner periphery side rotor 11 and the outer periphery side rotor 12 integrally installed with the vane rotor 32 can be changed, and a weak magnetic field state can be obtained. On the other hand, conversely, if hydraulic oil is discharged from the first pressure chambers 56, 56 while hydraulic oil is supplied to the second pressure chambers 57, . . . , 57, the relative phase between the inner periphery side rotor 11 and the vane rotor 32 is changed in the direction of expansion of the second pressure chambers 57, . . . , 57. The result is that the relative phase between the inner periphery side rotor 11 and the outer periphery side rotor 12 is changed, and a strong magnetic field state occurs. In this way, since a simple vane actuator mechanism provided with vane rotor 32 and the first pressure chambers 56 and second pressure chamber 57 is used as the rotating mechanism 14, the induced voltage constant can be varied easily and accurately at the desired timing while properly inhibiting any complexity of the electric motor 10.

Moreover, the vane rotor 32 is integrally installed with the outer periphery side rotor 12 through the drive plates 30, 31 fixed to the outer periphery side rotor 12 so as to cover the end faces in the axial direction. Furthermore, since it is also integrally installed with the output shaft 16 that outputs the drive force of the outer periphery side rotor 12, the rotation of the outer periphery side rotor 12 can be transmitted directly to the output shaft 16. On the other hand, the pressure of hydraulic oil supplied to the first pressure chambers 56, . . . , 56 and the second pressure chambers 57, . . . , 57, is used mainly for changing the relative phase between the inner periphery side rotor 11 and the vane rotor 32, that is for changing the relative phase between the inner periphery side rotor 11 and the outer periphery side rotor 12. Consequently, the required pressure generated by the hydraulic oil can be restricted to a low value.

Also, since the first pressure chambers 56, . . . , 56, and the second pressure chambers 57, . . . , 57 are defined on the inside of the inner periphery side rotor 11, the hydraulic oil of the first pressure chambers 56, . . . , 56, and the second pressure chambers 57, . . . , 57 takes away the heat in the inner periphery of the inner periphery side rotor 11 through the housing 33 and cools it.

A fluid passage 63 is also provided to link the actuator unit 61 and the gap 62 between the inner periphery side rotor 11 and the outer periphery side rotor 12. Thus, using the hydraulic oil for activating the actuator unit 61, the heat in the inner periphery side rotor 11 and the outer periphery side rotor 12 can be taken away and these rotors can be cooled. More specifically, the hydraulic oil of the second pressure chambers 57, . . . , 57 moves outside on account of the centrifugal force due to the rotation of the outer periphery side rotor 12 and the inner periphery side rotor 11, passes through the passage grooves 30e, . . . , 30e of the drive plate 30, and reaches the circular shaped passage groove 30d. A part of this hydraulic oil passes through the passage groove 30d, takes away the heat on one side of the outer periphery of the inner periphery side rotor in the axial direction, and then passes through the passage grooves 30f, . . . , 30f in radial form, takes away the heat on one side of the outer periphery side rotor in the axial direction, and is discharged outside. A part of the hydraulic oil that has reached the passage groove 30d, passes through the grooves 21a, . . . 21a, passes through the gap between the inner periphery side rotor 11 and the outer periphery side rotor 12, and reaches the circular shaped passage groove 31d of the other drive plate 31 while taking away the heat from the outer periphery of the inner periphery side rotor 11 and the heat from the inner periphery of the outer periphery side rotor 12. The hydraulic oil passes through the passage groove 31d, takes away the heat from the outer periphery and on the opposite side in the axial direction of the inner periphery side rotor 11, passes through the passage grooves 31e, . . . , 31e in radial form, takes away the heat on the opposite side in the axial direction of the outer periphery side rotor 12, and is discharged outside. Moreover, the discharged hydraulic oil falls mainly on the stator coil 13a of the stator 13 due to centrifugal force, and it takes away the heat from the stator. In certain cases, the fluid passage 63 may be formed only on any one of the drive plates 30, 31 (that is, the fluid passage 63 may be formed on at least one of the drive plates 30, 31).

Furthermore, since notches 47c, . . . 47c are formed that enable the passage holes 35d, . . . , 35d, and the passage grooves 30c, . . . , 30e to always remain open to the second pressure chambers 57, . . . 57 regardless of the relative position of the vane rotor 32 in the walls 47B, . . . , 47B of the second pressure chambers 57, . . . , 57 linking to the fluid passage 63, and fluid can always flow to the fluid passage 63 so that cooling is satisfactory.

Furthermore, since fluid passage 63 is formed in the pair of drive plates 30, 31 fixed integrally to the vane rotor 32 and the outer periphery side rotor 12 so as to cover both end faces of the inner periphery side rotor 11 in the axial direction, a more compact electric motor with reduced costs can be obtained compared to the case when separate piping system is installed.

Moreover, since the phases in the circumferential direction of the passage grooves 30f, . . . , 30f installed in one of the drive plates 30 and the passage grooves 31e, . . . , 31e installed in the other drive plate 31 are mutually different, the fluid passage 63 can cool the outer periphery side rotor 12 to an average level.

The rotating mechanism is activated by the fluid and it rotates at least either the inner periphery side rotor 11 or the outer periphery side rotor 12 around the rotational axis. Therefore, if the relative phase between the inner periphery side rotor 11 and the outer periphery side rotor 12 can be changed, then it can be used in various other applications.

The features of the electric motor of the first embodiment described above can be summarized as shown below.

(1-1) An electric motor provided with: an inner periphery side rotor provided with inner peripheral permanent magnets disposed along a circumferential direction thereof; an outer periphery side rotor provided with outer peripheral permanent magnets disposed along a circumferential direction thereof such that a rotational axis thereof is coaxial with a rotational axis of the inner periphery side rotor; and a rotating device that can change a relative phase between the inner periphery side rotor and the outer periphery side rotor by rotating at least the inner periphery side rotor or the outer periphery side rotor about the rotational axis, wherein the rotating device is provided with: an actuator unit that rotates upon receiving pressure of fluid supplied from an external source; and a fluid passage that links the actuator unit and a gap between the inner periphery side rotor and the outer periphery side rotor.

According to the electric motor mentioned above, by disposing permanent magnets in the circumferential direction in the inner periphery side rotor and the outer periphery side rotor, for example, the flux linkage amount of the magnetic flux from the permanent magnets of the outer periphery side rotor linking the stator coils, can be efficiently increased or decreased by the magnetic flux from the permanent magnets of the inner periphery side rotor. In the strong magnetic field state, the torque constant (that is, torque/phase current) of the electric motor can be set at a relatively high value. The maximum torque value output by the electric motor can be increased without reducing the current loss during electric motor operation, or without changing the maximum value of the output current of the inverter controlling the current to the stator coils.

Also, since the rotating device is provided with an actuator unit that rotates upon receiving pressure of the fluid supplied from the outside, the induced voltage constant can be varied easily and accurately at the desired timing while inhibiting any complexity in the electric motor. As a result, the operable revolution speed range and the torque range expand, the operating efficiency increases, and the range of operation at high efficiency can also be expanded.

Moreover, since a fluid passage is also provided to link the actuator unit and the gap between the inner periphery side rotor and the outer periphery side rotor, using the fluid for activating the actuator unit, the heat in the inner periphery side rotor and the outer periphery side rotor can be taken away and these rotors can be cooled.

(1-2) The electric motor according to (1-1) that supplies fluid to the pressure chamber through the passage holes formed in the vane rotor, wherein
the actuator unit is provided with:
a pressure chamber installed in either the inner periphery side rotor or the outer periphery side rotor and which supplies the fluid; and
a vane rotor integrally installed in the other of the inner periphery side rotor and the outer periphery side rotor and disposed inside the pressure chamber that rotates with the rotational axis as the central axis of the inner periphery side rotor and the outer periphery side rotor upon receiving fluid pressure.

According to this electric motor, the actuator unit is an actuator provided with a pressure chamber that supplies the fluid, and a vane rotor disposed in the pressure chamber that rotates upon receiving fluid pressure. Thus, the induced voltage constant can be varied easily and accurately at the desired timing while inhibiting any complexity of the electric motor. As a result, the operable revolution speed range and the torque range can be expanded, the operating efficiency enhanced, and the range of operable revolution speed at high efficiency can be expanded.

Also, by controlling the quantity of hydraulic fluid supplied to the pressure chamber, the relative phase between the inner periphery side rotor and the outer periphery side rotor can be changed to the desired phase.

Moreover, since fluid is supplied to the pressure chamber through the passage holes formed in the vane rotor, the motor can be made more compact, and its costs can be reduced compared to the case when separate piping system is installed.

(1-3) The electric motor according to (1-2), wherein notches are formed in the wall of the pressure chamber that enable the fluid passage to remain always open to the pressure chamber regardless of the relative position of the vane rotor.

According to this electric motor, since notches are formed in the wall of the pressure chamber that enable the fluid passage to remain always open to the pressure chamber regardless of the relative position of the vane rotor, fluid can be made to flow through the fluid passage smoothly at all times, and cooling can be performed satisfactorily.

(1-4) The electric motor according to (1-2) or (1-3), wherein the fluid passage is formed in at least one end plate of a pair of end plates fixed integrally with the vane rotor and the outer periphery side rotor so as to cover the two end faces of the inner periphery side rotor in the axial direction.

According to this electric motor, a fluid passage is formed in at least one of the pair of end plates fixed integrally to the vane rotor and the outer periphery side rotor so as to cover the two end faces of the inner periphery side rotor in the axial direction. Thus, the electric motor can be made more compact and of lower costs compared to the case when a separate piping system is installed.

(1-5) The electric motor according to (1-4), wherein the second fluid passage extending from the gap to the end face of the outer periphery side rotor is formed in at least one of the pair of end plates.

According to this electric motor, the outer periphery side rotor can be cooled from the end face side by the second fluid passage extending from the gap to the end face of the outer periphery side rotor.

(1-6) The electric motor according to (1-5), wherein the second fluid passage is formed in both end plates of the pair of end plates, and the phase in the circumferential direction of the second fluid passage installed in one of the end plates differs from the phase in the circumferential direction of the second fluid passage installed in the other end plate.

According to this electric motor, since the phase of the second fluid passage installed in one of the end plates differs from the phase of the second fluid passage installed in the other end plate in the circumferential direction, average cooling of the outer periphery side rotor can be performed.

Second Embodiment

An electric motor according to a second embodiment of the present invention will be described below with reference to FIG. 13 to FIG. 22B.

Figure 13:
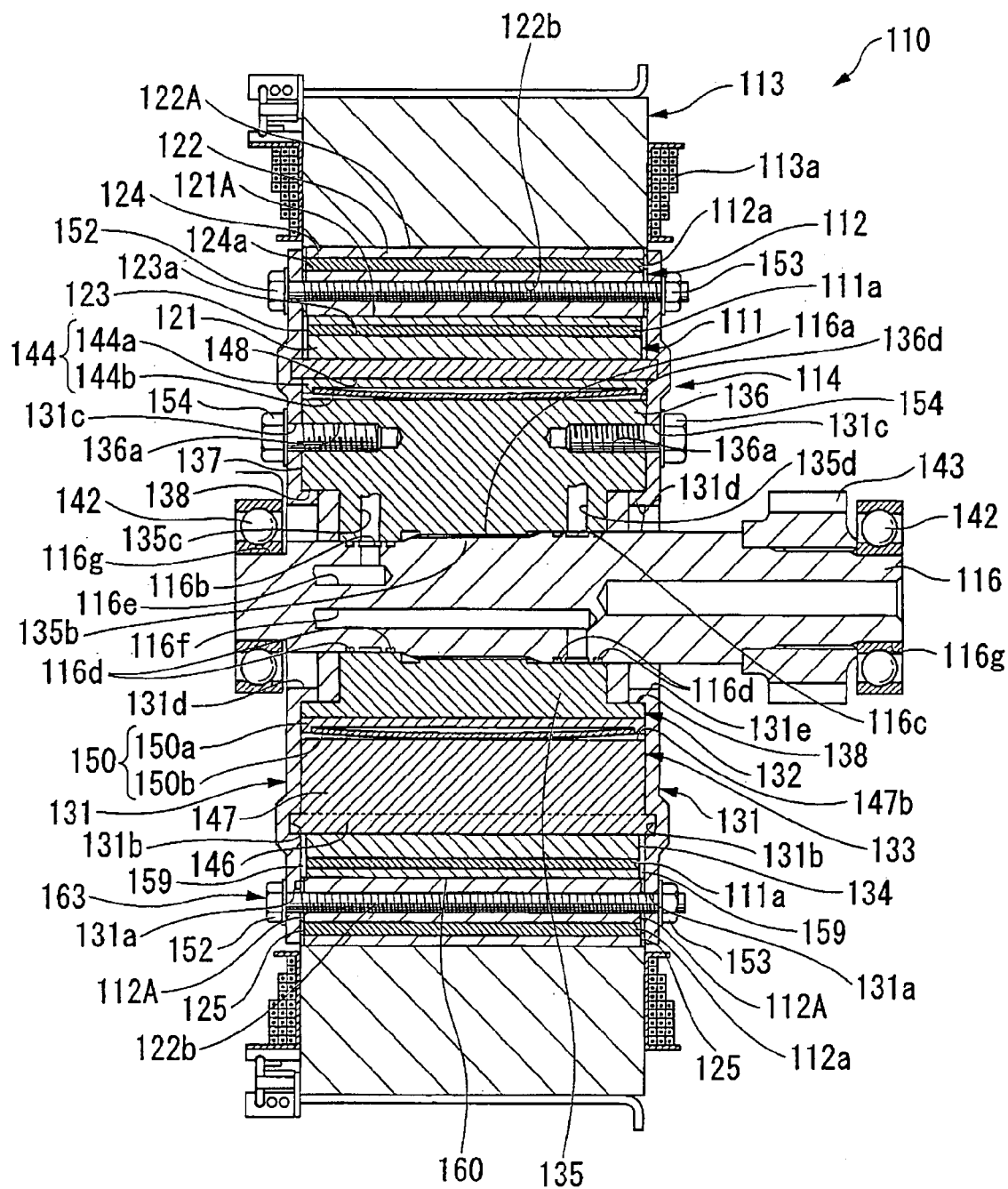
FIG. 13 is a cross-sectional view of an essential portion of an electric motor according to a second embodiment of the present invention.
Figure 14:
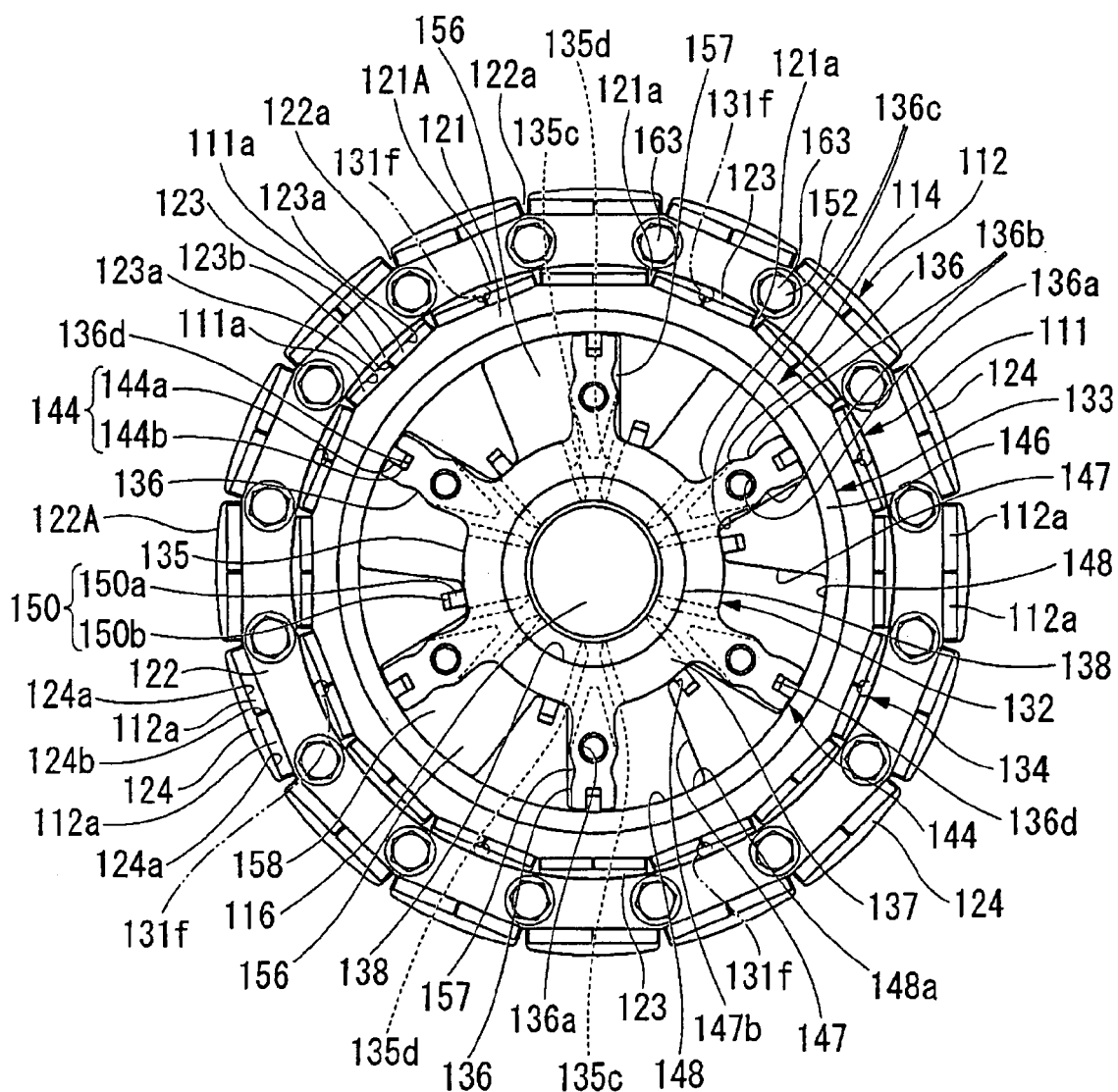
FIG. 14 is an elevation view showing an inner periphery side rotor and an outer periphery side rotor, without a drive plate in front, indicating the weak magnetic field state of a rotating mechanism of the electric motor.

As shown in FIG. 13 and FIG. 14, an electric motor 110 according to the present embodiment is a brushless DC motor provided with an inner periphery side rotor 111 in substantially circular shape rotatably installed to rotate with its center on the rotational axis of the electric motor 110, an outer periphery side rotor 112 in substantially circular shape rotatably installed to rotate with its center on the same rotational axis coaxially and installed radially outward with respect to the inner periphery side rotor 111, with its position aligned in the direction of the rotational axis, a stator 113 with stator coil 113a shown in FIG. 13 with multiple phases that generate rotating magnetic field which rotates the inner periphery side rotor 111 and the outer periphery side rotor 112, a rotating mechanism (rotating device) 114 connected to the inner periphery side rotor 111 and the outer periphery side rotor 112 that changes the relative phase between the inner periphery side rotor 111 and outer periphery side rotor 112 by the hydraulic pressure (fluid pressure) of the hydraulic oil (hydraulic fluid), which is a non-compressible fluid, and a hydraulic control device (not shown in the figures) that controls the hydraulic pressure to the rotating mechanism 114. If this electric motor 110 is provided as a drive source in a vehicle such as a hybrid vehicle or an electric vehicle, the output shaft (rotating shaft)) 116 is connected to the input shaft of the transmission unit (not shown in the figures), and the drive force of the electric motor 110 transmits the drive force to the drive wheels (not shown in the figures) of the vehicle through the transmission unit.

When the drive force is transmitted from the drive wheels to the electric motor 110 during deceleration of the vehicle, the electric motor 110 functions as a generator, that is, it generates regenerative braking force and recovers the kinetic energy of the vehicle as electric energy (regenerated energy).

Moreover, for instance, in a hybrid vehicle, the rotational axis of this electric motor 110 is linked to the crankshaft of the internal combustion engine (not shown in the figures), and the electric motor 110 functions as a generator even when the output of the internal combustion engine is transmitted to the electric motor 110, and it generates energy.

The inner periphery side rotor 111 is disposed such that its rotational axis is coaxial with the rotational axis of the electric motor 110. As shown in FIG. 14, it is provided with an inner peripheral rotor core 121 of substantially circular shape. Multiple (more specifically, at 16 locations) inner peripheral magnet mounting attachments 123, ..., 123 at specific pitch are provided in the circumferential direction in a part of the outer periphery in the inner peripheral rotor core 121. Also, grooves 121a extending parallel to the rotational axis are formed in concave shape in the radial direction at intermediate positions in all the adjacent inner peripheral magnet mounting attachments 123, 123 in the circumferential direction on the outer peripheral surface 121A of the inner peripheral rotor core 121. The inner peripheral rotor core 121 may be formed, for instance, by sintering.

A pair of through magnet attachment holes 123a, 123 is provided parallel to the rotational axis of the inner peripheral rotor core 121 in each inner peripheral magnet mounting attachments 123, ..., 123. A pair of magnet attachment holes 123a, 123a having substantially rectangular cross section with respect to the direction parallel to the rotational axis is formed, with the holes disposed on the same plane adjacent to each other in the circumferential direction through the center rib 123b. This plane is perpendicular to the radial line joining the center rib 123b and the rotational axis. Permanent magnets 111a of substantially plate form extending parallel to the rotational axis are provided in each of the magnet attachment holes 123a, 123a.

All the permanent magnets 111a mounted in the magnet attachment holes 123a, ..., 123a are magnetized similarly in the thickness direction (that is, in the radial direction of each rotor 111, 112). The pair of permanent magnets 111a, 111a mounted in the pair of magnet attachment hole 123a, ..., 123a provided in the same inner peripheral magnet mounting attachment 123 is set such that the magnetization direction is mutually same. Adjacent inner peripheral magnet mounting attachments 123, ..., 123 in the circumferential direction are set such that a pair of permanent magnets 111a, 111a mounted in one mounting attachment has the magnetization direction different from that of the pair of permanent magnets 111a, 111a in the other mounting attachment, in all the inner peripheral magnet mounting attachments 123, 123. That is, the inner peripheral magnet mounting attachment 123 with a pair of permanent magnets 111a, 111a mounted with the outer periphery as the S-pole is placed adjacent in the circumferential direction to the inner peripheral magnet mounting attachment 123 with a pair of permanent magnets 111a, 111a mounted with the outer periphery as the N-pole, through the groove 121a.

Thus, as mentioned above, the inner periphery side rotor 111 is provided with multiple permanent magnets 111a, ..., 111a disposed in the circumferential direction.

The outer periphery side rotor 112 is also disposed such that its rotational axis is coaxial with the rotational axis of the electric motor 110. Thus, it is provided with an outer peripheral rotor core 122 of substantially circular shape. Multiple outer peripheral magnet mounting attachments 124, ..., 124 of the same number as the inner peripheral magnet mounting attachments 123, ..., 123 mentioned above, are provided at specific pitch in the circumferential direction in a part of this outer periphery of the outer peripheral rotor core 122. Also, grooves 122A extending parallel to the rotational axis are formed in concave shape in the radial direction at intermediate positions in all the adjacent outer peripheral magnet mounting attachments 124, 124 in the circumferential direction on the outer peripheral surface 122A of the outer peripheral rotor core 122.

Also, bolt insertion hole 122b, which enables through-bolting in the axial direction, as shown in FIG. 13, is provided on the inner diameter side, that is, at each intermediate position of adjacent outer peripheral magnet mounting attachments 124, ..., 124 of each groove 122a, ..., 122a of the outer peripheral rotor core 122. The outer peripheral rotor core 122 may also be formed, for instance, by sintering.

A pair of through magnet attachment holes 124a, 124a is provided parallel to the rotational axis in each outer peripheral magnet mounting attachment 124, ..., 124. A pair of magnet attachment holes 124a, 124a having substantially rectangular cross section with respect to the direction parallel to the rotational axis is formed, with the holes disposed on the same plane adjacent to each other in the circumferential direction through the center rib 124b. This plane is perpendicular to the radial line joining the center rib 124b and the rotational axis. Permanent magnets 112a of substantially plate form extending parallel to the rotational axis are provided in each of the magnet attachment holes 124a, 124a.

All the permanent magnets 112a mounted in each of the magnet attachment holes 124a, ..., 124a are magnetized similarly in the thickness direction (that is, in the radial direction of each rotor 111, 112). The pair of permanent magnets 124a, 124a mounted in the pair of magnet attachment holes 124a, ..., 124a provided in the same outer peripheral magnet mounting attachment 124, is set such that the magnetization direction is mutually same. Adjacent outer peripheral magnet mounting attachments 124, ..., 124 in the circumferential direction are set such that a pair of permanent magnets 112a, 112a mounted in one mounting attachment has the magnetization direction different from that of the pair of permanent magnets 112a, 112a in the other mounting attachment, in all the outer peripheral magnet mounting attachments 124, 124. That is, the outer peripheral magnet mounting attachment 124 with a pair of permanent magnets 112a, 112a mounted with the outer periphery as the N-pole is placed adjacent in the circumferential direction to the outer peripheral magnet mounting attachment 124 with a pair of permanent magnets 112a, 112a mounted with the outer periphery as the S-pole, through the groove 122a.

Thus, as mentioned above, the outer periphery side rotor 112 is also provided with multiple permanent magnets 112a, ..., 112a disposed in the circumferential direction.

The inner peripheral magnet mounting attachments 123, ..., 123 of the inner periphery side rotor 111 and the outer peripheral magnet mounting attachments 124, ..., 124 of the outer periphery side rotor 112 are disposed such that they face each other in the radial direction of each rotor 111, 112. In this state when the attachments face each other, all the pairs of permanent magnets 111a, 111a have their phases aligned with any of the pairs of permanent magnets 112a, 112a in the direction of rotation such that there is a one-to-one correspondence. In the case of all the grooves 121a, ..., 121a in the inner periphery side rotor 111 and the grooves 122a, ..., 122a in the outer periphery side rotor 112 also, all the grooves 121a, ..., 121a are aligned in phase in the direction of rotation with any of the corresponding grooves 122a in a one-to-one correspondence.

Figure 16:
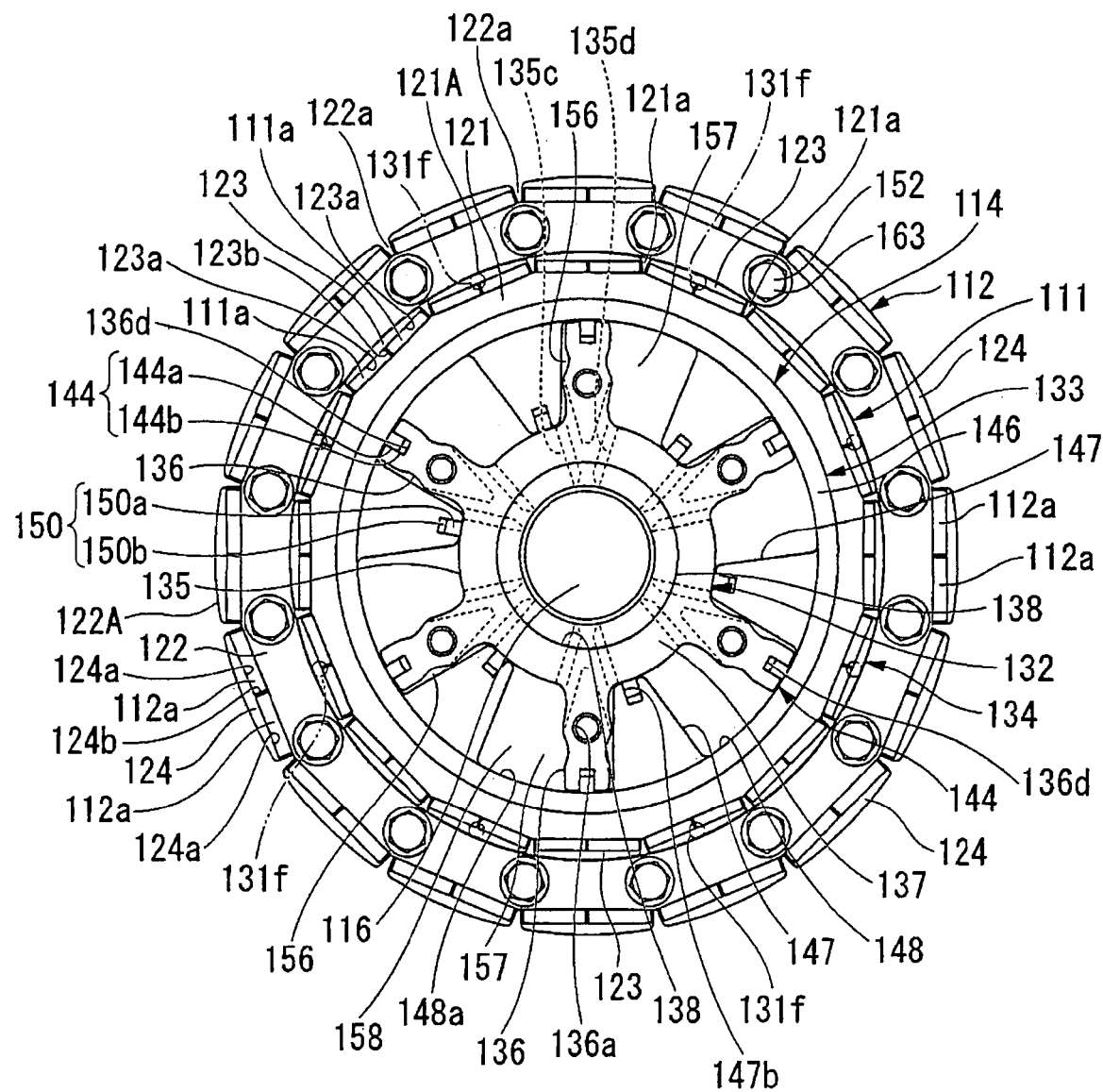
FIG. 16 is an elevation view showing the inner periphery side rotor and the outer periphery side rotor, without the drive plate in front, and indicating the strong magnetic field state of the rotating mechanism of the electric motor.

As a result, depending on the relative position of the inner periphery side rotor 111 and the outer periphery side rotor 112 around the rotational axis, the state of the electric motor 110 can be changed from the weak magnetic field state shown in FIG. 14 wherein the field becomes weakest when the like poles of permanent magnets 111a, 111a that form pairs and the permanent magnets 112a, 112a that form pairs face each other (that is, when the permanent magnets 111a, 111a that form pairs and the permanent magnets 112a, 112a that form pairs are in a like-pole facing arrangement) to an appropriate state that extends to the strong magnetic field state shown in FIG. 16 wherein the field becomes strongest when the unlike poles of permanent magnets 111a, 111a that form pairs and the permanent magnets 112a, 112a that form pairs face each other (that is, when the permanent magnets 111a, 111a that form pairs and the permanent magnets 112a, 112a that form pairs are in an unlike-pole facing arrangement) in all the permanent magnets 111a, 111a of the inner periphery side rotor 111 and all the permanent magnets 112a, 112a of the outer periphery side rotor 112.

Here, the stator 113 shown in FIG. 13 is formed with a substantially circular shape and disposed to face the outer periphery of the outer periphery side rotor 112; for instance, it may be fixed to the housing (not shown in the figures) of the transmission unit of a vehicle.

Next, the rotating mechanism 114 that changes the relative phase between the inner periphery side rotor 111 and the outer periphery side rotor 112, as mentioned above, is described here.

As shown in FIG. 13, the rotating mechanism 114 of the present embodiment is provided with a pair of drive plates (end plates) 131, 131 of circular shape connected and fixed through shims 125 to the end faces 112A, 112A on both sides of the outer periphery side rotor 112 in the axial direction so as to cover the space internal space of the outer periphery side rotor 112, a vane rotor 132 integrally mounted on the inside of the outer periphery side rotor 112 by being directly held between the drive plates 131, 131, and the housing 133 that includes a part inside the inner periphery side rotor 111 disposed in the space between the vane rotor 132, the outer periphery side rotor 112 and the drive plates 131, 131. The vane rotor 132 and the housing 133 may be formed, for instance, by sintering.

Figure 15A:
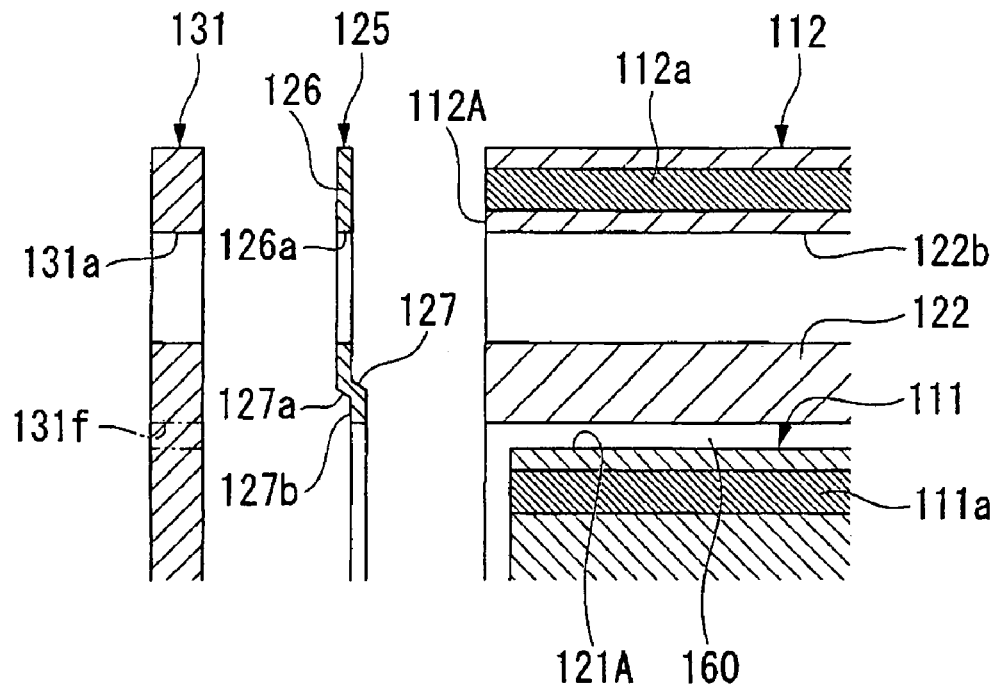
FIG. 15A and FIG. 15B show the around of bolt connected parts of the outer periphery side rotor and the drive plate of the electric motor.
Figure 15B:
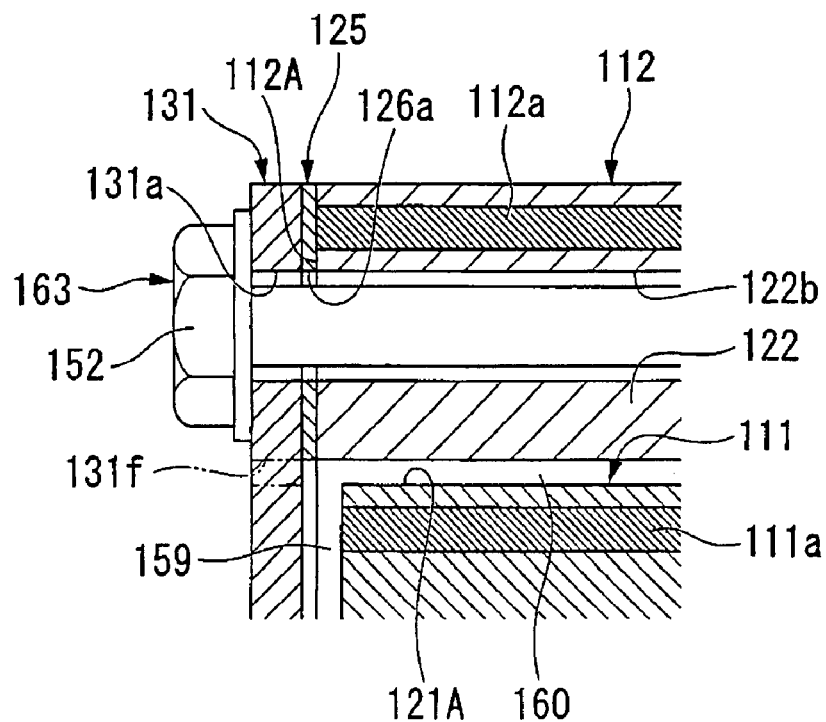

Multiple (same number as the number of bolt insertion holes 122b) through bolt insertion holes 131a . . . , 131a in the axial direction are formed in parts of the outer periphery of the pair of drive plates 131, 131 at equidistant spacing on the same circumference. Annular groove 131b of concave shape in the axial direction is formed on one side more toward the inside than the bolt insertion holes 131a, . . . , 131a. Multiple through bolt insertion holes 131c, . . . , 131c in the axial direction are formed in the drive plate 131 at equidistant spacing on the same circumference, more toward the inside than the annular groove 131b. Also, cylinder 131d that protrudes in circular shape along the axial direction is formed on the same side as the annular groove 131b at the center of the drive plate 131 inside the bolt insertion holes 131c, . . . , 131c. A through center hole 131e is formed in the axial direction inside this annular groove. Moreover, through holes 131f, . . . , 131f slightly more toward the central axis than the bolt insertion holes 131a . . . , 131a are formed in the drive plate 131 at equidistant spacing on the same circumference, as shown in FIG. 15A and FIG. 15B. All the through holes 131f, . . . , 131f are formed at intermediate positions (specifically, at the center) of the adjacent bolt insertion holes 131a, 131a.

Each shim in the pair of shims 125, 125 is generally circular in shape, and includes a flat plate 126 of circular shape perpendicular to the central axis, and a bead (curved part) 127 that curves and extends inward in stepped shape in the axial direction from all around the inner circumferential edge of this flat plate 126. Multiple (same number as the bolt insertion holes 131a) through bolt insertion holes 126a, . . . , 126a in the axial direction are formed at equidistance spacing on the same circumference in the flat plate 126. Here, the bead 127 forms a stepped shape from the flat plate 126 on one side in the axial direction, that is, it is a so-called half bead. More specifically, it is provided with a tapered plate 127a of circular shape extending inward at an inclination from the flat plate 126, and an inner end plate 127b of circular shape extending parallel to the flat plate 126 inward from the inner circumferential edge of the tapered plate 127a. This bead 127 is made to deform to the same flat shape as the flat plate 126 generally when it is held between the drive plate 131 and the outer periphery side rotor 112, comes in close contact with the drive plate 131 and the outer periphery side rotor 112 by the elastic force that occurs at this stage, and seals the gap between the two. A so-called full bead may be used, which forms a stepped shape on both sides in the axial direction.

As shown in FIG. 14, the vane rotor 132 is provided with a circular-shaped boss 135, and multiple (same number as the bolt insertion hole 131c mentioned above (more specifically, at 6 locations)) blades 136, . . . , 136 that extend outward in the radial direction from positions at equidistant spacing such as in the circumferential direction on the outer peripheral surface of the boss 135.

On either side in the axial direction of the boss 135, a sandwiched base 137 with the same length in the axial direction as the blades 136, . . . , 136 is formed on the outer periphery, and a concave shaped step 138 in stepped shape is formed in the inner periphery more inside the rotational axis than the sandwiched base 137. A connecting spline 135b is formed on the inner diameter side of the boss 135 at an intermediate position in the axial direction, as shown in FIG. 13. More to one side in the axial direction than the connecting spline 135b, through passage holes 135c, . . . , 135c are formed on the same one side in the direction of rotation of the base end of the blade 136 closest to the inner periphery at the position of each blade 136, . . . , 136, as shown in FIG. 14. Through passage holes 135d, . . . , 135d are formed on the same opposite side in the direction of rotation of the base end of the blade 136 closest to the inner periphery at the position of each blade 136, . . . , 136, more to the opposite side in the axial direction than the connecting spline 135b.

As shown in FIG. 13, output shaft 116 that transmits the drive force of the outer periphery side rotor 112 is fitted on the inner diameter side of the vane rotor 132. The output shaft 116 includes a connecting spline 116a connected to the connecting spline 135b of the boss 135, an annular linking groove 116b that links all the passage holes 135c of the boss 135 in the joined condition with the connecting spline 116a, and annular linking groove 116c that links all the passage holes 135d in the same state, and sealing grooves 116d, . . . , 116d formed at both outside positions of each of the linking grooves 116b, 116c. These sealing grooves 116d, . . . , 116d are provided with seal rings (not shown in the figures) for sealing the gap with the vane rotor 132. Also, passage hole 116e for supply/drainage of hydraulic oil for the linking groove 116b passing through the interior part of the shaft 116, and passage hole 116f for supply/drainage of hydraulic oil for the linking groove 116c are formed on the output shaft 116. Also, on this output shaft 116, bearing mating parts 116 for mating a pair of bearings 142, 142 held in the housing of the transmission unit of a vehicle for instance, are formed on the protruding part more on the outside in the axial direction than the drive plates 131, 131. On the drive plate 131 side of one of the bearing mating parts 116g, gear 143 for transmitting the rotation of the output shaft 116 is connected by spline.

The blades 136, . . . , 136 are of substantially plate form, and as shown in FIG. 14, through screw holes 136a are formed in the axial direction at the intermediate position. A pair of concave-shaped parts 136b, 136b with the overall length in the axial direction are formed more toward the outer periphery than the position of formation of screw hole 136a on both side faces in the circumferential direction. Also, concave-shaped parts 136c, 136c with the overall length in the axial direction are formed more toward the inside than the position of formation of screw hole 136. Moreover, concave shaped seal retaining groove 136d with the overall length in the axial direction is formed from the outer peripheral surface toward the center on the outer peripheral surface of each of the blades 136, . . . , 136. Spring seals 144 for sealing the gap with the housing are disposed in the seal retaining parts 136d, . . . , 136d. Each of the spring seals 144, . . . , 144 is provided with a seal 144a in sliding contact with the housing 133 installed outside, and a spring 144b that presses the seal 144a installed on the inside radially outward against the side of the housing 133.

The inner periphery side rotor 111 is provided with a ring shaped rotor body at the inner periphery 134 that includes permanent magnets 111a, . . . , 111a mounted on the inner peripheral rotor core 121 mentioned above, and a housing 133 mated integrally on the inside of the rotor body at the inner periphery 134 so as to form a specific phase relationship. The housing 133 that forms a part of the inner periphery side rotor 111 is provided with a circular shaped base section 146 of small thickness in the radial direction, and protruding sections 147, . . . , 147 of the same number as the number of blades 136 that protrude from equidistant positions in the circumferential direction on the inner peripheral surface of the base section 146 to the interior in the radial direction. As shown in FIG. 13, the base section 146 protrudes all around from both sides in the axial direction more than the protruding section 147 and the rotor body at the inner periphery 134. As shown in FIG. 14, each of the protruding sections 147, . . . , 147 forms a substantial isosceles triangle that converges when viewed in the axial direction. Grooves 148 that enable blade 136 of vane rotor 132 to be disposed in each space between adjacent protruding sections 147, 147 in the circumferential direction are provided in all the protruding sections 147, . . . , 147. Concave shaped seal retaining groove 147b facing the outside diameter side is formed with the overall length in the axial direction at the inside end face of each of the protruding sections 147, . . . , 147. Spring seals 150 for sealing the gap with the outer peripheral surface of the boss 135 of the vane rotor 132 are disposed in these seal retaining parts 147b, . . . , 147b. These spring seals 150, . . . , 150 include a seal 150a in sliding contact with the boss 135 of the vane rotor 132 installed on the inner periphery, and a seal spring 150b that presses the seal 150a installed on the outside diameter side against the side of the vane rotor 132. The housing 133 may be integrally linked to the rotor body at the inner periphery 134 by bolt connections and so on.

The length in the axial direction of the outer periphery side rotor 112 mentioned above, is set so as to be shorter than the length in the axial direction of the blade 136 and the sandwiched base 137 of the vane rotor 132, even if the maximum allowable manufacturing error occurs. During assembly, the length in the axial direction of the actual product of the outer periphery side rotor 112 and the length in the axial direction of the blade 136 and sandwiched base 137 of the actual product of the vane rotor 132 are measured beforehand.

During the assembly of each part, firstly, as mentioned above, two shims 125 with a thickness of half the difference in the measured length in the axial direction of the actual product of the outer periphery side rotor 112, for instance, and the length in the axial direction of the blade 136 and the sandwiched base 137 of the actual product of the vane rotor 132, are selected from many shims of different thickness kept ready beforehand.

Next, after mating the cylinder 131d of one of the drive plates 131 with one of the steps 138 of the vane rotor 132 so that the drive plate 131 and the vane rotor 132 are in the joined state, the bolts 154 are inserted in each of the bolt insertion holes 131c, . . . , 131c of the drive plate 131, and each of the bolts 154, . . . , 154 is screwed in the screw hole 136a of the blade 136 of the vane rotor 132. Then, with the spring seals 144 fitted to each of the blades 136, . . . , 136 of the vane rotor 132, each of the blades 136, . . . , 136 is inserted into its corresponding groove 148 in a one-to-one correspondence, and with the inner periphery side rotor 111 formed by press-fitting the housing 133 to the inside of the rotor body at the inner periphery 134 beforehand fitted to the spring seals 150, . . . , 150, one of the drive plates 131 is aligned.

After aligning the end face 112A of the outer periphery side rotor 112 with one of the drive plates 131 through the shim 125 so as to cover the outside of the inner periphery side rotor 111, the shim 125 is also disposed on the end face 112A on the opposite side of the outer periphery side rotor 112. By mating the other mating part 138 of the vane rotor 132 with the center hole 131e, the other drive plate 131 is aligned from the opposite side. Bolts 152 are inserted in the bolt insertion holes 131a, . . . , 131a, of this drive plate 131, bolt insertion holes 126a, . . . , 126a of the shim 125, bolt insertion holes 122b, . . . , 122b of the outer periphery side rotor 112, bolt insertion holes 126a, . . . , 126a of the shim 125, and bolt insertion holes 131a, . . . , 131a of the other drive plate 131 mentioned above, and nut 153 is screwed on each of these bolts 152, . . . , 152. Also, bolts 154 are inserted in each of the bolt insertion holes 131c, . . . , 131c of the other drive plate 131, and each of the bolts 154, . . . , 154 is screwed in the screw hole 136a of the blade 136 of the vane rotor 132.

The bolts 152 and nuts 153 mentioned above, form a bolt connected part 163 that connects the parts around the bolt insertion holes 131a of the other drive plate 131, the parts around the bolt insertion holes 126a of one of the shims 125, the parts around the bolt insertion holes 122b of the outer periphery side rotor 112, the parts around the bolt insertion holes 126a of the other shim 125, and the parts around the bolt insertion holes 131a of the other drive plate 131. Such a bolt connected part 163 is formed at a specific spacing in the circumferential direction. The bead 127 of circular shape more toward the central axis side of the shims 125, 125 than the bolt connected parts 163, . . . , 163, is held between the drive plate 131 and the outer periphery side rotor 112 and is generally deformed to a flat shape so that it comes in close contact with the drive plate 131 and the outer periphery side rotor 112, and seals the gaps at these bolt connected parts 163, . . . , 163. The through holes 131f, . . . , 131f of the drive plate 131 are formed between the adjacent bolt insertion holes 131a, 131a in the circumferential direction (more specifically, at the central position). Thus, they may be considered as being formed between the adjacent bolt connected parts 163, 163 (more specifically at the central position) passing through the adjacent bolt insertion holes 131a, 131a (refer to FIG. 14).

In view of the above, the drive plates 131, 131 fixed to the two end faces in the axial direction of the outer periphery side rotor 112 are each integrally fixed to each blade 136, . . . , 136 of the vane rotor 132 by the bolts 154, . . . , 154. The number of bolts 154, ..., 154, securing the blades 136, ..., 136 to the drive plates 131 is less than the number of bolts 152, ..., 152 securing the drive plate 131 to the outer periphery side rotor 112, and the size of the bolts used is also larger.

Subsequently, the output shaft 116 is engaged on the inside of the vane rotor 132, and at this stage, the connecting spline 116 and the connecting spline 135 are joined together. The result is that the output shaft 116 is integrally fixed to the vane rotor 132. Naturally, the assembly procedure described above is merely one example; a different procedure may be used for the assembly.

According to the procedure described above, the inner periphery side rotor 111 formed by integrating the housing 133 and the rotor body at the inner periphery 134, is installed in the space 158 between the drive plates 131, 131, on the inside of the outer periphery side rotor 112 and on the outside of the vane rotor 132, and it is retained rotatably by parts on both sides in the axial direction of the base section 146 inserted in the annular groove 131*b*, 131*b* of the drive plates 131, 131. Moreover, the blades 136 of the vane rotor 132 are disposed one each in the grooves 148, ..., 148 of the housing 133. Also, the output shaft 116 connected by spline to the vane rotor 132, is rotatable with respect to the outer periphery side rotor 112, the drive plates 131, 131, and the vane rotor 132; more specifically, it is integrally fixed. Since the inner periphery side rotor 111 is rotatable with respect to the integrally installed outer periphery side rotor 112 and the drive plates 131, 131, its two end faces in the axial direction can form a gap 159 between the facing drive plates 131, and there is also a small gap 160 between the outer peripheral surface 121A and the outer periphery side rotor 112. The shims 125, 125 provided between the tow end faces 112A, 112A of the outer periphery side rotor 112 and the drive plates 131, 131 are each formed within the range of the end faces 112A of the outer periphery side rotor 112, and do not extend up to the region of the gap 160 between the outer periphery side rotor 112 and the inner periphery side rotor 111. Also, the through holes 131*f*, ..., 131*f* of the drive plate 131 are more toward the central axis side than the shim 125, and are formed laterally in the gap 160 so as to open to the gap 160; more specifically, they are formed on the line extending from the gap 160 in the direction of the central axis.

Here, when the permanent magnets 112*a*, ..., 112*a* of the outer periphery side rotor 112 and the permanent magnets 111*a*, ..., 111*a* of the inner periphery side rotor 111 have unlike poles facing each other to generate a strong magnetic field state, as shown in FIG. 16, all the vane wheels 136, ... 136, are in contact with the adjacent protruding sections 147 on the same one side in the direction of rotation in the corresponding grooves 148. A first pressure chamber 156 is formed between the protruding sections 147 in contact, and a second pressure chamber 157 is formed wider than the first pressure chamber 156 between the adjacent protruding sections 147 on the same opposite side in the direction of rotation (that is, the first pressure chambers 156, ..., 156 and the second pressure chambers 157, ..., 157 are formed by the vane wheels 136, ..., 136 housed in the grooves 148, ..., 148 and the grooves 148, ..., 148). The result is that the first pressure chambers 156, ..., 156, and the second pressure chambers 157, ..., 157 are defined on the inside of the inner periphery side rotor 111.

Conversely, when the permanent magnets 112*a*, ..., 112*a* of the outer periphery side rotor 112 and the permanent magnets 11*a*, ..., 11*a* of the inner periphery side rotor 111 have like poles facing each other to generate a weak magnetic field state, as shown in FIG. 14, all the vane wheels 136, ... 136, are in contact with the adjacent protruding sections 147 on the same opposite side as mentioned above, in the direction of rotation in the corresponding grooves 148, and the second pressure chamber 157 is reduced, while the first pressure chamber 156 between the adjacent protruding sections 147 on the same one side in the direction of rotation as mentioned above, is widened. Each of the passage holes 135*c*, ..., 135*c* of the vane rotor 132 in each of the first pressure chambers 156, ..., 156 is installed so as to open always with a one-to-one correspondence, while each of the passage holes 135*d*, ..., 135*d* of the vane rotor 132 in each of the second pressure chambers 157, ..., 157 is installed so as to always open with a one-to-one correspondence.

Here, the positions of strong magnetic field indicated in FIG. 16, as a result of the unlike poles of the permanent magnets 112*a*, ..., 112*a* and permanent magnets 111*a*, ..., 111*a* of the outer periphery side rotor 112 and the inner periphery side rotor 111 facing and attracting each other, are set to their home positions when the first pressure chambers 156, ..., 156 and the second pressure chambers 157, ..., 157 do not receive substantial hydraulic pressure. The first pressure chambers 156, ..., 156, and the second pressure chambers 157, ..., 157 are filled with hydraulic oil even in the state when they do not receive hydraulic pressure. From this state of the home positions, hydraulic oil is supplied to the first pressure chambers 156, ..., 156 (that is, hydraulic pressure is supplied to the first pressure chambers 156, ..., 156) through the passage holes 135*c*, ..., 135*c*. Simultaneously, hydraulic oil is drained from the second pressure chambers 157, ..., 157 through the passage holes 135*d*, ..., 135*d*. The result is that the outer periphery side rotor 112 and the inner periphery side rotor 111 rotate relatively opposing the magnetic force, and a weak magnetic field state occurs. Conversely, when hydraulic oil is supplied to the second pressure chambers 157, ..., 157 through the passage holes 135*d*, ..., 135*d*, while hydraulic oil is simultaneously drained from the first pressure chambers 156, ..., 156 through the passage holes 135*c*, ..., 135*c*, the outer periphery side rotor 112 and the inner periphery side rotor 111 return to their home positions, and a strong magnetic field state occurs. However, at this stage, since the permanent magnets 112*a*, ..., 112*a* of the outer periphery side rotor and the permanent magnets 111*a*, ..., 111*a* of the inner periphery side rotor 111 attract each other due to the magnetic force, a lower value of the pressure of the hydraulic oil supplied to the second pressure chambers 157, ..., 157 is adequate for changing the phase in the weak magnetic field state, and sometimes, merely supply/drainage of the hydraulic oil without supply of hydraulic pressure is adequate for changing the phase.

Here, the electric motor 110 matches the direction of rotation when the inner periphery side rotor 111 returns to home position from the weak state when the like poles of the permanent magnets 111*a*, ..., 111*a*, and the permanent magnets 112*a*, ..., 112*a* corresponding to the outer periphery side rotor 112 face each other, and the direction of moment of inertia that occurs during rotation at deceleration. That is, the electric motor 110 is set such that the outer periphery side rotor 112 and the inner periphery side rotor 111 rotate in the clockwise direction in FIG. 14 and FIG. 16 when the vehicle is cruising ahead, and a moment of inertia occurs that tries to return the weak magnetic field state shown in FIG. 14 to the strong magnetic field state shown in FIG. 16 in the inner periphery side rotor 111, which is in a floating condition when the outer periphery side rotor 112 decelerates.

Since the hydraulic oil here is non-compressible, even if there is a change in phase at the ends of the two limits of the strong magnetic field state and weak magnetic field state as mentioned above, or even at the intermediate position between the ends of the two limits, if the hydraulic control device (not shown in the figures), for instance, stops the supply/drainage of hydraulic oil from all the first pressure chambers 156, . . . , 156, and the second pressure chambers 157, . . . , 157, by shutting off the switching valves (not shown in the figures), the outer periphery side rotor 112 and the inner periphery side rotor 111 at that stage, maintain the phase relationship and the change in phase at any arbitrary magnetic field state can be stopped.

In view of the above, the vane rotor 132 mentioned above, is integrally fixed and integrally rotatable with respect to the outer periphery side rotor 112, and is disposed on the inside of the inner periphery side rotor 111. Moreover, the vane rotor 132 is integrally fixed to the outer periphery side rotor 112 through the drive plates 131, 131, which are fixed to the outer periphery side rotor 112, so as to cover the two end faces in the axial direction of the outer periphery side rotor 112 and the inner periphery side rotor 111, and is also integrally installed with respect to the output shaft 116 that outputs the drive force of the outer periphery side rotor 112. Also, the housing 133 mentioned above, is integrally engaged and rotatably integrated with respect to the rotor body at the inner periphery 134. The groove 148 together with the vane rotor 132 defines the first pressure chamber 156 and the second pressure chamber 157 on the inside of the inner periphery side rotor 111. Furthermore, by controlling the supply/discharge of hydraulic oil, that is, by controlling the supply of hydraulic pressure to the first pressure chamber 156 and the second pressure chamber 157, the relative phase of the vane rotor 132 is changed with respect to the housing 133, and as a result, the relative phase between the inner periphery side rotor 111 and the outer periphery side rotor 112 is changed. Here, the relative phase between the inner periphery side rotor 111 and the outer periphery side rotor 112 can be changed to the advance angle side or the lag angle side at least only for an electrical angle of 180°. The state of the electric motor 110 can be set to an appropriate state between the weak magnetic field state that occurs when the like magnetic poles of the permanent magnet 111*a* of the inner periphery side rotor 111 and the permanent magnet 112*a* of the outer periphery side rotor 112 are disposed to face each other, and the strong magnetic field state that occurs when the unlike poles of the permanent magnet 111*a* of the inner periphery side rotor 111 and the permanent magnet 112*a* of the outer periphery side rotor 112 are disposed to face each other.

Also, by fixing the drive plates 131 that transmit the drive force of the outer periphery side rotor 112 to the output shaft 116, to the two end faces of the outer periphery side rotor 112 and the vane rotor 132 respectively in the axial direction, the rotor body at the inner periphery 134 and the inner periphery side rotor 111 integrated with the housing 133, are rotatably disposed in the circumferential direction in the space 158, shown in FIG. 14, between the surrounding outer periphery side rotor 112, the vane rotor 132 and the two drive plates 131, 131. The rotor body at the inner periphery 134 and the inner periphery side rotor 111 integrated with the housing 133, are installed in the floating condition and free to rotate in the space 158 (that is, not fixed to the drive plates 131, 131 and the output shaft 116).

Figure 17A:
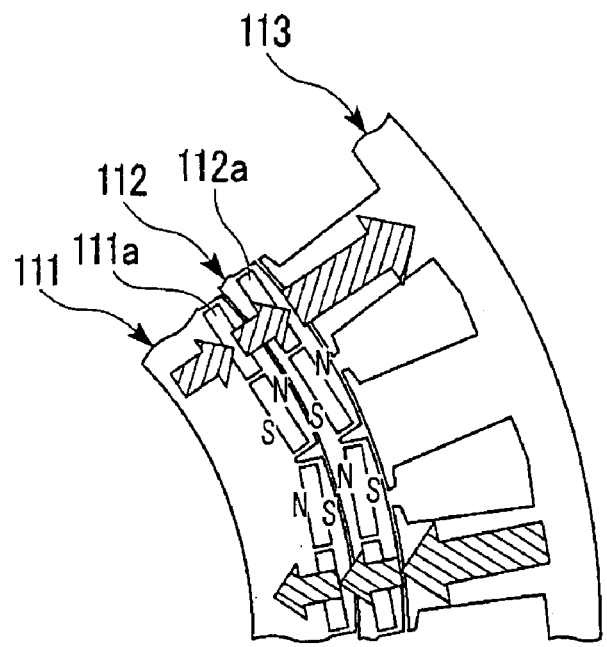
FIG. 17A schematically shows the strong magnetic field state of permanent magnets of the inner periphery side rotor and permanent magnets of the outer periphery side rotor disposed in an unlike-pole facing arrangement.
Figure 17B:
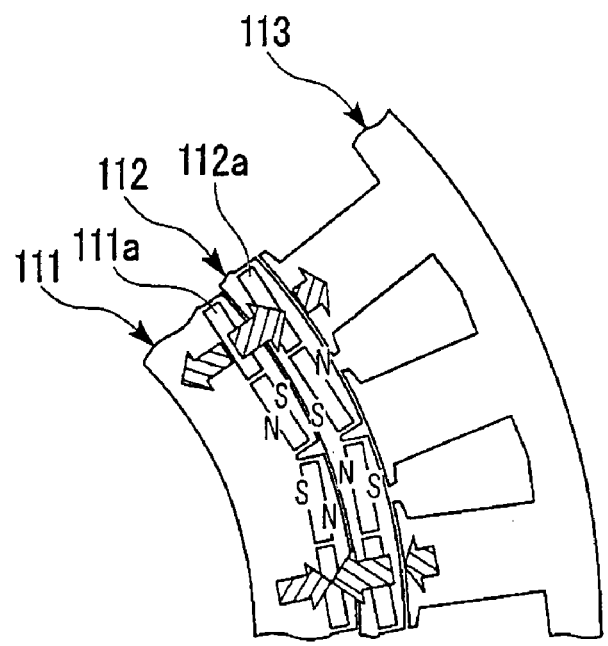
FIG. 17B shows a schematic view of the weak magnetic field state in which the poles of permanent magnets of the inner periphery side rotor and the permanent magnets of the outer periphery side rotor are disposed in a like-pole facing arrangement.
Figure 18:
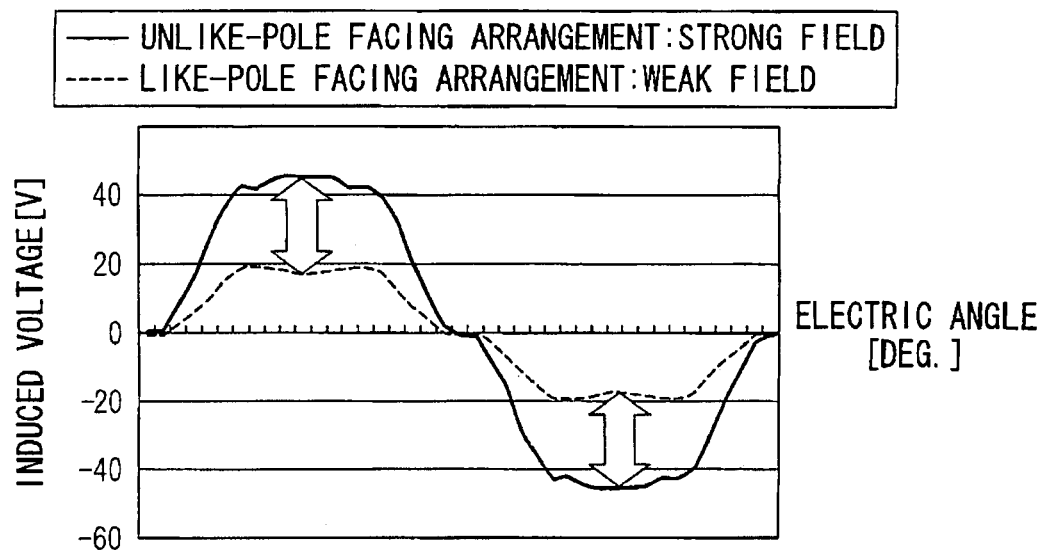
FIG. 18 is a graph showing the induced voltage in the strong magnetic field state and the weak magnetic field state shown in FIG. 17A and FIG. 17B.

For instance, as shown in FIG. 17A, in the strong magnetic field state that occurs when the permanent magnets 111*a* of the inner periphery side rotor 111 and the permanent magnets 112*a* of the outer periphery side rotor 112 are disposed in an unlike-pole facing arrangement, and for instance, as shown in FIG. 17B, in the weak magnetic field state that occurs when the permanent magnets 111*a* of the inner periphery side rotor 111 and the permanent magnets 112*a* of the outer periphery side rotor 112 are disposed in a like-pole facing arrangement, the induced voltage constant Ke can be changed by changing the state of the electric motor 110 to a state between the strong magnetic field state and the weak magnetic field state by changing the magnitude of the induced voltage, for example, as shown in FIG. 18.

This induced voltage constant Ke, is the ratio of revolution speeds of the induced voltage induced at the ends of the stator coils 113*a* by the rotation of each of the rotors 111, 112, for instance. Moreover, it can be expressed by the product of number of pairs of poles p, the outside diameter of the motor R, the motor lamination thickness L, the flux density B and the number of turns T as follows: $Ke = 8 \times p \times R \times L \times B \times T \times \pi$. By changing the state of the electric motor 110 to a state between the strong magnetic field state and the weak magnetic field state, the magnitude of the magnetic flux density B of the magnetic flux due to the permanent magnets 111*a* of the inner periphery side rotor 111 and the permanent magnets 112*a* of the outer periphery side rotor 112 changes, and thus the induced voltage constant Ke changes.

Figure 19A:
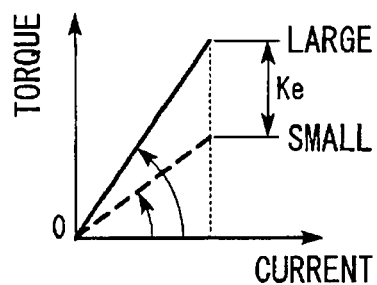
FIG. 19A is a graph showing the relationship between the electric current and the torque of the electric motor that vary in response to the induced voltage constant Ke.

For example, as shown in FIG. 19A, the torque of the electric motor 110 is proportional to the product of the induced voltage constant Ke and the current that passes through the stator coil 113*a* (torque $\propto$ (Ke$\times$current)).

Figure 19B:
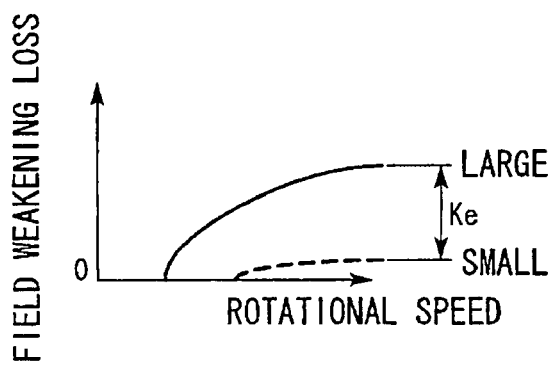
FIG. 19B is a graph showing the relationship between the revolution speed and the field weakening loss of the electric motor that vary in response to the induced voltage constant Ke.

Also, for example, as shown in FIG. 19B, since the field weakening loss of the electric motor 110 is proportional to the product of the induced voltage constant Ke and the revolution speed, (field weakening loss $\propto$ (Ke$\times$revolution speed)), the allowable revolution speed of the electric motor 110 is inversely proportional to the product of the induced voltage constant Ke and the revolution speed (allowable revolution speed $\propto$ (1/(Ke$\times$revolution speed))).

Figure 20:
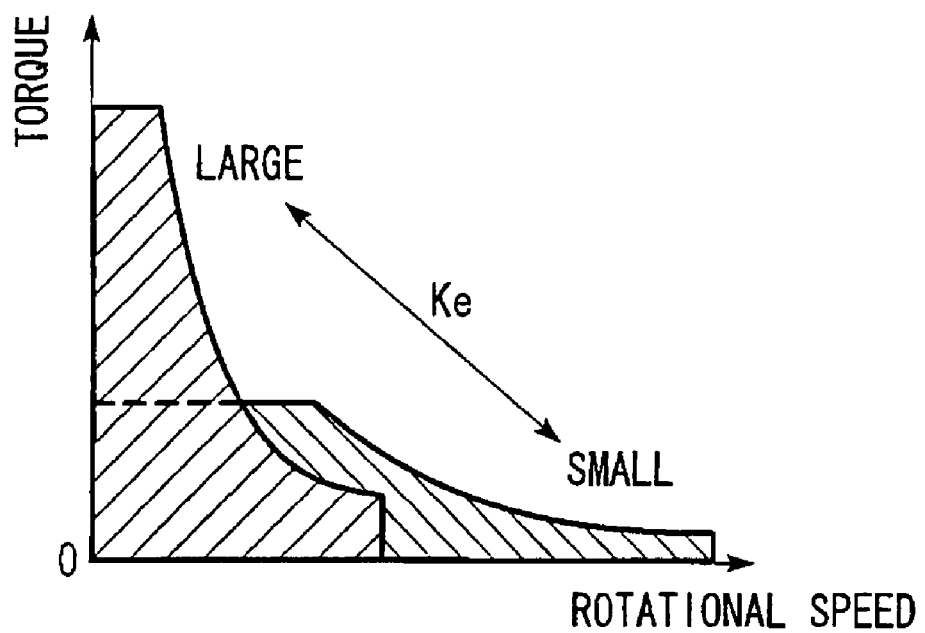
FIG. 20 shows an operable region for the revolution speed and the torque of the electric motor that varies in response to the induced voltage constant.

That is, for example, as shown in FIG. 20, in the electric motor 110 with a relatively large induced voltage constant Ke, although the operable revolution speed decreases relatively, a relatively large torque can be output. On the other hand, in the electric motor 110 with relatively small induced voltage constant Ke, although the torque that can be output is relatively small, the motor can be operated at a relatively high revolution speed, and the range of operable revolution speed for torque and revolution speed varies in response to the induced voltage constant Ke.

Figure 21A:
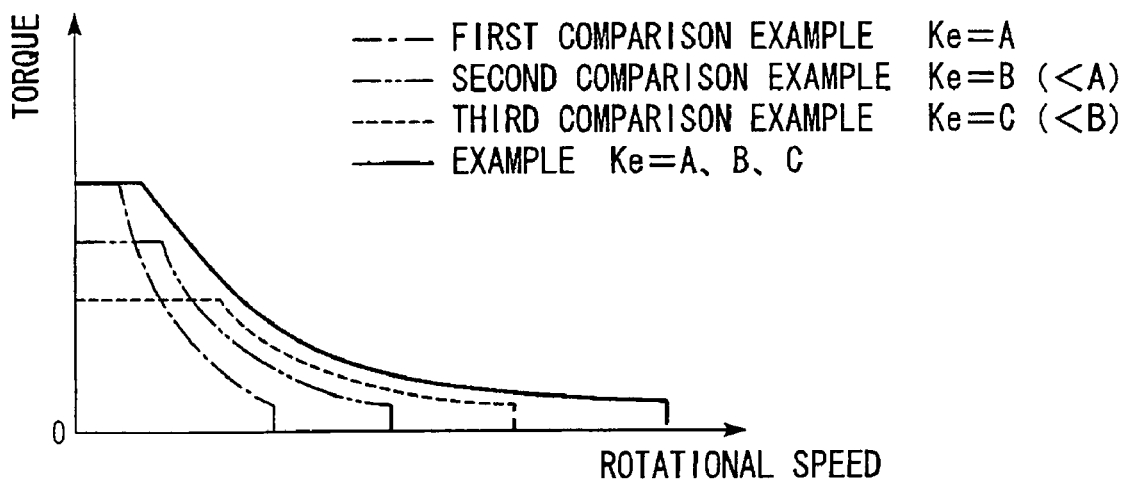
FIG. 21A is a graph showing the relationship between the electric current and the revolution speed of the electric motor that vary in response to the induced voltage constant Ke.

For this reason, as shown in the embodiment of FIG. 21A, for example, by setting the induced voltage constant Ke to vary with a decreasing trend (for instance, sequentially change from A, B(<A), (C<B) and so on) with the increase in the revolution speed of the electric motor 110, the operable range for torque and revolution speed expands compared to the case when the induced voltage constant Ke is not varied (for instance, in the first to third comparative examples).

Figure 21B:
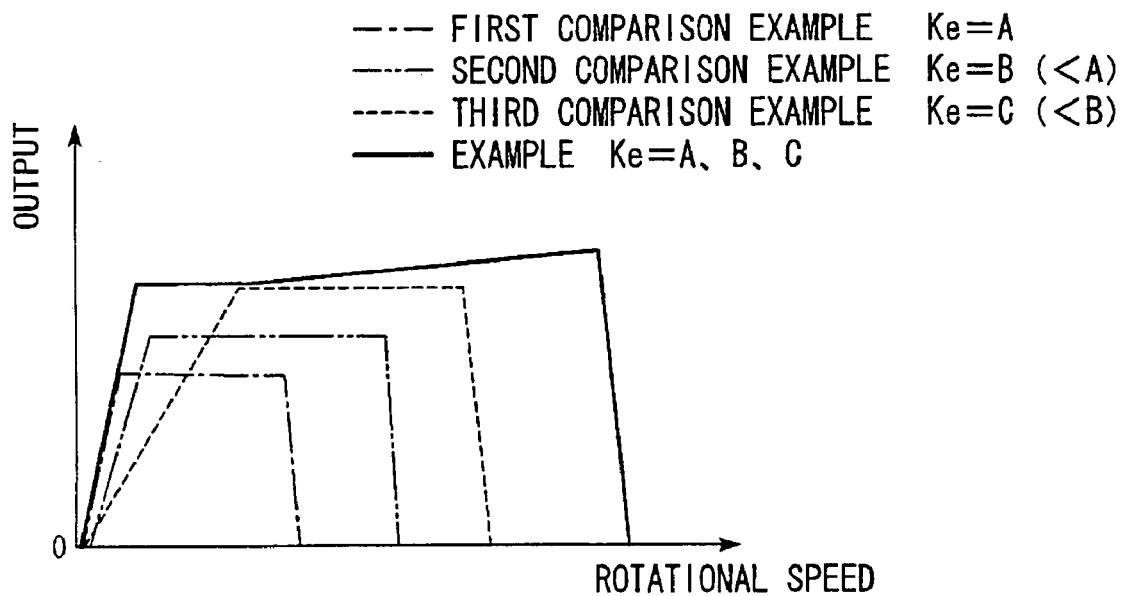
FIG. 21B is a graph showing the relationship between the revolution speed and the output of the electric motor that vary in response to the induced voltage constant Ke.

Also, the output of the electric motor 110 is proportional to the value obtained by subtracting the field weakening loss and other losses from the product of the induced voltage constant Ke, the current passing through the stator coil 113*a*, and the revolution speed (output $\propto$ (Ke$\times$current$\times$revolution speed–field weakening loss–other losses)). That is, for example, as shown in FIG. 21B, in the electric motor 110 with a relatively large induced voltage constant Ke, although the operable revolution speed decreases relatively, the output in a relative low revolution speed range increases. On the other hand, in the electric motor 110 with relatively small induced voltage constant Ke, although the output in a relatively low revolution speed range decreases, if the motor can be operated at a relatively high revolution speed, then the output at relatively high revolution speed increases, and the operable range for output and revolution speed varies in response to the induced voltage constant Ke. For this reason, by setting the induced voltage constant Ke to vary with a decreasing trend (for instance, sequentially change from A, B(<A), (C<B) and so on) with the increase in the revolution speed of the electric motor 110, the operable range for output and revolution speed expands compared to the case when the induced voltage constant Ke is not varied (for instance, in the first to third comparative examples).

Also, the efficiency of the electric motor 110 is proportional to the value obtained by subtracting the copper loss, the field weakening loss and other losses from the input power corresponding to the stator coil 113a, divided by the input power (efficiency∝((input power−copper loss−field weakening loss−other losses)/input power)).

For this reason, by selecting a relative large induced voltage constant Ke in the range from relatively small revolution speeds to intermediate revolution speeds, the electric current required for output of desired torque decreases, and thus copper loss decreases.

Also, by selecting a relative small induced voltage constant Ke in the range from intermediate revolution speeds to relatively high revolution speeds, the field weakening current decreases, and thus the field weakening loss decreases.

Figure 22A:
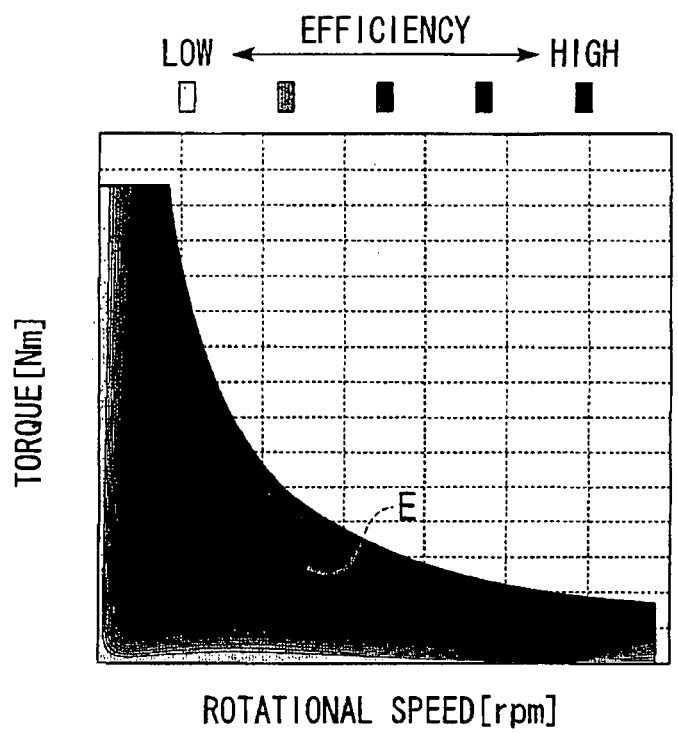
FIG. 22A shows the distribution of operable regions and efficiency for revolution speed and torque of the electric motor that vary in response to the induced voltage constant Ke in the embodiment.
Figure 22B:
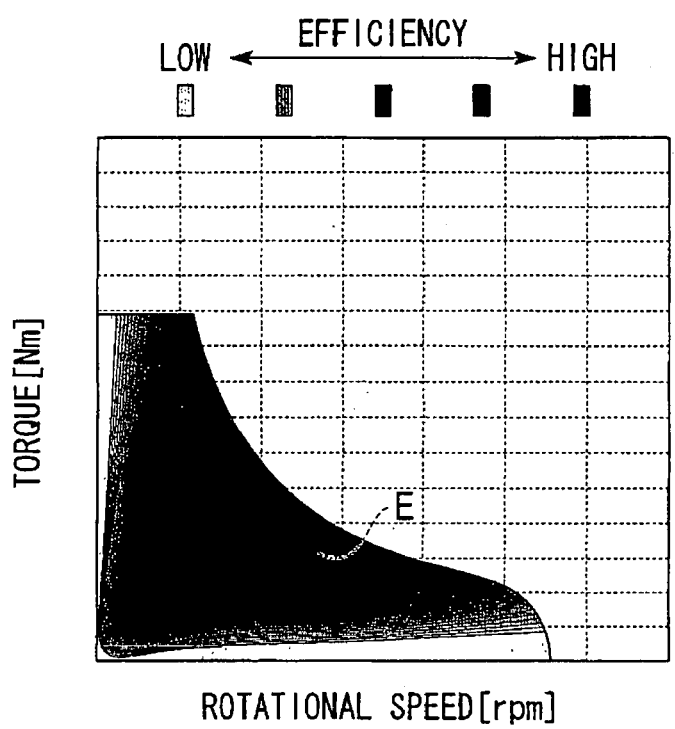
FIG. 22B shows the distribution of operable regions and efficiency for revolution speed and torque of the electric motor that vary in response to the induced voltage constant Ke in the second comparative example.

As a result, as shown in the embodiment of FIG. 22A, for example, by setting the induced voltage constant Ke to vary with a decreasing trend with the increase in the revolution speed of the electric motor 110, the revolution speed and the operable range for revolution speed expand compared to the case when the induced voltage constant Ke is not varied (for instance, in the second comparative example shown in FIG. 22B), and at the same time, the high efficiency range E in which the efficiency of the electric motor 110 increases above a specific efficiency expands; moreover, the value of maximum efficiency that can be achieved, also increases.

As mentioned above, according to the present embodiment, firstly by disposing the permanent magnets 11a and the permanent magnets 112a in the circumferential direction in the inner periphery side rotor 111 and the outer periphery side rotor 112, for example, the magnetic flux due to the permanent magnets of the outer periphery side rotor 112 can increase or decrease with good efficiency the flux linkage amount linking the stator coil 113a by the magnetic flux due to the permanent magnets 111a of the inner periphery side rotor 111. In the strong magnetic field state, the torque constant (that is, torque/phase current) of the electric motor 110 can be set at a relatively high value. The maximum torque value output by the electric motor 110 can be increased without reducing the current loss during electric motor operation, or without changing the maximum value of the output current of the inverter controlling the current to the stator coil 113a.

Moreover, the rotating mechanism 114 supplies/drains hydraulic oil for the first pressure chambers 156, ..., 156 and the second pressure chambers 157, ... 157 defined on the inside of the inner periphery side rotor 111 by the vane rotor 132 installed integrally and rotatably with respect to the outer periphery side rotor 112, and the housing 133, which forms a part of inner periphery side rotor 111 installed integrally with respect to the rotor body at the inner periphery 134, and thereby changes the relative phase between the inner periphery side rotor 111 and the outer periphery side rotor 112. Thus, the induced voltage constant can be varied easily and accurately at the desired timing while inhibiting any complexity of the electric motor 110. The result is that the range of operable revolution speed and the torque range can be expanded, the operating efficiency enhanced, and the operable range of high efficiency can be expanded.

Moreover, by controlling the quantity of hydraulic oil supplied to the first pressure chambers 156, ..., 156, and the second pressure chambers 157, ..., 157, the relative phase between the inner periphery side rotor 111 and the outer periphery side rotor 112 can be changed steplessly within the range of electrical angles of 180° between the strong magnetic field state and the weak magnetic field state.

Also, since the vane rotor 132 and the housing 133 define the first pressure chambers 156, ..., 156, and the second pressure chambers 157, ..., 157 on the inside of the inner periphery side rotor 111, the increase in thickness especially in the axial direction of the electric motor 110 can be inhibited so as to make the electric motor more compact.

More specifically, if hydraulic oil is drained from the second pressure chambers 157, ..., 157 while hydraulic oil is supplied to the first pressure chambers 156, ..., 156, which are defined by the blades 136, ..., 136 of the vane rotor 132 and the grooves 148, ..., 148 of the housing 133, the relative phase between the housing 133 and the vane rotor 132 can be changed in the direction of expansion of the first pressure chambers 156, ..., 156. As a result, the relative phase between the inner periphery side rotor 111 installed integrally on the outside of the housing 133, and the outer periphery side rotor 112 installed integrally with the vane rotor 132 can be changed, and a weak magnetic field state occurs. On the other hand, conversely, if hydraulic oil is discharged from the first pressure chambers 156, ..., 156 while hydraulic oil is supplied to the second pressure chambers 157, ..., 157, the relative phase between the housing 133 and the vane rotor 132 is changed in the direction of expansion of the second pressure chambers 157, ..., 157. The result is that the relative phase between the inner periphery side rotor 111 and the outer periphery side rotor 112 is changed, and a strong magnetic field state occurs. In this way, since a simple vane actuator mechanism provided with vane rotor 132 and housing 133 is used as the rotating mechanism 114, the induced voltage constant can be varied easily and accurately at the desired timing while properly inhibiting any complexity of the electric motor 110.

Moreover, the vane rotor 132 is integrally installed with the outer periphery side rotor 112 through the drive plates 131, 131 fixed to the outer periphery side rotor 112 so as to cover the end faces in the axial direction. Furthermore, since it is also integrally installed with the output shaft 116 that outputs the drive force of the outer periphery side rotor 112, the rotation of the outer periphery side rotor 112 can be transmitted directly to the output shaft 116. On the other hand, the pressure of hydraulic oil supplied to the first pressure chambers 156, ..., 156 and the second pressure chambers 157, ..., 157, is used mainly for changing the relative phase between the housing 133 installed integrally on the inside of the inner periphery side rotor 111 and the vane rotor 132, that is, mainly for changing the relative phase between the inner periphery side rotor 111 and the outer periphery side rotor 112. Consequently, the required pressure generated by the hydraulic oil can be restricted to a low value.

Also, when the drive plates 131, 131 are fixed on the sides of the two ends in the axial direction of the outer periphery side rotor 112 and the vane rotor 132, shims 125, 125 are inserted between the drive plates 131, 131 and the end faces 112A, 112A of the outer periphery side rotor 112. Thus, manufacturing errors in length in the axial direction of the outer periphery side rotor 112 and the vane rotor 132 can be adjusted by the shims 125, 125. Consequently, the inclination of the drive plates 131, 131 during assembly can be prevented.

Also, the outer periphery side rotor 112 and the drive plates 131, 131 with the shims 125, 125 in the inserted condition, are joined by the bolt connected parts 163, ..., 163, but the gap between the outer periphery side rotor 112 and the drive plates 131,131 can be sealed by the bead 127 formed more on the central axis side than the bolt connected parts 163, ..., 163 of the shims 125, 125. As a result, even if the hydraulic oil passes through the gap 159 between the drive plates 131, 131 and the inner periphery side rotor 111 by centrifugal force from the first pressure chamber 156 and the second pressure chamber 157 between the housing 133 and the vane rotor 132, it is prevented from entering the gap between the drive plates 131, 131, and the outer periphery side rotor 112. Consequently, the hydraulic oil can be prevented from passing between the outer periphery side rotor 112 and the drive plates 131, 131, and entering the gap between the outer periphery side rotor 112 and the stator 113, and thus the occurrence of friction between these items can be prevented.

The hydraulic oil, which passes through the gap 159 between the drive plates 131, 131 and the inner periphery side rotor 111 from the first pressure chamber 156 and the second pressure chamber 157 due to the centrifugal force, and which is prevented from entering the gap between the drive plates 131, 131 and the outer periphery side rotor 112 by the shims 125, 125, enters the gap 160 between the outer periphery side rotor 112 and the inner periphery side rotor 111 and cools the outer periphery side rotor 112 and the inner periphery side rotor 111. It is discharged outside the drive plates 131, 131 from the through holes 131f, ..., 131f formed laterally in the gap 160 of the drive plates 131, 131, falls mainly on the stator coil 113a of the stator 113 due to centrifugal force, and cools the stator coil. Consequently, the outer periphery side rotor 112 and the stator 113 can be satisfactorily cooled.

Moreover, since the through holes 131f, ..., 131 are formed between adjacent bolt connected parts 163, 163, even if the offset in the radial direction of the through holes 131f, ..., 131f and the bolt connected parts 163, ..., 163 is small, these can be formed. Consequently, the thickness in the radial direction of the outer periphery side rotor 112, which affects the offsets in the radial direction, can be made small.

Also, hydraulic oil is supplied/drained through the vane rotor 132 for the first pressure chambers 156, ..., 156, and the second pressure chambers 157, ..., 157, therefore, the increase in thickness in the axial direction with the formation of flow passage for hydraulic oil can be inhibited.

The features of the electric motor of the second embodiment described above can be summarized as shown below.

(2-1) An electric motor provided with: an inner periphery side rotor provided with inner peripheral permanent magnets disposed along a circumferential direction thereof; an outer periphery side rotor provided with outer peripheral permanent magnets disposed along a circumferential direction thereof such that a rotational axis thereof is coaxial with a rotational axis of the inner periphery side rotor; and a rotating device that can change a relative phase between the inner periphery side rotor and the outer periphery side rotor by rotating at least the inner periphery side rotor or the outer periphery side rotor about the rotational axis, wherein:

the rotating device includes a housing that forms part of the inner periphery side rotor and a vane rotor integrally installed in the outer periphery side rotor that together with the housing forms pressure chambers, and it changes the relative phase for the inner periphery side rotor with the hydraulic fluid pressure supplied to the pressure chambers;

by fixing the end plates that transmit the drive force of the outer periphery side rotor to the output shaft on the sides of the two ends in the axial direction of the outer periphery side rotor and the vane rotor, the inner periphery side rotor is rotatably disposed in the circumferential direction in the space between the surrounding outer periphery side rotor, the vane rotor and the two end plates; and the electric motor being connected to the end plate and the end face of the outer periphery side rotor through a shim.

According to the electric motor mentioned above, by disposing permanent magnets in the circumferential direction in the inner periphery side rotor and the outer periphery side rotor, for example, the flux linkage amount of the magnetic flux from the permanent magnets of the outer periphery side rotor linking the stator coils, can be efficiently increased or decreased by the magnetic flux from the permanent magnets of the inner periphery side rotor. In the strong magnetic field state, the torque constant (that is, torque/phase current) of the electric motor can be set at a relatively high value. The maximum torque value output by the electric motor can be increased without reducing the current loss during electric motor operation, or without changing the maximum value of the output current of the inverter controlling the current to the stator coils.

Moreover, the rotating device uses a simple vane actuator provided with a housing that forms part of the inner periphery side rotor, and a vane rotor integrally installed in the outer periphery side rotor that together with the housing forms pressure chambers, which changes the relative phase for the housing by the hydraulic fluid pressure supplied to the pressure chambers. Thus, the induced voltage constant can be varied easily and accurately at the desired timing while inhibiting any complexity of the electric motor.

Also, by fixing the end plates that transmit the drive force of the outer periphery side rotor to the output shaft, on the sides of the two ends in the axial direction of the outer periphery side rotor and the vane rotor, the inner periphery side rotor is rotatably disposed in the circumferential direction in the space between the surrounding outer periphery side rotor, the vane rotor and the two end plates. Thus, the pressure of the hydraulic fluid can be used mainly to change the relative phase between the housing that forms a part of the inner periphery side rotor and the vane rotor, that is, to change the relative phase between the inner periphery side rotor and the outer periphery side rotor. Consequently, the required pressure generated by the hydraulic fluid can be restricted to a low value.

Also, when the end plates are fixed on the sides of the two ends in the axial direction of the outer periphery side rotor and the vane rotor, shims are inserted between the end plates and the end faces of the outer periphery side rotor. Thus, manufacturing errors in length in the axial direction of the outer periphery side rotor and the vane rotor can be adjusted by the shims. Consequently, the inclination of the end plates during assembly can be prevented.

(2-2) The electric motor according to (2-1), wherein through holes are formed laterally in the gap between the outer periphery side rotor and the inner periphery side rotor in the end plate.

According to this electric motor, the hydraulic fluid that passes through between the end plate and the inner periphery side rotor from the pressure chamber due to centrifugal force, and that is also prevented from entering the gap between the end plate and the outer periphery side rotor by shim, is discharged outside the end plate from the through hole formed laterally in the gap in the end plate between the outer periphery side rotor and the inner periphery side rotor, falls on the stator due to centrifugal force and cools it. Consequently, the stator can be satisfactorily cooled.

(2-3) The electric motor according to (2-2), wherein the outer periphery side rotor and the end plate are joined by bolt connected part at the specified spacing with the shim in the inserted condition, and a curved part is formed in the shim more toward the central axis side than the bolt connected part.

According to the electric motor, the outer periphery side rotor and the end plates with the shim in the inserted condition, are joined by the bolt connected part, but the gap between the outer periphery side rotor and the end plate can be sealed by the curved part formed more toward the central axis side than the bolt connected part of the shim. As a result, even if the hydraulic fluid from the pressure chamber formed between the housing and the vane rotor passes through between the end plate and the inner periphery side rotor due to centrifugal force, it is prevented from entering the gap between the end plate and the outer periphery side rotor. Consequently, the hydraulic fluid is prevented from passing between the outer periphery side rotor and the end plate and entering the gap between the outer periphery side rotor and the stator, and thus the occurrence of friction between these items can be prevented.

(2-4) The electric motor according to (2-3), wherein the through hole is formed between the adjacent bolt connected parts.

According to this electric motor, since the through hole is formed between the adjacent bolt connected parts, even if the offset in the radial direction of the through hole and the bolt connected part is small, these can be formed.

Third Embodiment

An electric motor according to a third embodiment of the present invention will be described below with reference to the figures.

Figure 23:
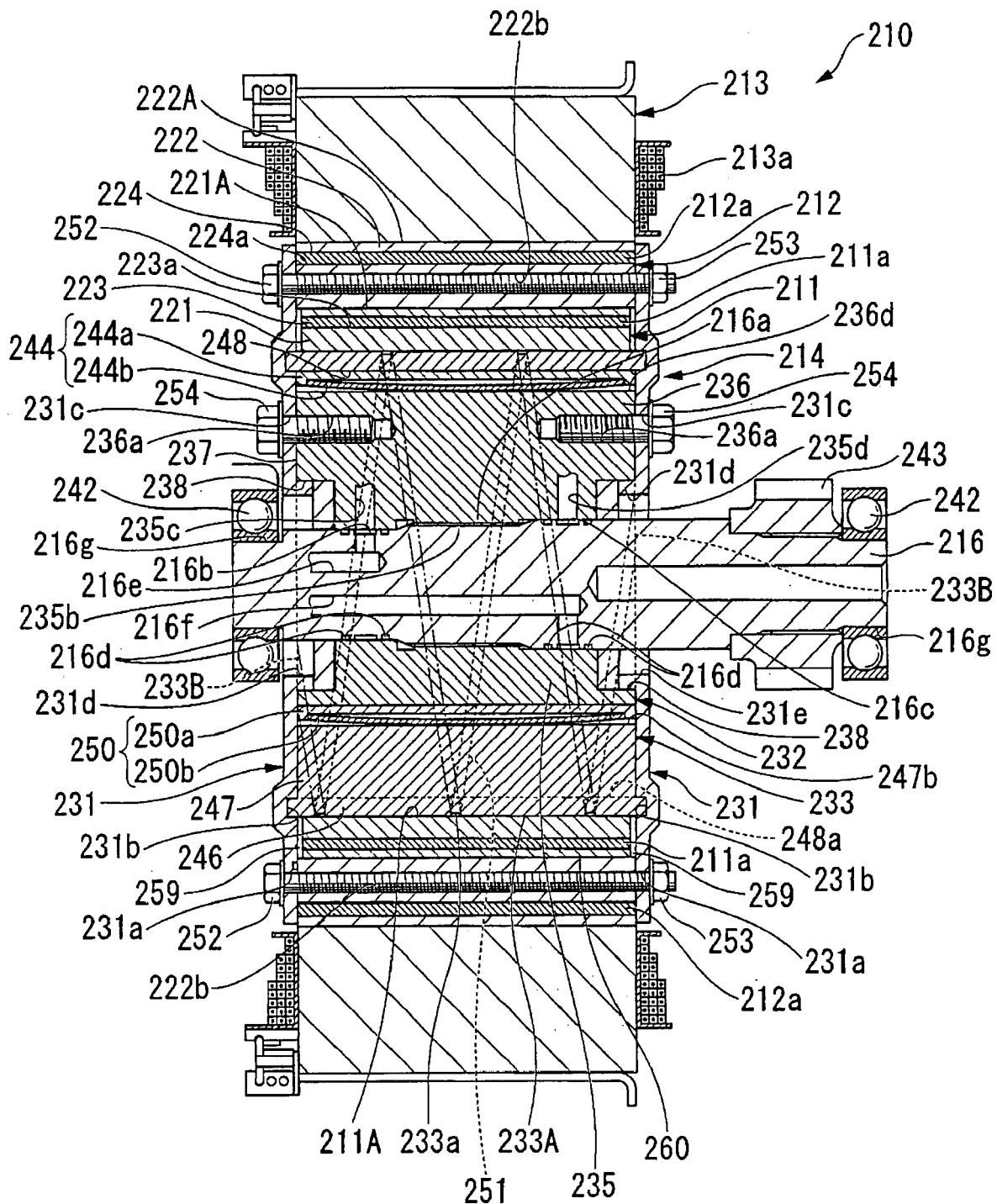
FIG. 23 is a cross-sectional view of an essential portion of an electric motor according to a third embodiment of the present invention.
Figure 24:
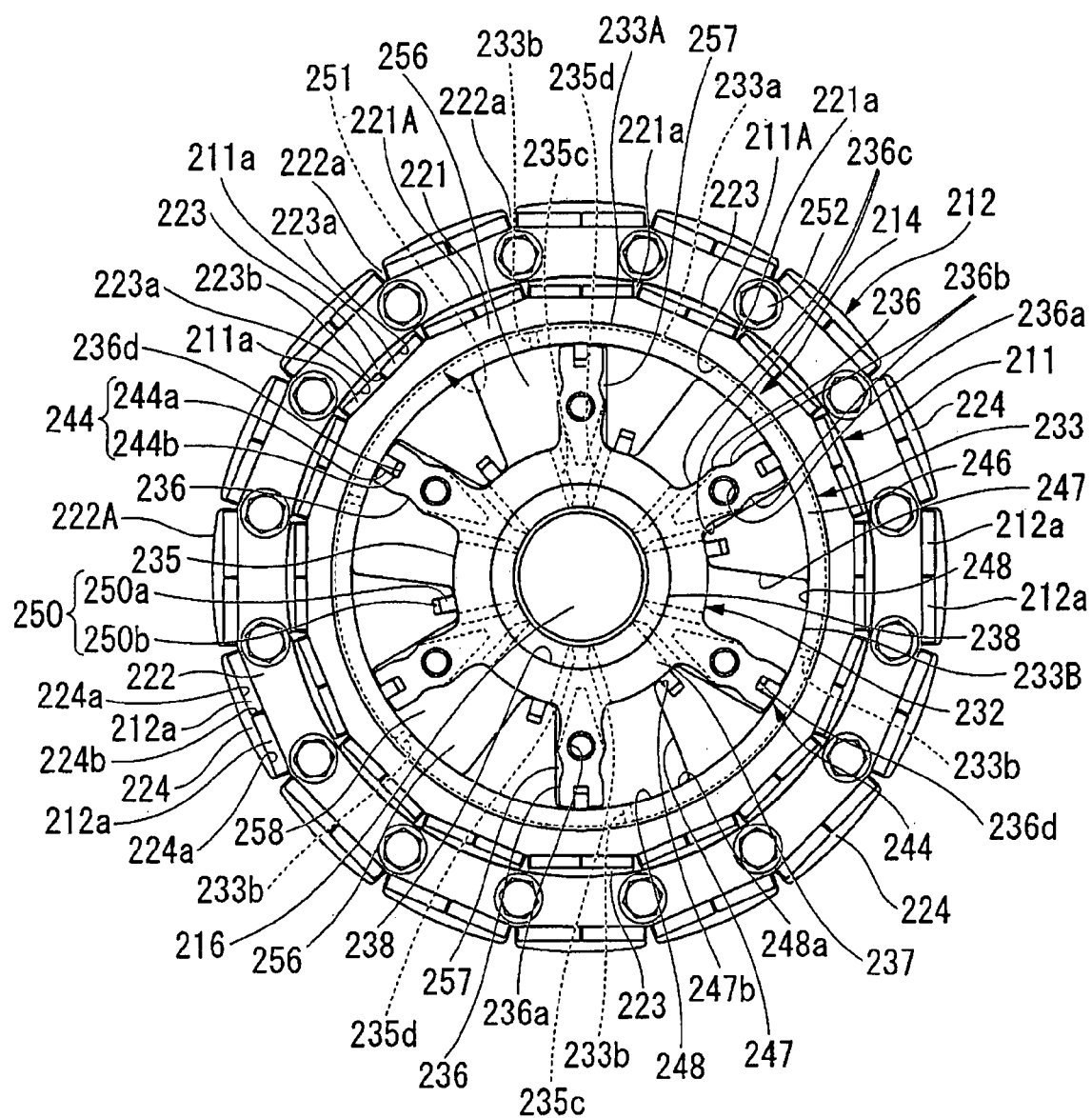
FIG. 24 is an elevation view showing an inner periphery side rotor and an outer periphery side rotor, without a drive plate in front, and indicating the weak magnetic field state of the rotating mechanism of the electric motor.
Figure 25:
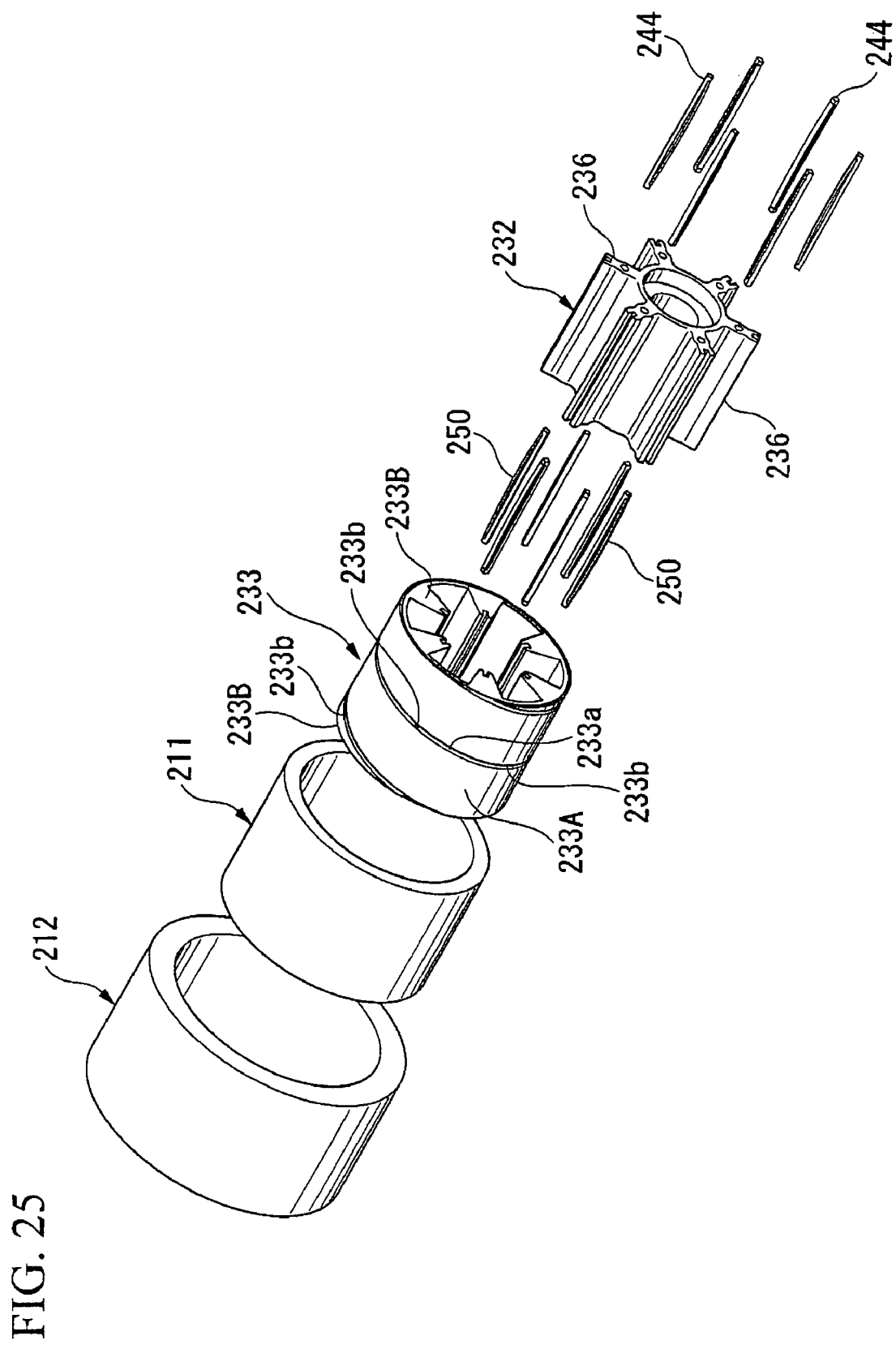
FIG. 25 is an exploded perspective view showing the inner periphery side rotor, the outer periphery side rotor, and the rotating mechanism of the electric motor.

As shown in FIG. 23 to FIG. 25, electric motor 210 according to the present embodiment is a brushless DC motor provided with an inner periphery side rotor 211 in substantially circular shape rotatably installed to rotate with its center on the rotational axis of the electric motor 210, an outer periphery side rotor 212 in substantially circular shape rotatably installed to rotate with its center on the same rotational axis coaxially and installed radially outward with respect to the inner periphery side rotor 211, with its position aligned in the direction of the rotational axis, a stator 213 with stator coil 213a shown in FIG. 23 with multiple phases that generate rotating magnetic field which rotates the inner periphery side rotor 211 and the outer periphery side rotor 212, a rotating mechanism (rotating device) 214 connected to the inner periphery side rotor 211 and the outer periphery side rotor 212 that changes the relative phase between the inner periphery side rotor 211 and outer periphery side rotor 212 by the hydraulic pressure (fluid pressure) of the hydraulic oil (hydraulic fluid), which is a non-compressible fluid, and a hydraulic control device (not shown in the figures) that controls the hydraulic pressure to the rotating mechanism 214. If this electric motor 210 is provided as a drive source in a vehicle such as a hybrid vehicle or an electric vehicle, the output shaft (rotating shaft) 216 is connected to the input shaft of the transmission unit (not shown in the figures), and the drive force of the electric motor 210 transmits the drive force to the drive wheels (not shown in the figures) of the vehicle through the transmission unit.

When the drive force is transmitted from the drive wheels to the electric motor 210 during deceleration of the vehicle, the electric motor 210 functions as a generator, that is, it generates regenerative braking force and recovers the kinetic energy of the vehicle as electric energy (regenerated energy). Also, for example, in a hybrid vehicle, the rotational axis of this electric motor 210 is linked to the crankshaft of an internal combustion engine (not shown in the figures), and even when the output of the internal combustion engine is transmitted to the electric motor 210, the electric motor 210 functions as a generator and generates electric energy.

The inner periphery side rotor 211 is disposed such that its rotational axis is coaxial with the rotational axis of the electric motor 210. As shown in FIG. 24, it is provided with an inner peripheral rotor core 221 of substantially circular shape. Multiple (more specifically, at 16 locations) inner peripheral magnet mounting attachments 223, . . . , 223 at specific pitch are provided in the circumferential direction in a part of the outer periphery in the inner peripheral rotor core 221. Also, grooves 221a extending parallel to the rotational axis are formed in concave shape in the radial direction at intermediate positions in all the adjacent inner peripheral magnet mounting attachments 223, 223 in the circumferential direction on the outer peripheral surface 221A of the inner peripheral rotor core 221. The inner peripheral rotor core 221 may be formed, for instance, by sintering.

A pair of through magnet attachment holes 223a, 223a is provided parallel to the rotational axis of the inner peripheral rotor core 221 in each inner peripheral magnet mounting attachments 223, . . . , 223. A pair of magnet attachment holes 223a, 223a having substantially rectangular cross section with respect to the direction parallel to the rotational axis is formed with the holes disposed on the same plane adjacent to each other in the circumferential direction through the center rib 223b. This plane is perpendicular to the radial line joining the center rib 223b and the rotational axis. Permanent magnets 211a of substantially plate form extending parallel to the rotational axis are provided in each of the magnet attachment holes 223a, 223a.

All the permanent magnets 211a mounted in the magnet attachment holes 223a, . . . , 223a are magnetized similarly in the thickness direction (that is, in the radial direction of each rotor 211, 212). The pair of permanent magnets 211a, 211a mounted in the pair of magnet attachment hole 223a, . . . , 223a provided in the same inner peripheral magnet mounting attachment 223, is set such that the magnetization direction is mutually same. Adjacent inner peripheral magnet mounting attachments 223, . . . , 223 in the circumferential direction are set such that a pair of permanent magnets 211a, 211a mounted in one mounting attachment has the magnetization direction different from that of the pair of permanent magnets 211a, 211a in the other mounting attachment, in all the inner peripheral magnet mounting attachments 223, 223. That is, the inner peripheral magnet mounting attachment 223 with a pair of permanent magnets 211a, 211a mounted with the outer periphery as the S-pole is placed adjacent in the circumferential direction to the inner peripheral magnet mounting attachment 223 with a pair of permanent magnets 211a, 211a mounted with the outer periphery as the N-pole, through the groove 221a.

Thus, as mentioned above, the inner periphery side rotor 211 is provided with multiple permanent magnets 211a, . . . , 211a disposed in the circumferential direction.

The outer periphery side rotor 212 is also disposed such that its rotational axis is coaxial with the rotational axis of the electric motor 210. Thus, it is provided with an outer peripheral rotor core 222 of substantially circular shape. Multiple outer peripheral magnet mounting attachments 224, . . . , 224 of the same number as the inner peripheral magnet mounting attachments 223, . . . , 223 mentioned above, are provided at specific pitch in the circumferential direction in a part of this outer periphery of the outer peripheral rotor core 222. Also, grooves 222A extending parallel to the rotational axis are formed in concave shape in the radial direction at intermediate positions in all the adjacent outer peripheral magnet mounting attachments 224, 224 in the circumferential direction on the outer peripheral surface 222A of the outer peripheral rotor core 222.

Also, bolt insertion hole 222b, which enables through-bolting in the axial direction, as shown in FIG. 23, is provided on the inner diameter side, that is, at each intermediate position of adjacent outer peripheral magnet mounting attachments 224, . . . , 224 of each groove 222a, . . . 222a of the outer peripheral rotor core 222. The outer peripheral rotor core 222 may also be formed, for instance, by sintering.

A pair of through magnet attachment holes 224a, 224a is provided parallel to the rotational axis in each outer peripheral magnet mounting attachments 224, . . . , 224. A pair of magnet attachment holes 224a, 224a having substantially rectangular cross section with respect to the direction parallel to the rotational axis is formed with the holes disposed on the same plane adjacent to each other in the circumferential direction through the center rib 224b. This plane is perpendicular to the radial line joining the center rib 224b and the rotational axis. Permanent magnets 212a of substantially plate form extending parallel to the rotational axis are provided in each of the magnet attachment holes 224a, 224a.

All the permanent magnets 212a mounted in each of the magnet attachment holes 224a, . . . , 224a are magnetized similarly in the thickness direction (that is, in the radial direction of each rotor 211, 212). The pair of permanent magnets 212a, 212a mounted in the pair of magnet attachment holes 224a, . . . , 224a provided in the same outer peripheral magnet mounting attachment 224, is set such that the magnetization direction is mutually same. Adjacent outer peripheral magnet mounting attachments 224, . . . , 224 in the circumferential direction are set such that a pair of permanent magnets 212a, 212a mounted in one mounting attachment has the magnetization direction different from that of the pair of permanent magnets 212a, 212a in the other mounting attachment, in all the outer peripheral magnet mounting attachments 224, 224. That is, the outer peripheral magnet mounting attachment 224 with a pair of permanent magnets 212a, 212a mounted with the outer periphery as the N-pole, is placed adjacent in the circumferential direction to the outer peripheral magnet mounting attachment 224 with a pair of permanent magnets 212a, 212a mounted with the outer periphery as the S-pole, through the groove 222a.

Thus, as mentioned above, the outer periphery side rotor 212 is also provided with multiple permanent magnets 212a, . . . , 212a disposed in the circumferential direction.

The inner peripheral magnet mounting attachments 223, . . . , 223 of the inner periphery side rotor 211 and the outer peripheral magnet mounting attachments 224, . . . , 224 of the outer periphery side rotor 212 are disposed such that they face each other in the radial direction of each rotor 211, 212. In this state when the attachments face each other, all the pairs of permanent magnets 211a, 211a have their phases aligned with any of the pairs of permanent magnets 212a, 212a in the direction of rotation such that there is a one-to-one correspondence. In the case of all the grooves 221a, . . . , 221a of the inner periphery side rotor 211 and the grooves 222a, . . . , 222a of the outer periphery side rotor 212 also, all the grooves 22a, . . . , 221a are aligned in phase in the direction of rotation with any of the corresponding grooves 222a in a one-to-one correspondence.

Figure 26:
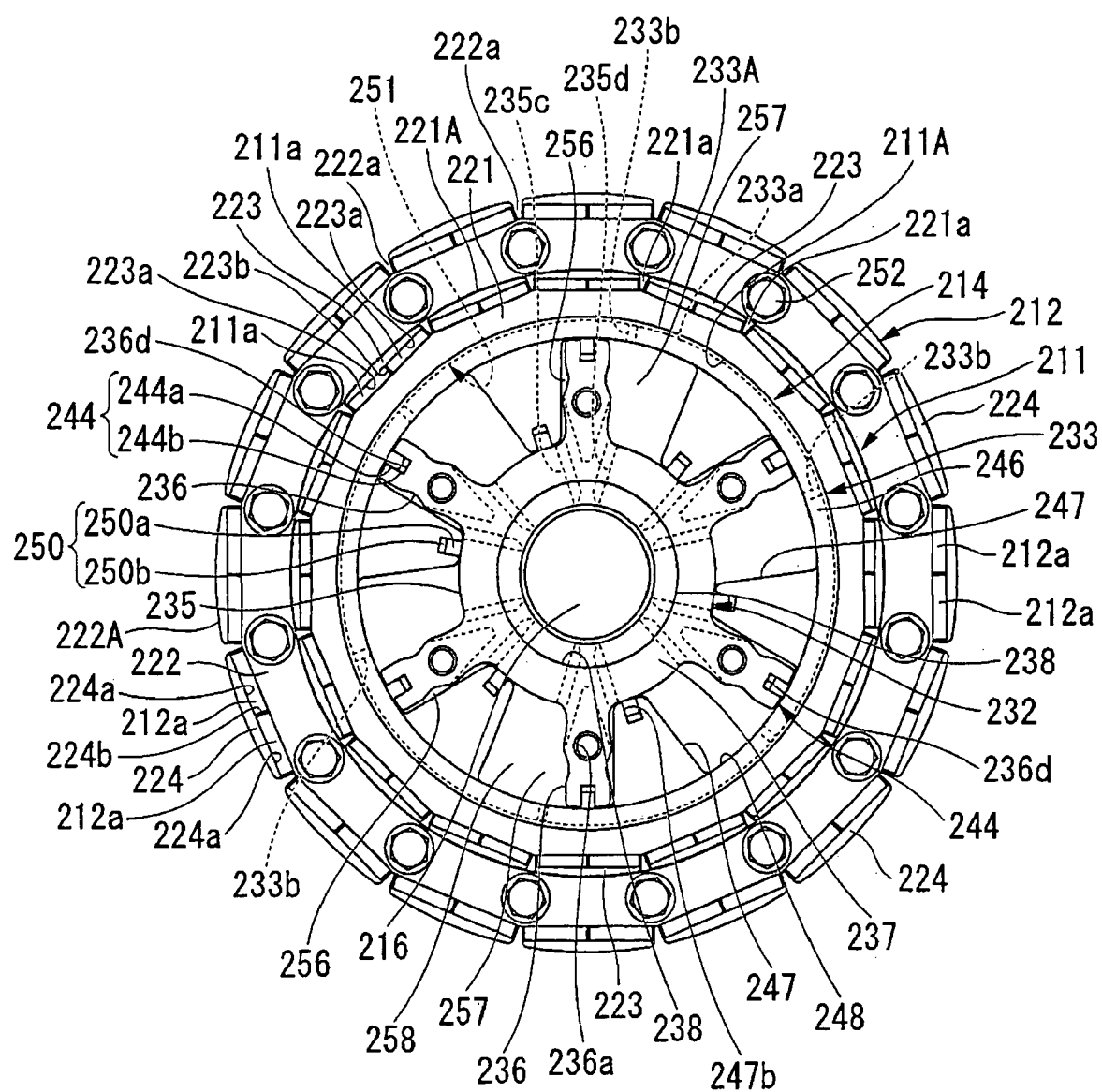
FIG. 26 is an elevation view showing the inner periphery side rotor and the outer periphery side rotor, without the drive plate in front indicating the strong magnetic field state of the rotating mechanism of the electric motor.

As a result, depending on the relative position of the inner periphery side rotor 211 and the outer periphery side rotor 212 around the rotational axis, the state of the electric motor 210 can be changed from the weak magnetic field state shown in FIG. 24 wherein the field becomes weakest when the like poles of permanent magnets 211a, 211a that form pairs and the permanent magnets 212a, 212a that form pairs are disposed to face each other (that is, when the permanent magnets 211a, 211a that form pairs and the permanent magnets 212a, 212a that form pairs are in a like-pole facing arrangement) to an appropriate state that extends to the strong magnetic field state shown in FIG. 26 wherein the field becomes strongest when the unlike poles of permanent magnets 211a, 211a that form pairs and the permanent magnets 212a, 212a that form pairs are disposed to face each other (that is, when the permanent magnets 211a, 211a that form pairs and the permanent magnets 212a, 212a that form pairs are in an unlike-pole facing arrangement) in all the permanent magnets 211a, 211a of the inner periphery side rotor 211 and all the permanent magnets 212a, 212a of the outer periphery side rotor 212.

Here, the stator 213 shown in FIG. 23 is formed with a substantially circular shape and disposed to face the outer periphery of the outer periphery side rotor 212, for instance, it may be fixed to the housing (not shown in the figures) of the transmission unit of a vehicle.

Next, the rotating mechanism 214 that changes the relative phase between the inner periphery side rotor 211 and the outer periphery side rotor 212, as mentioned above, is described here.

As shown in FIG. 23, the rotating mechanism 214 of the present embodiment is provided with a pair of drive plates (end plates) 231, 231 of circular disc shape fixed on the inside of the outer periphery side rotor 212 so as to cover the internal space on both sides in the axial direction of the outer periphery side rotor 212, a vane rotor (first member) 232 integrally mounted on the inside of the outer periphery side rotor 212 by being directly held between the drive plates 231, 231, and the housing 233 (second member) integrally fixed on the inside of the inner periphery side rotor 211 and is also disposed together with this inner periphery side rotor 211 in the space between the vane rotor 232, the outer periphery side rotor 212 and the drive plates 231, 231. The vane rotor 232 and the housing 233 may be formed, for instance, by sintering.

Multiple (same number as the number of bolt insertion holes 222b) through bolt insertion holes 231a, . . . , 231a in the axial direction are formed in parts of the outer periphery of the pair of drive plates 231, 231 at equidistant spacing on the same circumference. Annular groove 231b of concave shape in the axial direction is formed on one side more toward the inside than the bolt insertion holes 231a, . . . , 231a. Also, multiple through bolt insertion holes 231c, . . . , 231c in the axial direction are formed in the drive plate 231 at equidistant spacing on the same circumference, more toward the inside than the annular groove 231b. Also, a cylinder 231d that protrudes in circular shape along the axial direction is formed on the same side as the annular groove 231b at the center of the drive plate 231 inside the bolt insertion holes 231c, . . . , 231c. A through center hole 231e is formed in the cylinder 231d along the axial direction thereof.

As shown in FIG. 24 and FIG. 25, the vane rotor 232 is provided with a circular-shaped boss 235, and multiple (same number as the bolt insertion hole 231c mentioned above (more specifically, at 6 locations)) blades 236, . . . , 236 that extend outward in the radial direction from positions at equidistant spacing such as in the circumferential direction on the outer peripheral surface of the boss 235.

On either side in the axial direction of the boss 235, a sandwiched base section 237 with the same length in the axial direction as the blades 236, . . . , 236, is formed on the outer periphery, and a concave shaped step 238 in stepped shape is formed on the inner periphery more inside the rotational axis than the sandwiched base section 237. A connecting spline 235*b* is formed on the inner diameter side of the boss 235 at an intermediate position in the axial direction, as shown in FIG. 23. More to one side in the axial direction than the connecting spline 235*b*, through passage holes 235*c*, . . . , 235*c* are formed on the same one side in the direction of rotation of the base end of the blade 236 closest to the inner periphery at the position of each blade 236, . . . , 236, as shown in FIG. 24. Through passage holes 235*d*, . . . , 235*d* are formed on the same opposite side in the direction of rotation of the base end of the blade 236 closest to the inner periphery at the position of each blade 236, . . . , 236, more to the opposite side in the axial direction than the connecting spline 235*b*.

As shown in FIG. 23, the output shaft 216 that transmits the drive force of the outer periphery side rotor 212 is fitted on the inner diameter side of the vane rotor 232. The output shaft 216 is provided with a connecting spline 216*a* joined to the connecting spline 235*b* of the boss 235, annular linking grooves 216*b* that link all the passage holes 235*c* of the boss 235 in the joined condition with the connecting spline 216*a*, annular linking grooves 216*c* that link all the passage holes 235*d* in the same condition, and sealing grooves 216*d*, . . . , 216*d* formed at both outside positions of the linking grooves 216*b*, 216*c*. Seal rings (not shown in the figures) are provided in these sealing grooves 216*d*, . . . , 216*d* to seal the gaps between these grooves and the vane rotor 232. Also, passage hole 216*e* for supply/drainage of hydraulic oil for the linking groove 216*b* passing through the interior part of the shaft 216, and passage hole 216*f* for supply/drainage of hydraulic oil for the linking groove 216*c* are formed on the output shaft 216. On this output shaft 216, bearing mating parts 216*g* for mating a pair of bearings 242, 242 held in the housing of the transmission unit of a vehicle, for instance, are formed on the protruding part more on the outside in the axial direction than the drive plates 231, 231. On the drive plate 231 side of one of the bearing mating parts 216*g*, gear 243 for transmitting the rotation of the output shaft 216 is connected by spline.

Each of the blades 236, . . . , 236 is in substantially plate form, and as shown in FIG. 24, through screw holes 236*a* are formed at intermediate positions in the axial direction. A pair of concave-shaped parts 236*b*, 236*b* with the overall length in the axial direction is formed more toward the outer periphery than the position of formation of screw hole 236*a* on both side faces in the circumferential direction. Also, concave-shaped parts 236*c*, 236*c* with the overall length in the axial direction are formed more toward the inside than the position of formation of screw hole 236*a*. Moreover, concave shaped seal retaining groove 236*d* with the overall length in the axial direction is formed from the outer peripheral surface toward the center on the outer peripheral surface of each of the blades 236, . . . , 236. Spring seals 244 for sealing the gap with the housing 233 are disposed in the seal retaining parts 236*d*, . . . , 236*d*. Each of the spring seals 244, . . . , 244 is provided with a seal 244*a* in sliding contact with the housing 233 installed outside, and a spring 244*b* that presses the seal 244*a* installed on the inside radially outward against the side of the housing 233.

The housing 233 mated integrally so as to form a specific relationship internally with the inner periphery side rotor 211, is provided with a circular shaped base section 246 of small thickness in the radial direction, and protruding sections 247, . . . , 247 of the same number as the number of blades 236 that protrude from equidistant positions in the circumferential direction on the inner peripheral surface of the base section 246 to the interior in the radial direction. As shown in FIG. 23, the base section 246 protrudes all around from both sides in the axial direction more than the protruding section 247. As shown in FIG. 24, each of the protruding sections 247, . . . , 247, forms a substantial isosceles triangle that converges when viewed in the axial direction. Grooves 248 that enable blade 236 of vane rotor 232 to be disposed in each space between the adjacent protruding sections 247, 247 in the circumferential direction are provided in all the protruding sections 247, . . . , 247. Concave shaped seal retaining grooves 247*b* facing the outside diameter side are formed extending over the entire length in the axial direction on each inner end face of each protruding section 247, . . . , 247. Spring seals 250 for sealing the gap with the outer peripheral surface of the boss 235 of the vane rotor 232 are disposed in the seal retaining parts 247*b*, . . . , 247*b*.

These spring seals 250, . . . , 250 are formed by seal 250*a* in sliding contact with the boss 235 of the vane rotor 232 installed in the inner periphery, and the seal spring 250*b* that presses the seal 250*a* installed on the outside diameter side against the side of the vane rotor 232. The housing 233 may be linked integrally to the inner periphery side rotor 211 by bolt connections and the like.

Flow passage formation groove 233*a* in spiral shape is formed on the outer peripheral surface in the housing 233 of the present embodiment and extends in the circumferential direction so as to displace gradually on one side in the axial direction as it extends toward the front side. As shown in FIG. 23 and FIG. 25, this flow passage formation groove 233*a* is formed by the end face 233B on one side in the axial direction of the housing 233. It circles around the outer peripheral surface 233A of the housing 233 multiple times and extends up to the end face 233B on the other side in the axial direction. As shown in FIG. 24, through holes 233*b* that link to the flow passage formation groove 233*a* passing through along the radial direction at the central position in the circumferential direction of the bottom wall face 248*a* outside the radial directions of all the grooves 248, . . . , 248 are machined on the housing 233. Since the through holes 233*b*, . . . , 233*b* link to the spiral shaped flow passage formation groove 233*a*, the positions in the axial direction of the housing are all different. If this housing 233 is mated on the inside of the inner periphery side rotor 211, spiral shaped flow passage 251 linking to the through holes 233*b*, . . . , 233*b* will be formed by the flow passage formation groove 233*a* and the inner peripheral surface 211A of the inner periphery side rotor 211. This flow passage 251 is formed between the inner periphery side rotor 211 and the housing 233. It has a spiral shape extending in the circumferential direction of the housing 233, and both ends of the passage open out to the end face 233B in the axial direction of the housing 233 of the inner periphery side rotor 211.

When assembling the parts mentioned above, for example, when the cylinder 231*d* of one of the drive plates 231 is engaged with one of the steps 238 of the vane rotor 232, then with the drive plate 231 and the vane rotor 232 in the aligned condition, bolts 254 are inserted in the bolt insertion holes 231*c*, . . . , 231*c* of this drive plate 231, each of the bolts 254, . . . , 254 are screwed in the screw hole 236*a* of the blade 236 of the vane rotor 232.

With the spring seals 244 fitted to each of the blades 236, . . . , 236 of the vane rotor 232, each of the blades 236, . . . , 236 is inserted in the corresponding groove 248 in a one-to-one correspondence. The inner periphery side rotor 211 press-fitted beforehand to the inside of the housing 233 is aligned with one of the drive plates 231 with the spring seals 250, . . . , 250 in the fitted condition. After aligning the outer periphery side rotor 212 with one of the drive plates 232 so as to cover the outside of the inner periphery side rotor 211, the other drive plate 231 is aligned from the opposite side by engaging the other mating part 238 of the vane rotor 232 with the center hole 231*e*. Bolts 252 are inserted in the bolt insertion holes 231a, ..., 231a, of this drive plate 231, bolt insertion holes 222b, ..., 222b of the outer periphery side rotor 212, and bolt insertion holes 231a, ..., 231a of the other drive plate mentioned above, and nut 253 is screwed on each of these bolts 252, ..., 252. Also, bolts 254 are inserted in each of the bolt insertion holes 231c, ..., 231c of the other drive plate 231, and each of the bolts 254, ..., 254 is screwed in the screw hole 236a of the blade 236 of the vane rotor 232.

The result is that the drive plates 231, 231 fixed to the two end faces in the axial direction of the outer periphery side rotor 212 are each integrally fixed to each blade 236, ..., 236 of the vane rotor 232 by the bolts 254, ..., 254. The number of bolts 254, ..., 254, securing the blades 236, ..., 236 to the drive plates 231 is less than the number of bolts 252, ..., 252 securing the drive plate 231 to the outer periphery side rotor 212, and the size of the bolts used is also larger.

Subsequently, the output shaft 216 is engaged on the inside of the vane rotor 232, and at this stage, the connecting spline 216a and the connecting spline 235b are joined together. The result is that the output shaft 216 is integrally fixed to the vane rotor 232. Naturally, the assembly procedure described above is merely one example; a different procedure may be used for the assembly.

According to the procedure described above, the inner periphery side rotor 211 integrated with the housing 233, is installed in the space 258 between the drive plates 231, 231, on the inside of the outer periphery side rotor 212 and on the outside of the vane rotor 232, and it is retained rotatably by parts on both sides in the axial direction of the base section 246 inserted in the annular grooves 231b, 231b of the drive plates 231, 231. Moreover, the blades 236 of the vane rotor 232 are disposed one each in the grooves 248, ..., 248 of the housing 233. Also, the output shaft 216 connected by spline to the vane rotor 232, is rotatable with respect to the outer periphery side rotor 212, the drive plates 231, 231, and the vane rotor 232; more specifically, it is integrally fixed. Since the inner periphery side rotor 211 is rotatable with respect to the integrally installed outer periphery side rotor 212 and the drive plates 231, 231, its two end faces in the axial direction can form a gap 259 between the facing drive plates 231, as shown in FIG. 23, and there is also a small gap 260 between the outer peripheral surface 221A and the outer periphery side rotor 212.

Here, when the permanent magnets 212a, ..., 212a of the outer periphery side rotor 212 and the permanent magnets 211a, ..., 211a of the inner periphery side rotor 211 have unlike poles facing each other to generate a strong magnetic field state, as shown in FIG. 26, all the vane wheels 236, ... 236, are in contact with the adjacent protruding sections 247 on the same one side in the direction of rotation in the corresponding grooves 248. A first pressure chamber 256 is formed between the protruding sections 247 in contact, and a second pressure chamber 257 is formed wider than the first pressure chamber 256 between the adjacent protruding sections 247 on the same opposite side in the direction of rotation (that is, the first pressure chamber 256, ..., 256, and the second pressure chambers 257, ..., 257 are formed by the vane wheels 236, ..., 236 housed in the grooves 248, ..., 248 and the grooves 248, ..., 248). The result is that the first pressure chambers 256, ..., 256, and the second pressure chambers 257, ..., 257 are defined on the inside of the inner periphery side rotor 211.

Conversely, when the permanent magnets 212a, ..., 212a of the outer periphery side rotor 212 and the permanent magnets 211a, ..., 211a of the inner periphery side rotor 211 have like poles facing each other to generate a weak magnetic field state, as shown in FIG. 24, all the vane wheels 236, ... 236, are in contact with the adjacent protruding sections 247 on the same opposite side as mentioned above, in the direction of rotation in the corresponding grooves 248, and the second pressure chamber 257 is reduced, while the first pressure chamber 256 between the adjacent protruding sections 247 on the same one side in the direction of rotation as mentioned above, is widened. Each of the passage holes 235c, ..., 235c of the vane rotor 232 in each of the first pressure chambers 256, ..., 256 is installed so as to open always with a one-to-one correspondence, while each of the passage holes 235d, ..., 235d of the vane rotor 232 in each of the second pressure chambers 257, ..., 257 is installed so as to always open with a one-to-one correspondence.

The through holes 233b, ..., 233b formed in the housing 233 can be switched over between the states of opening to the first pressure chamber 256 and opening to the second pressure chamber 257 by the position of the vane wheel 36. When open to the first pressure chamber 256, it opens through from the first pressure chamber 256 to the side of the outer peripheral surface 233A of the housing 233, and moreover, the state of through holes being formed for each first pressure chamber 256, ..., 256 is attained. Also, when each of the through holes 233b, ..., 233b is open to the second pressure chamber 257, it opens through from the second pressure chamber 257 to the side of the outer peripheral surface 233A of the housing 233, and moreover, the state of through holes being formed for all the second pressure chambers 257, ..., 257 is attained.

Here, the positions of strong magnetic field obtained because of mutual attraction indicated in FIG. 26, as a result of the unlike poles of the permanent magnets 212a, ..., 212a and the permanent magnets 211a, ..., 211a of the outer periphery side rotor 212 and the inner periphery side rotor 211 facing and attracting each other, are set to their home positions when the first pressure chambers 256, ..., 256 and the second pressure chambers 257, ..., 257 do not receive substantial hydraulic pressure. The first pressure chambers 256, ..., 256, and the second pressure chambers 257, ..., 257 are filled with hydraulic oil even in the state when they do not receive hydraulic pressure. From this state of the home positions, hydraulic oil is supplied to the first pressure chambers 256, ..., 256 (that is, hydraulic pressure is supplied to the first pressure chambers 256, ..., 256) through the passage holes 235c, ..., 235c. Simultaneously, hydraulic oil is drained from the second pressure chambers 257, ..., 257 through the passage holes 235d, ..., 235d. The result is that the outer periphery side rotor 212 and the inner periphery side rotor 211 rotate relatively opposing the magnetic force, and a weak magnetic field state occurs. Conversely, when hydraulic oil is supplied to the second pressure chambers 257, ..., 257 through the passage holes 235d, ..., 235d, while hydraulic oil is simultaneously drained from the first pressure chambers 256, ..., 256 through the passage holes 235c, ..., 235c, the outer periphery side rotor 212 and the inner periphery side rotor 211 return to their home positions, and a strong magnetic field state occurs. However, at this stage, since the permanent magnets 212a, ..., 212a of the outer periphery side rotor 212 and the permanent magnets 211a, ..., 211a of the inner periphery side rotor 211 attract each other due to the magnetic force, a lower value of the pressure of the hydraulic oil supplied to the second pressure chambers 257, ..., 257 is adequate for changing the phase in the weak magnetic field state, and sometimes, merely supply/drainage of the hydraulic oil without supply of hydraulic pressure is adequate for changing the phase.

Here, the electric motor 210 matches the direction of rotation when the inner periphery side rotor 211 returns to home position from the weak state when the like poles of the permanent magnets 211a, ..., 211a, and the permanent magnets 212a, ..., 212a corresponding to the outer periphery side rotor 212 face each other, and the direction of moment of inertia that occurs during rotation at deceleration. That is, the electric motor 210 is set such that the outer periphery side rotor 212 and the inner periphery side rotor 211 rotate in the clockwise direction in FIG. 24 and FIG. 26 when the vehicle is cruising ahead, and a moment of inertia occurs that tries to return the weak magnetic field state shown in FIG. 24 to the strong magnetic field state shown in FIG. 26 in the inner periphery side rotor 211 which is in a floating condition when the outer periphery side rotor 212 decelerates.

Since the hydraulic oil here is non-compressible, even if there is a change in phase at the ends of the two limits of the strong magnetic field state and weak magnetic field state as mentioned above, or even at the intermediate position between the ends of the two limits, if the hydraulic control device (not shown in the figures), for instance, stops the supply/drainage of hydraulic oil from all the first pressure chambers 256, ..., 256, and the second pressure chambers 257, ..., 257, by shutting off the switching valves (not shown in the figures), the outer periphery side rotor 212 and the inner periphery side rotor 211 at that stage, maintain the phase relationship and the change in phase at any arbitrary magnetic field state can be stopped.

In view of the above, the vane rotor 232 mentioned above, is integrally fixed and integrally rotatable with respect to the outer periphery side rotor 212, and is disposed on the inside of the inner periphery side rotor 211. Moreover, the vane rotor 232 is integrally fixed to the outer periphery side rotor 212 through the drive plates 231, 231 fixed to the outer periphery side rotor 212 so as to cover the two end faces in the axial direction of the outer periphery side rotor 212 and the inner periphery side rotor 211, and is also integrally installed with respect to the output shaft 216 that outputs the drive force of the outer periphery side rotor 212. Also, the housing 233 mentioned above, is integrally engaged and rotatably integrated with respect to the inner periphery side rotor 211. The groove 248 together with the vane rotor 232, defines the first pressure chamber 256 and the second pressure chamber 257 on the inside of the inner periphery side rotor 211. Furthermore, by controlling the supply/discharge of hydraulic oil, that is, by controlling the supply of hydraulic pressure to the first pressure chamber 256 and the second pressure chamber 257, the relative phase of the vane rotor 232 is changed with respect to the housing 233, and as a result, the relative phase between the inner periphery side rotor 211 and the outer periphery side rotor 212 is changed. Here, the relative phase between the inner periphery side rotor 211 and the outer periphery side rotor 212 can be changed to the advance angle side or the lag angle-side at least only for an electrical angle of 180°. The state of the electric motor 210 can be set to an appropriate state between the weak magnetic field state that occurs when the like magnetic poles of the permanent magnet 211a of the inner periphery side rotor 211 and the permanent magnet 212a of the outer periphery side rotor 212 are disposed to face each other, and the strong magnetic field state that occurs when the unlike poles of the permanent magnet 211a of the inner periphery side rotor 211 and the permanent magnet 212a of the outer periphery side rotor 212 are disposed to face each other.

Also, by fixing the drive plates 231 that transmit the drive force of the outer periphery side rotor 212 to the output shaft 216 to the two end faces of the outer periphery side rotor 212 and the vane rotor 232 respectively in the axial direction, the inner periphery side rotor integrated with the rotor body at the inner periphery 211 and the housing 233 are rotatably disposed in the circumferential direction in the space 258, shown in FIG. 24, between the surrounding outer periphery side rotor 212, the vane rotor 232 and the two drive plates 231, 231. The inner periphery side rotor 211 integrated with the housing 233, is installed in the floating condition and free to rotate in the space 258 (that is, not fixed to the drive plates 231, 231 and the output shaft 216).

Figure 27A:
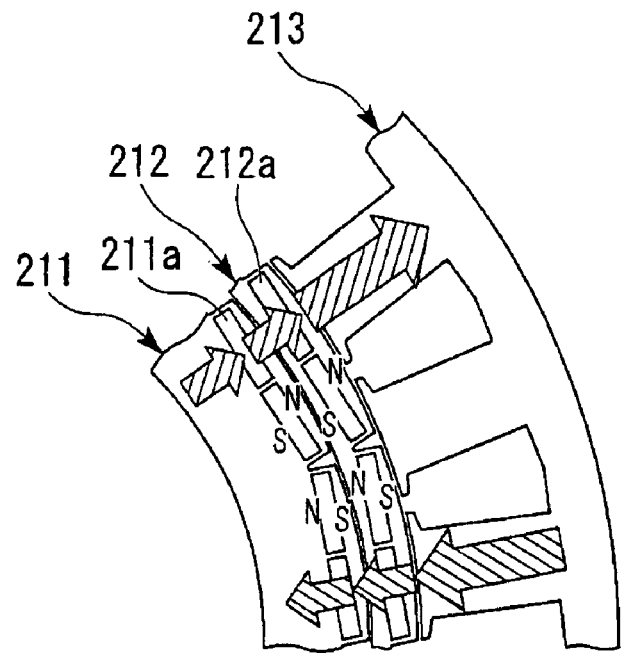
FIG. 27A shows a schematic view of the strong magnetic field state of permanent magnets of the inner periphery side rotor and permanent magnets of the outer periphery side rotor disposed in an unlike-pole facing arrangement.
Figure 27B:
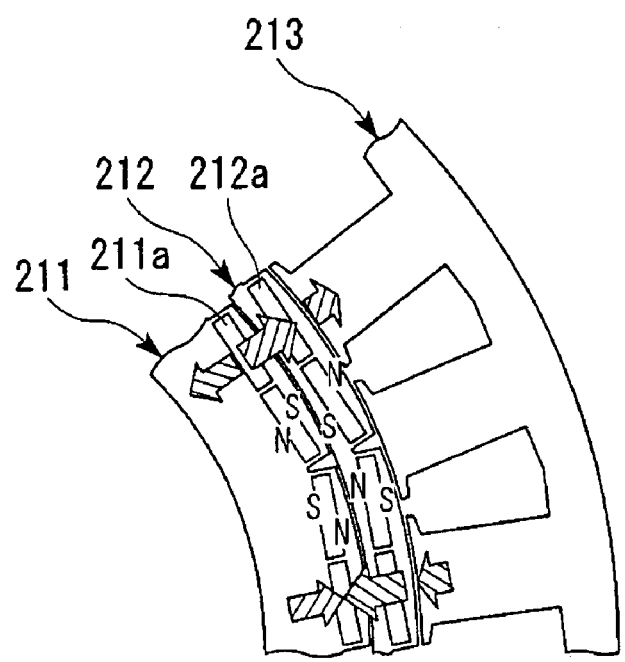
FIG. 27B shows a schematic view of the weak magnetic field state in which the poles of permanent magnets of the inner periphery side rotor and permanent magnets of the outer periphery side rotor are disposed in a like-pole facing arrangement.
Figure 28:
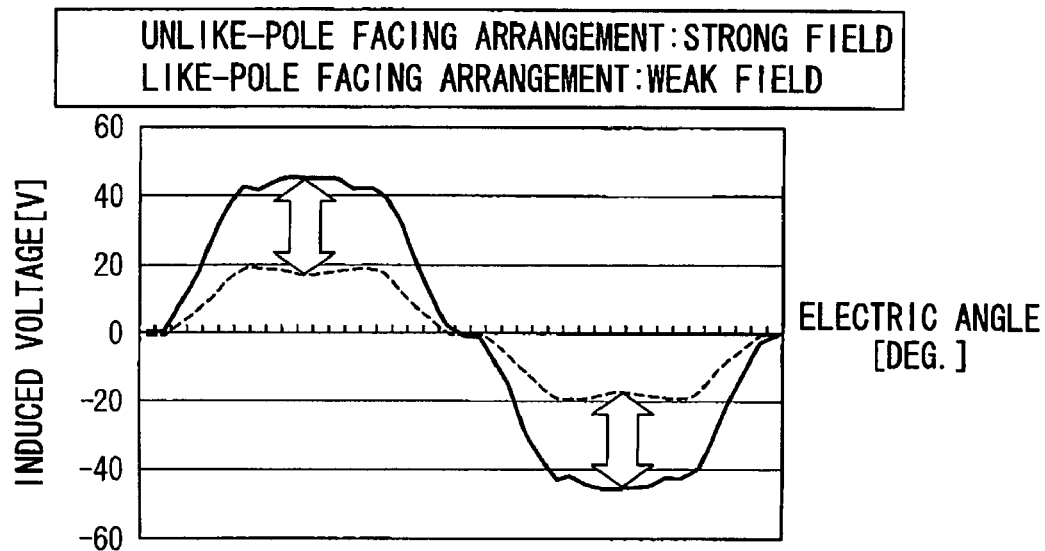
FIG. 28 is a graph showing the induced voltage in the strong magnetic field state and the weak magnetic field state shown in FIG. 27A.

For instance, as shown in FIG. 27A, in the strong magnetic field state that occurs when the permanent magnets 211a of the inner periphery side rotor 211 and the permanent magnets 212a of the outer periphery side rotor 212 are disposed in an unlike-pole facing arrangement, and for instance, as shown in FIG. 27B, in the weak magnetic field state that occurs when the permanent magnets 211a of the inner periphery side rotor 211 and the permanent magnets 212a of the outer periphery side rotor 212 are disposed in a like-pole facing arrangement, the induced voltage constant Ke can be changed by changing the state of the electric motor 210 to a state between the strong magnetic field state and the weak magnetic field state by changing the magnitude of the induced voltage, for example, as shown in FIG. 28.

This induced voltage constant Ke, is the ratio of revolution speeds of the induced voltage induced at the ends of the stator coils 213a by the rotation of each of the rotors 211, 212, for instance. Moreover, it can be expressed by the product of number of pairs of poles p, the outside diameter of the motor R, the motor lamination thickness L, the flux density B and the number of turns T as follows: Ke=8×p×R×L×B×T×π. By changing the state of the electric motor 210 to a state between the strong magnetic field state and the weak magnetic field state, the magnitude of the magnetic flux density B of the magnetic flux due to the permanent magnets 211a of the inner periphery side rotor 211 and the permanent magnets 212a of the outer periphery side rotor 212 changes, and thus the induced voltage constant Ke changes.

Figure 29A:
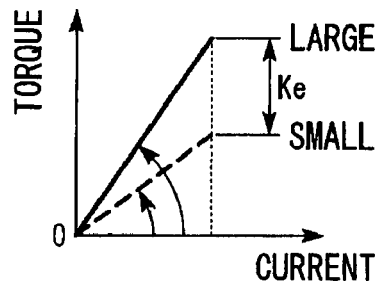
FIG. 29A is a graph showing the relationship between the electric current and torque of the electric motor that vary in response to the induced voltage constant Ke.

For example, as shown in FIG. 29A, the torque of the electric motor 210 is proportional to the product of the induced voltage constant Ke and the current that passes through the stator coil 213a (torque∝(Ke×current)).

Figure 29B:
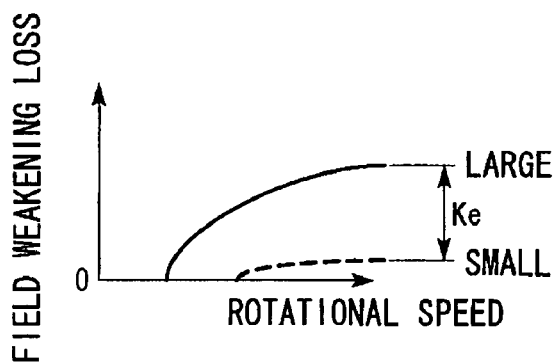
FIG. 29B is a graph showing the relationship between the revolution speed and the field weakening loss of the electric motor that vary in response to the induced voltage constant Ke.

Also, for example, as shown in FIG. 29B, since the field weakening loss of the electric motor 210 is proportional to the product of the induced voltage constant Ke and the revolution speed, (field weakening loss∝(Ke×revolution speed)), the allowable revolution speed of the electric motor 210 is inversely proportional to the product of the induced voltage constant Ke and the revolution speed (allowable revolution speed∝(1/(Ke×revolution speed))).

Figure 30:
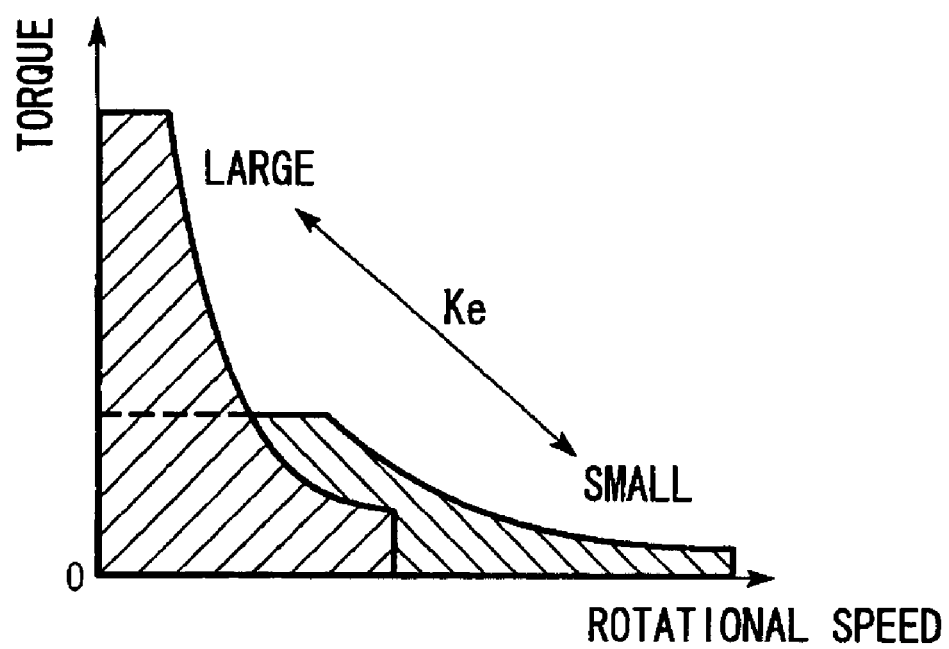
FIG. 30 shows the operable region for revolution speed and the torque of the electric motor that varies in response to the induced voltage constant.

That is, for example, as shown in FIG. 30, in the electric motor 210 with a relatively large induced voltage constant Ke, although the operable revolution speed decreases relatively, a relatively large torque can be output. On the other hand, in the electric motor 210 with relatively small induced voltage constant Ke, although the torque that can be output is relatively small, the motor can be operated at a relatively high revolution speed, and the range of operable revolution speed for torque and revolution speed varies in response to the induced voltage constant Ke.

Figure 31A:
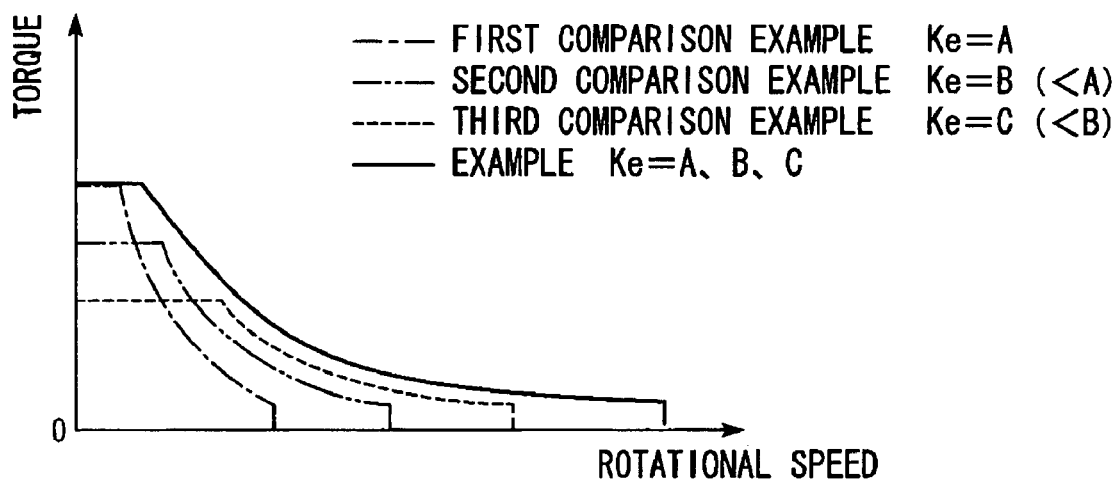
FIG. 31A is a graph showing the relationship between the electric current and the revolution speed of the electric motor that vary in response to the induced voltage constant Ke.

For this reason, as shown in the embodiment of FIG. 31A, for example, by setting the induced voltage constant Ke to vary with a decreasing trend (for instance, sequentially change from A, B(<A), (C<B) and so on) with the increase in the revolution speed of the electric motor 210, the operable range for torque and revolution speed expands compared to the case when the induced voltage constant Ke is not varied (for instance, in the first to third comparative examples).

Figure 31B:
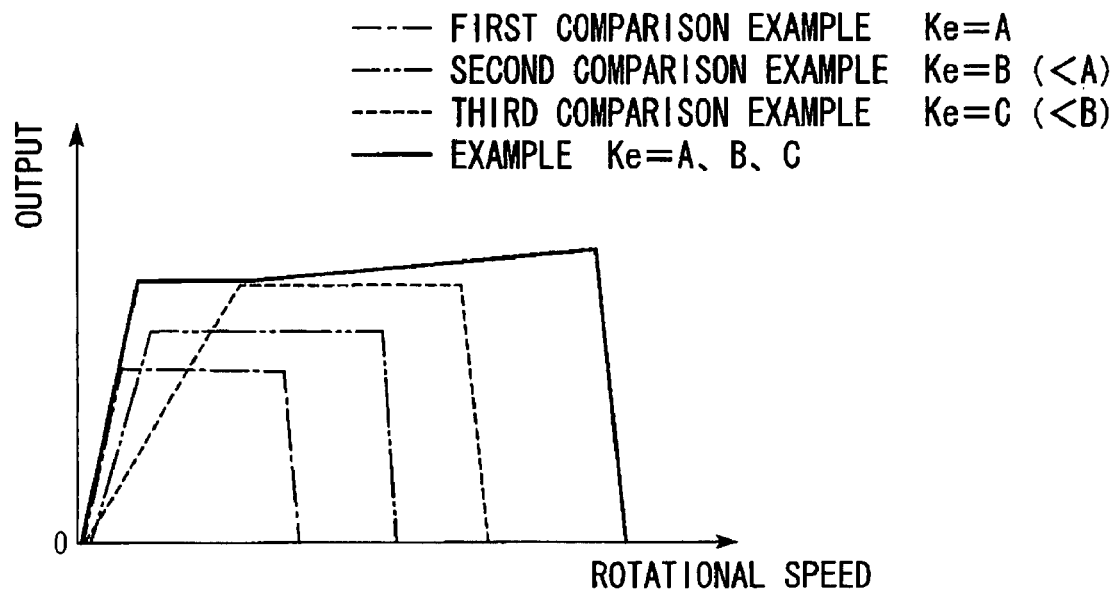
FIG. 31B is a graph showing the relationship between the revolution speed and the output of the electric motor that vary in response to the induced voltage constant Ke.

Also, the output of the electric motor 210 is proportional to the value obtained by subtracting the field weakening loss and other losses from the product of the induced voltage constant Ke, the current passing through the stator coil 213a, and the revolution speed (output∝(Ke×current×revolution speed−field weakening loss−other losses)). That is, for example, as shown in FIG. 31B, in the electric motor. 210 with a relatively large induced voltage constant Ke, although the operable revolution speed decreases relatively, the output in a relative low revolution speed range increases. On the other hand, in the electric motor 210 with relatively small induced voltage constant Ke, although the output in a relatively low revolution speed range decreases, if the motor can be operated at a relatively high revolution speed, then the output at relatively high revolution speed increases, and the operable range for output and revolution speed varies in response to the induced voltage constant Ke. For this reason, by setting the induced voltage constant Ke to vary with a decreasing trend (for instance, sequentially change from A, B(<A), (C<B) and so on) with the increase in the revolution speed of the electric motor 210, the operable range for output and revolution speed expands compared to the case when the induced voltage constant Ke is not varied (for instance, in the first to third comparative examples).

Also, the efficiency of the electric motor 210 is proportional to the value obtained by subtracting the copper loss, the field weakening loss and other losses from the input power corresponding to the stator coil 213a, divided by the input power (efficiency∝((input power−copper loss−field weakening loss−other losses)/input power)).

For this reason, by selecting a relative large induced voltage constant Ke in the range from relatively small revolution speeds to intermediate revolution speeds, the electric current required for output of the desired torque decreases, and thus copper loss decreases.

Also, by selecting a relative small induced voltage constant Ke in the range from intermediate revolution speeds to relatively high revolution speeds, the field weakening current decreases, and thus the field weakening loss decreases.

Figure 32A:
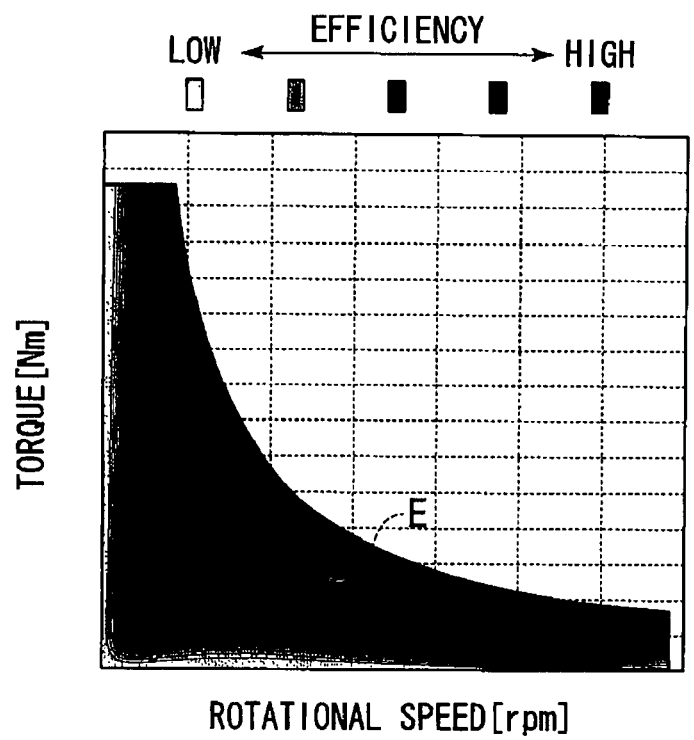
FIG. 32A shows the distribution of operable regions and the efficiency for revolution speed and torque of the electric motor that vary in response to the induced voltage constant Ke in the embodiment.
Figure 32B:
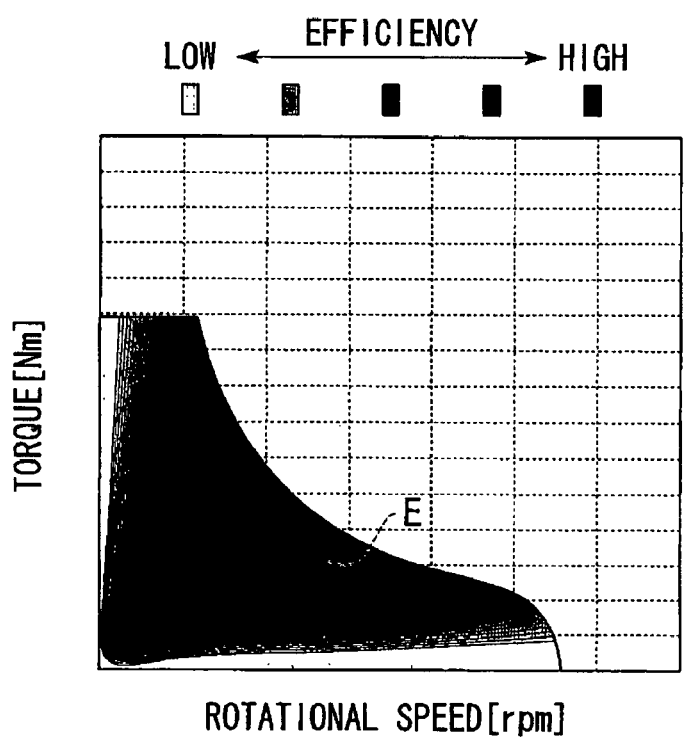
FIG. 32B shows the distribution of operable regions and the efficiency for the revolution speed and the torque of the electric motor that vary in response to the induced voltage constant Ke in the second comparative example.

As a result, as shown in the embodiment of FIG. 32A, for example, by setting the induced voltage constant Ke to vary with a decreasing trend with the increase in the revolution speed of the electric motor 210, the revolution speed and the operable range for revolution speed expand compared to the case when the induced voltage constant Ke is not varied (for instance, in the second comparative example shown in FIG. 32B), and at the same time, the high efficiency range E in which the efficiency of the electric motor 210 increases above a specific efficiency expands; moreover, the value of maximum efficiency that can be achieved, also increases.

As mentioned above, according to the present embodiment, firstly by disposing the permanent magnets 211a and the permanent magnets 212a in the circumferential direction in the inner periphery side rotor 211 and the outer periphery side rotor 212, for example, the magnetic flux due to the permanent magnets of the outer periphery side rotor 212 can increase or decrease with good efficiency the flux linkage amount linking the stator coil 213a by the magnetic flux due to the permanent magnets 211a of the inner periphery side rotor 211. In the strong magnetic field state, the torque constant (that is, torque/phase current) of the electric motor 210 can be set at a relatively high value. The maximum torque value output by the electric motor 210 can be increased without reducing the current loss during electric motor operation, or without changing the maximum value of the output current of the inverter controlling the current to the stator coil 213a.

Moreover, the rotating mechanism 214 can supply/drain hydraulic oil for the first pressure chambers 256, . . . , 256 and the second pressure chambers 257, . . . , 257 defined on the inside of the inner periphery side rotor 211 by the vane rotor 232 integrally and rotatably installed with respect to the outer periphery side rotor 212 and the housing 233 integrally and rotatably installed with respect to the inner periphery side rotor 211. As a result, the relative phase between the inner periphery side rotor 211 and the outer periphery side rotor 212 can be changed, and the induced voltage constant can be varied at the desired timing easily and accurately while inhibiting complexity of the electric motor 210. The result is that the range of operable revolution speed and the range of torque expand, the operating efficiency is enhanced, and the operable range at high efficiency also expands.

Moreover, by controlling the quantity of hydraulic oil supplied to the first pressure chambers 256, . . . , 256, and the second pressure chambers 257, . . . , 257, the relative phase between the inner periphery side rotor 211 and the outer periphery side rotor 212 can be changed steplessly within the range of electrical angles of 180° between the strong magnetic field state and the weak magnetic field state.

Also, since the vane rotor 232 and the housing 233 define the first pressure chambers 256, . . . , 256, and the second pressure chambers 257, . . . , 257 on the inside of the inner periphery side rotor 211, the increase in thickness especially in the axial direction of the electric motor 210 can be inhibited so as to make the electric motor more compact.

More specifically, if hydraulic oil is drained from the second pressure chambers 257, . . . , 257 while hydraulic oil is supplied to the first pressure chambers 256, . . . , 256, which are defined by the blades 236, . . . , 236 of the vane rotor 232 and the grooves 248, . . . , 248 of the housing 233, the relative phase between the housing 233 and the vane rotor 232 can be changed in the direction of expansion of the first pressure chambers 256, . . . , 256. As a result, the relative phase between the inner periphery side rotor 211 installed integrally on the outside of the housing 233, and the outer periphery side rotor 212 installed integrally with the vane rotor 232 can be changed, and a weak magnetic field state occurs. On the other hand, if hydraulic oil is drained from the first pressure chambers 256, . . . , 256 while hydraulic oil is supplied to the second pressure chambers 257, . . . , 257, the relative phase between the housing 233 and the vane rotor 232 is changed in the direction of expansion of the second pressure chambers 257, . . . , 257. The result is that the relative phase between the inner periphery side rotor 211 and the outer periphery side rotor 212 is changed, and a strong magnetic field state occurs. In this way, since a simple vane actuator mechanism provided with vane rotor 232 and housing 233 is used as the rotating mechanism 214, the induced voltage constant can be varied easily and accurately at the desired timing while properly inhibiting any complexity of the electric motor 210.

Moreover, the vane rotor 232 is integrally installed with the outer periphery side rotor 212 through the drive plates 231, 231 fixed to the outer periphery side rotor 212 so as to cover the end faces in the axial direction. Furthermore, since it is also integrally installed with the output shaft 216 that outputs the drive force of the outer periphery side rotor 212, the rotation of the outer periphery side rotor 212 can be transmitted directly to the output shaft 216. On the other hand, the pressure of hydraulic oil supplied to the first pressure chambers 256, . . . , 256 and the second pressure chambers 257, . . . , 257, is used mainly for changing the relative phase between the housing 233 installed integrally on the inside of the inner periphery side rotor 211 and the vane rotor 232, that is, mainly for changing the relative phase between the inner periphery side rotor 211 and the outer periphery side rotor 212. Consequently, the required pressure generated by the hydraulic oil can be restricted to a low value.

Also, hydraulic oil is supplied/drained through the vane rotor 232 for the first pressure chambers 256, ..., 256, and the second pressure chambers 257, ..., 257; therefore, the increase in thickness in the axial direction with the formation of flow passage for hydraulic oil can be inhibited.

Also, according to the present embodiment, during rotation of the outer periphery side rotor 212 and the inner periphery side rotor 211, a small amount of hydraulic oil of the first pressure chambers 256, ..., 256 or the second pressure chambers 257, ..., 257, together with the impurities (contamination) contained in it, shifts to the outer periphery from all the through holes 233b, ..., 233b formed in the housing 233 due to centrifugal force, and is discharged through the flow passage 251 in spiral shape between the inner periphery side rotor 211 and the housing 233. As a result, the deposition of impurities included in the hydraulic oil, on the bottom wall face 248a of the grooves 248, ..., 248 formed in the first pressure chamber 256 and the second pressure chamber 257, is inhibited. Moreover, through hole 233b linking the flow passage 251 is formed in each of the first pressure chambers 256, ..., 256 or in each of the second pressure chambers 257, ..., 257; therefore, the deposition of impurities in each chamber can be inhibited. Also, since the hydraulic oil discharged from the first pressure chambers 256, ..., 256, and the second pressure chambers 257, ..., 257 is discharged through the flow passage 251 between the inner periphery side rotor 211 and the housing 233, the inner periphery side rotor 211 and the housing 233 can be cooled.

Here, since the flow passage 251 has a spiral shape in the circumferential direction, when the outer periphery side rotor 212 and the inner periphery side rotor 211 rotate, the hydraulic oil is evacuated from all the through holes 233b linked to all the first pressure chambers 256, ..., 256 or all the second pressure chambers 257, ..., 257 due to the rotational force, and the hydraulic oil is discharged from the end face 233B according to the direction of rotation of the housing 233 of the inner periphery side rotor 211. In this way, the flow passage 251 in spiral shape functions as a screw pump, evacuates and discharges the hydraulic oil together with the impurities from the first pressure chambers 256, ..., 256 or the second pressure chambers 257, ..., 257. As a result, the deposition of impurities is effectively inhibited. Also, the inner periphery side rotor 211 and the housing 233 can be generally cooled to an average level because the hydraulic oil is discharged through the flow passage 251 in spiral shape between the inner periphery side rotor 211 and the housing 233. Also, the hydraulic oil discharged from the end face 233B of the housing 233 of the inner periphery side rotor 211 passes through the gap 259 between the inner periphery side rotor 211 and the drive plates 231, 231, and the gap 260 between the inner periphery side rotor 211 and the outer periphery side rotor 212, and it cools the outer periphery side rotor 212. Additionally, the hydraulic oil is discharged outside through the gap between the pair of drive plates 231, 231, and the outer periphery side rotor 212 by centrifugal force, falls mainly on the stator coil 213a of the stator 213 and cools the stator 213.

Since the flow passage 251 forms a spiral shape in the circumferential direction, it forms a screw orifice. For instance, it can bleed out air satisfactorily during a dry start, can quickly fill the first pressure chambers 256, ..., 256 and the second pressure chambers 257, ..., 257 with hydraulic oil, and can restrict the discharged flow rate of hydraulic oil to the minimum required for discharge of impurities in the hydraulic oil while ensuring that no effects are caused on the operation.

If the flow passage 251 is not required to function as a screw pump, it may be made to extend in the axial direction, and multiple flow passages may be used linking to each through hole 233b, ..., 233b with a one-to-one correspondence.

The rotating mechanism 214 may be provided with a first member integrally and rotatably installed with respect to the outer periphery side rotor 212, a second member integrally installed on the inside of the inner periphery side rotor 211, which together with the first member defines the pressure chamber on the inside of the inner periphery side rotor 211. The relative phase between the inner periphery side rotor 211 and the outer periphery side rotor 212 may be changed by supplying hydraulic fluid to the pressure chamber and rotating either the inner periphery side rotor 211 or the outer periphery side rotor 212 about the rotational axis. For example, an application may also be considered wherein a ring gear is installed as the first member connected by helical spline to the inside of the second member integrally fixed to the inside of the inner periphery side rotor 211, hydraulic oil may be supplied to the pressure chamber to slide the ring gear in the axial direction and relatively rotate the inner periphery side rotor 211 with respect to the outer periphery side rotor 212 by the twist of the helical spline.

The features of the electric motor of the third embodiment described above can be summarized as shown below.

(3-1) An electric motor provided with: an inner periphery side rotor provided with inner peripheral permanent magnets disposed along a circumferential direction thereof; an outer periphery side rotor provided with outer peripheral permanent magnets disposed along a circumferential direction thereof such that a rotational axis thereof is coaxial with a rotational axis of the inner periphery side rotor; and a rotating device that can change a relative phase between the inner periphery side rotor and the outer periphery side rotor by rotating at least the inner periphery side rotor or the outer periphery side rotor about the rotational axis, wherein:

a through hole passing through the pressure chamber to the outer periphery is formed in the second member; and a flow passage links the through hole between the inner periphery side rotor and the second member.

According to the electric motor mentioned above, by disposing permanent magnets in the circumferential direction in the inner periphery side rotor and the outer periphery side rotor, for example, the flux linkage amount of the magnetic flux from the permanent magnets of the outer periphery side rotor linking the stator coils, can be efficiently increased or decreased by the magnetic flux from the permanent magnets of the inner periphery side rotor. In the strong magnetic field state, the torque constant (that is, torque/phase current) of the electric motor can be set at a relatively high value. The maximum torque value output by the electric motor can be increased without reducing the current loss during electric motor operation, or without changing the maximum value of the output current of the inverter controlling the current to the stator coils.

Moreover, since the rotating device supplies hydraulic fluid to the pressure chamber defined on the inside of the inner periphery side rotor by the first member integrally and rotatably installed with respect to the outer periphery side rotor, and by the second member integrally and rotatably installed with respect to the inner periphery side rotor, it varies the relative phase between the inner periphery side rotor and the outer periphery side rotor. Thus, the induced voltage constant can be varied easily and accurately at the desired timing while inhibiting any complexity of the electric motor. The result is that the range of operable revolution speed and the torque range can be expanded, the operating efficiency enhanced, and the operable range of high efficiency can be expanded.

Moreover, by controlling the quantity of hydraulic fluid supplied to the pressure chamber, the relative phase between the inner periphery side rotor and the outer periphery side rotor can be changed to the desired phase.

Also, when the outer periphery side rotor and the inner periphery side rotor rotate, the hydraulic fluid together with the impurities (contamination) contained in it, is discharged through the through holes formed in the second member passing through the pressure chamber to the outer periphery, and from the pressure chamber through the flow passage between the inner periphery side rotor and the second member. Thus, the deposition of impurities included in the hydraulic fluid on the wall face of the pressure chamber can be inhibited. Since the hydraulic fluid discharged from the pressure chamber is discharged through the flow passage between the inner periphery side rotor and the second member, the inner periphery side rotor and the second member can be cooled.

(3-2) The electric motor according to (3-1), wherein:
the first member is a vane rotor installed integrally with the outer periphery side rotor, is disposed on the inside of the inner periphery side rotor, and has multiple blades;
the second member is a housing with multiple grooves which together with the blades defines the pressure chamber and is integrally installed on the inside of the inner periphery side rotor while rotatably housing the blades of the vane rotor; and
through holes are formed linking the flow passage for each of the multiple pressure chambers.

According to this electric motor, if the first member is a vane rotor with multiple blades, and the second member is a housing with multiple grooves that together with the blades defines the pressure chamber, while rotatably housing the blades of the vane rotor, the deposition of impurities in each of the multiple pressure chambers can be inhibited since through holes are formed linking the flow passage for each of the multiple pressure chambers.

Also, since the vane rotor and the housing define the pressure chamber on the inside of the inner periphery side rotor, the increase in thickness especially in the direction of the rotational axis can be inhibited so as to make the electric motor more compact.

(3-3) The electric motor according to (3-2), wherein the flow passage in spiral shape in the circumferential direction links to through holes formed in each of the multiple pressure chambers, and the end of the flow passage opens to the end face of the inner periphery side rotor.

According to this electric motor, since the flow passage has a spiral shape in the circumferential direction, when the outer periphery side rotor and the inner periphery side rotor rotate, the hydraulic fluid is evacuated from all the through holes linked to the multiple pressure chambers due to the rotational force, and is discharged from the end face of the inner periphery side rotor. In this way, the spiral shaped flow passage functions as a screw pump, and evacuates and discharges the hydraulic fluid of the pressure chamber together with the impurities. As a result, deposition of impurities is effectively inhibited. Also, since the hydraulic fluid discharged from the pressure chamber is discharged through the spiral shaped flow passage between the inner periphery side rotor and the second member, the inner periphery side rotor and the second member can be generally cooled to an average level.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electric motor comprising:
an inner periphery side rotor provided with inner peripheral permanent magnets disposed along a circumferential direction thereof;
an outer periphery side rotor provided with outer peripheral permanent magnets disposed along a circumferential direction thereof such that a rotational axis thereof is coaxial with a rotational axis of the inner periphery side rotor; and
a rotating device that can change a relative phase between the inner periphery side rotor and the outer periphery side rotor by rotating at least the inner periphery side rotor or the outer periphery side rotor about the rotational axis, wherein
the rotating device:
includes a first member integrally and rotatably fixed to the outer periphery side rotor, and a second member integrally fixed on an inside of the inner periphery side rotor which together with the first member defines a pressure chamber on the inside of the inner periphery side rotor;
changes the relative phase between the inner periphery side rotor and the outer periphery side rotor by supplying a hydraulic fluid to the pressure chamber; and
also includes a linking passage that leaks the hydraulic fluid supplied to the pressure chamber to an outside of the pressure chamber, wherein the linking passage is through a hole from the pressure chamber provided in the second member to an outer periphery.

2. The electric motor according to claim 1, wherein a flow passage that links the through hole is formed between the inner periphery side rotor and the second member.

3. The electric motor according to claim 2, wherein:
the first member is a vane rotor which is installed integrally with the outer periphery side rotor, is disposed on the inside of the inner periphery side rotor, and has multiple blades;
the second member is a housing with multiple grooves, which together with the blades defines the pressure chamber and is integrally installed on the inside of the inner periphery side rotor while rotatably housing the blades of the vane rotor; and
the through holes linking the flow passage are formed in the pressure chamber.

4. The electric motor according to claim 3, wherein:
the flow passage is formed in a spiral shape extending along the circumferential direction, and links to the through holes formed in the pressure chamber; and
an end of the flow passage opens to an end face of the inner periphery side rotor.

5. The electric motor according the claim 1, wherein:
the first member is a vane rotor which is disposed on the inside of the inner periphery side rotor, and is integrally installed with the outer periphery side rotor;
the second member is a housing with multiple grooves, which together with the vane rotor defines the pressure chamber and is integrally installed on the inside of the inner periphery side rotor while rotatably housing the blades of the vane rotor;
the inner periphery side rotor is rotatably disposed in the circumferential direction in a space between the surrounding outer periphery side rotor, the vane rotor and two end plates, by fixing the end plates that transmit the drive force of the outer periphery side rotor to an output shaft on the sides of the two ends in the axial direction of the outer periphery side rotor and the vane rotor; and through holes are formed laterally in a gap between the outer periphery side rotor and the inner periphery side rotor in the end plates.

6. The electric motor according to claim 5, wherein the linking passage is a fluid passage that links the pressure chamber, and a gap between the inner periphery side rotor and the outer periphery side rotor.

7. The electric motor according to claim 6, wherein notches are formed in the wall of the pressure chamber that enable the fluid passage to remain always open to the pressure chamber regardless of the relative position of the vane rotor.

8. The electric motor according to claim 7, wherein the fluid passage is formed in each end plate of the two end plates.

9. The electric motor according to claim 8, wherein a second fluid passage is formed in an end plate of the two end plates which extends from the gap to the outer periphery side rotor.

10. The electric motor according to claim 9, wherein the second fluid passage is formed in said each end plate of the two end plates, and a phase in the circumferential direction of the second fluid passage formed in one end plate of the two end plates differs from a phase in the circumferential direction of the second fluid passage formed in the other end plate of the two end plates.

* * * * *